US011599587B2

(12) United States Patent
Gupta et al.

(10) Patent No.: US 11,599,587 B2
(45) Date of Patent: Mar. 7, 2023

(54) TOKEN BASED DYNAMIC DATA INDEXING WITH INTEGRATED SECURITY

(71) Applicant: ThoughtSpot, Inc., Sunnyvale, CA (US)

(72) Inventors: Shashank Gupta, Sammamish, WA (US); Amit Prakash, Saratoga, CA (US); Ajeet Singh, Saratoga, CA (US); Shikhar Agarwal, Mountain View, CA (US); Shailesh Chauhan, Fremont, CA (US); Satyam Shekhar, San Jose, CA (US)

(73) Assignee: ThoughtSpot, Inc., Mountain View, CA (US)

( * ) Notice: Subject to any disclaimer, the term of this patent is extended or adjusted under 35 U.S.C. 154(b) by 100 days.

(21) Appl. No.: 17/327,949

(22) Filed: May 24, 2021

(65) Prior Publication Data

US 2021/0279292 A1   Sep. 9, 2021

Related U.S. Application Data

(63) Continuation of application No. 16/173,320, filed on Oct. 29, 2018, now Pat. No. 11,017,035, which is a
(Continued)

(51) Int. Cl.
*G06F 16/24* (2019.01)
*G06F 16/951* (2019.01)
(Continued)

(52) U.S. Cl.
CPC ........ *G06F 16/951* (2019.01); *G06F 16/2272* (2019.01); *G06F 16/243* (2019.01);
(Continued)

(58) Field of Classification Search
CPC ...... G06F 16/951; G06F 16/243; G06F 16/38; G06F 16/2272; G06N 5/04
See application file for complete search history.

(56) References Cited

U.S. PATENT DOCUMENTS 7,962,532 B1 * 6/2011 Pogde .................. G06F 16/122
                                                                  707/828
8,577,913 B1   11/2013 Hansson et al.
(Continued)

FOREIGN PATENT DOCUMENTS

EP         268367 A2    5/1988
EP        1587011 A1   10/2005
(Continued)

OTHER PUBLICATIONS

Sayyadian et al., "Efficient Keyword Search Across Heterogeneous Relational Databases", 2007, IEEE, 346-355 (10 pp).
(Continued)

*Primary Examiner* — Eliyah S. Harper
(74) *Attorney, Agent, or Firm* — Young Basile Hanlon & MacFarlane, P.C.

(57) ABSTRACT

Semantic analysis to resolve ambiguous user input data with respect to a request for data includes identifying tokens based on the text string, identifying a tables in a database, wherein a token indicates a column from a table and a token indicates a column from another table, identifying candidate join paths for joining tables, obtaining respective candidate results using the candidate join paths, outputting combined candidate results including values from the respective candidate results, obtaining second user input data indicating a selected value, identifying the request for data as unambiguous and identifying a selected join path based on the selected value, and, in response to identifying the request for data as
(Continued)

unambiguous, outputting data responsive to the request for data using the selected join path.

20 Claims, 37 Drawing Sheets

Related U.S. Application Data continuation of application No. 14/252,553, filed on Apr. 14, 2014, now abandoned, which is a continuation-in-part of application No. 13/944,491, filed on Jul. 17, 2013, now Pat. No. 9,405,794.

(51) Int. Cl.
| | | |
|---|---|---|
| G06F 16/22 | (2019.01) | |
| G06F 16/242 | (2019.01) | |
| G06F 16/9032 | (2019.01) | |
| G06F 16/38 | (2019.01) | |
| G06F 16/33 | (2019.01) | |
| G06F 16/2452 | (2019.01) | |
| G06F 16/332 | (2019.01) | |
| G06N 5/04 | (2023.01) | |

(52) U.S. Cl.
CPC .... *G06F 16/2423* (2019.01); *G06F 16/24522* (2019.01); *G06F 16/3329* (2019.01); *G06F 16/3334* (2019.01); *G06F 16/38* (2019.01); *G06F 16/90324* (2019.01); *G06N 5/04* (2013.01)

(56) References Cited

U.S. PATENT DOCUMENTS

| | | |
|---|---|---|
| 9,275,132 B2 | 3/2016 | Roberts et al. |
| 9,405,794 B2 | 8/2016 | Prakash et al. |
| 2004/0267730 A1 | 12/2004 | Dumais et al. |
| 2005/0027717 A1 | 2/2005 | Koudas et al. |
| 2005/0289124 A1 | 12/2005 | Kaiser et al. |
| 2006/0143208 A1* | 6/2006 | Ramachandran ..... G06F 16/958 |
| 2007/0192300 A1 | 8/2007 | Reuther et al. |
| 2007/0219974 A1 | 9/2007 | Chickering et al. |
| 2007/0234195 A1* | 10/2007 | Wells .................. G06F 16/9577 715/205 |
| 2007/0240154 A1* | 10/2007 | Gerzymisch ....... G06Q 10/0875 717/174 |
| 2007/0244990 A1* | 10/2007 | Wells .................... G06F 16/986 709/218 |
| 2008/0109422 A1 | 5/2008 | Dedhia |
| 2009/0019019 A1 | 1/2009 | Jones et al. |
| 2009/0019022 A1 | 1/2009 | Schallert et al. |
| 2010/0082636 A1* | 4/2010 | Kruus ..................... G06F 16/13 707/747 |
| 2010/0262631 A1* | 10/2010 | Andersson ............ G06F 16/289 707/E17.108 |
| 2011/0113048 A1 | 5/2011 | Njemanze |
| 2012/0066217 A1 | 3/2012 | Eder |
| 2013/0339370 A1 | 12/2013 | Holstege et al. |
| 2014/0201241 A1 | 7/2014 | Wood et al. |
| 2014/0337371 A1 | 11/2014 | Li |
| 2017/0270159 A1 | 9/2017 | Wang et al. |

FOREIGN PATENT DOCUMENTS

| | | |
|---|---|---|
| EP | 2202658 A2 | 6/2010 |
| EP | 2207106 A2 | 7/2010 |
| WO | 0141002 A1 | 6/2001 |
| WO | 2015009353 A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp).
Anonymous: "File System Permission—Wikipedia, The Free Encyclopedia." Jun. 11, 2013 (Jun. 11, 2013); URL: http://en.wikipedia.org/w/index/php?title.sub.-File.sub.-system.sub.-p- ermissions &oldid=559455322 [retrieved on May 11, 2014]; (8 pp).
Shi et al.: "50x Faster: Speeding Up An SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).
Li et al: "Efficient Type-Ahead Search on Relational Data: a Tastier Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp).
Blunschi et al: "Soda: Generating SQL for Business Users", Proceedings of the VLDB Endowment, vol. 5, No. 10, Aug. 27, 2012 pp. 932-935 (12 pp).
Baid et al: "Toward Scalable Keyword Search over Relational Data", Proceedings of the VLDS Endowment, vol. 3, No. 1-2, Sep. 1, 2010, pp. 140-149 (10 pp).
Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).
International Search Report and Written Opinion for PCT/US14/39230; dated Nov. 24, 2014 (16 pp).
Anonymous, "Natural Language Processing", Wikipedia, Downloaded Jan. 30, 2019, https://en.wikipedia.org/wiki/Natural_language_processing, (8 pp).
Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).
Extended European Search Report received in co-pending Application No. EP 19160657.3 dated Apr. 4, 2019 (11 pp).
Avrach, A., Thoughtspot.Com, "What the Bleep is a Chasm Trap?", https://www.thoughtspot.com/fact-and-dimension/what-bleep-chasm-trap 9/, Date Unknown, Downloaded Apr. 2, 2019 (9 pp).
Sisense, "Chasm and Fan Traps", https://documentation.sisense.com/latest/managing-data/working-with-data/chasm-fan-traps.htm. Date Unknown, Downloaded Apr. 2, 2019 (8 pp).
Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).
Morton, K., et al., "Dynamic Workload Driven Data Integration In Tableau", Proceedings of the 2012 International Conference on Management of Data, SIGMOD '12, Jan. 1, 2012, p. 807 (9 pp).
Extended European Search Report dated Jul. 26, 2019, issued in co-pending EP Application No. 19166422.6 (11 pp).
Wikipedia, "Consistent hashing", https://en.wikipedia.org/wiki/Consistent_hashing, Date Unknown, Downloaded Aug. 15, 2019, (5 pp).
Eades, Peter, et al., "A Fast & Effective Heuristic for the Feedback Arc Set Problem," Information Processing Letters, vol. 47, Issue 6, Oct. 18, 1993, pp. 319-323.
Wikipedia, "Dijkstra's algorithm", Date Unknown, downloaded Jul. 16, 2019, https://en.wikipedia.org/wiki/Dijkstra%27s_algorithm (11 pp).
Extended European Search Report issued in co-pending European Application No. 20176612.8 dated Sep. 2, 2020 (13 pp).
Hristidis, V., et al., "Efficient IR-Style Keyword Search Over Relational Databases", Proceedings of the 29th International Conference on Very Large Databases: Berlin, Germany, Sep. 9, 2003 (12 pp).

* cited by examiner

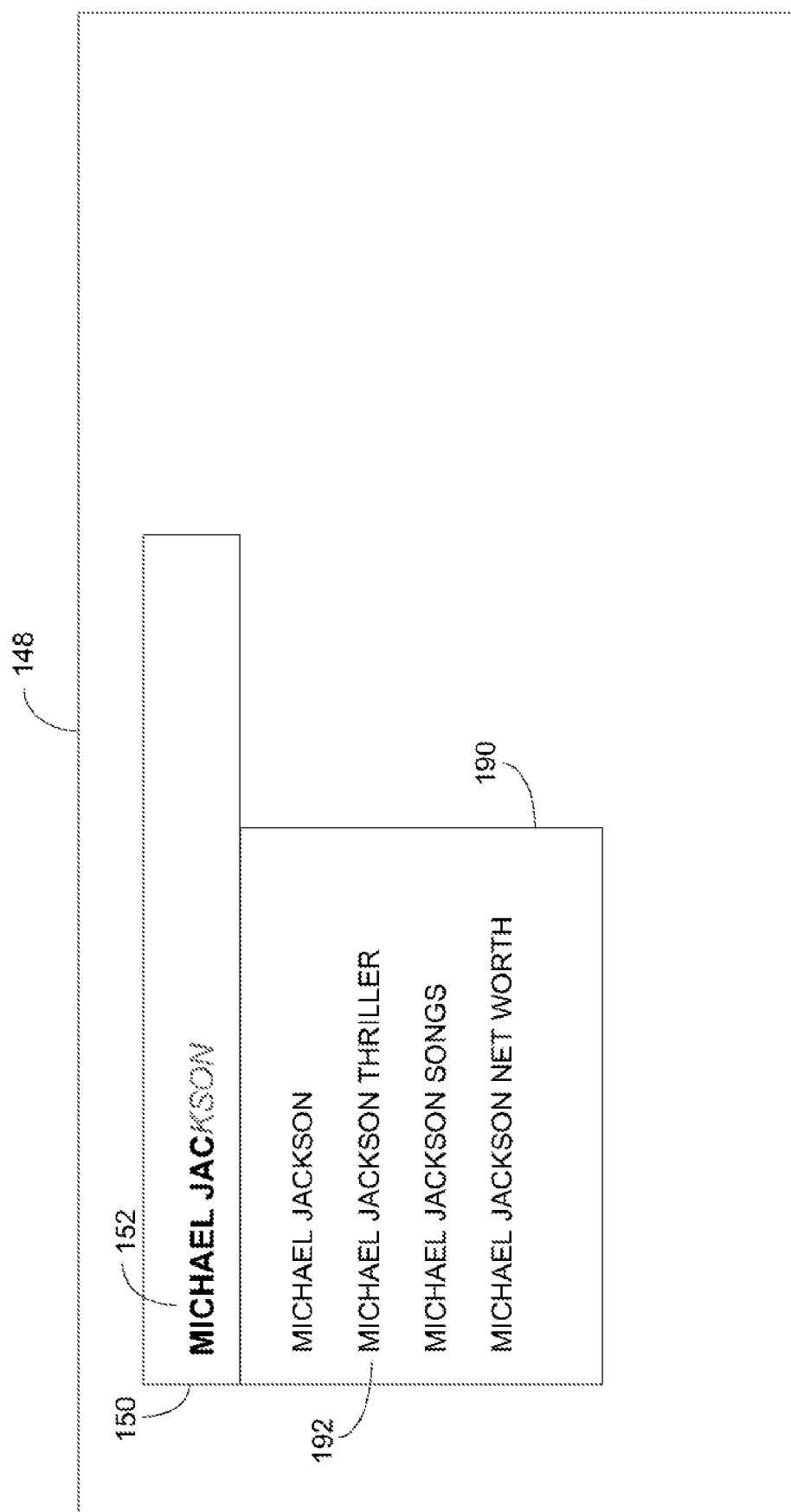

| Label | Priority Queue | Rank |
|---|---|---|
| 522A | 100/75 | RANK #1 |
| 522B | 100/75/55 | |
| 522C | CALIFORNIA | |
| 522D | 75/55 | RANK #2 |
| 522E | 75/55/25 | |
| 522F | ARIZONA | |
| 522G | 55/25 | RANK #3 |
| 522H | 55/25/8 | |
| 522I | COLORADO | |
| 522J | 25/8 | RANK #4 |
| 522K | 25/12/8 | |
| 522L | ALASKA | |
| 522M | 12/8 | RANK #5 |
| 522N | ALABAMA | |
| 522O | 8 | RANK #6 |
| 522P | CONNETICUT | |

520 = PRIORITY QUEUE

ORDER AMOUNT – CUSTOMER SUPPORT COST — 148

152

CUSTOMER PROFITABILITY

| CUSTOMER ID | AMOUNT | COST | PROFITABILITY |
|---|---|---|---|
| 10 | $500 | $300 | $200 |
| 20 | $650 | $225 | $425 |

694

ORDER

| TRANS. ID | AMOUNT | CUSTOMER ID |
|---|---|---|
| 1 | $500 | 10 |
| 2 | $650 | 20 |
| 3 | $325 | 30 |
| 4 | $700 | 40 |
| • | | |
| • | | |

690

CUSTOMER SUPPORT COST

| CUSTOMER ID | COST |
|---|---|
| 10 | $300 |
| 20 | $225 |

TOKEN BASED DYNAMIC DATA INDEXING WITH INTEGRATED SECURITY

CROSS-REFERENCE TO RELATED APPLICATION(S)

This application claims priority to and the benefit of U.S. application patent Ser. No. 16/173,320, filed Oct. 29, 2018, now U.S. Pat. No. 11,017,035, which is a continuation of U.S. application patent Ser. No. 14/252,553, filed Apr. 14, 2014, which is a continuation-in-part of U.S. patent application Ser. No. 13/944,491, Filed Jul. 17, 2013 the entire disclosures of which are hereby incorporated by reference.

BACKGROUND

Enterprises need to access specific business intelligence (BI) information. Business intelligence (BI) is a set of theories, methodologies, processes, architectures, and technologies that may transform raw data into meaningful and useful information for business purposes. BI may handle large amounts of information to help identify and develop new opportunities. Making use of new opportunities and implementing an effective strategy can provide a competitive market advantage and long-term stability.

Business intelligence software tools attempt to automate the process of translating raw data sitting in relational databases into meaningful information that a business decision maker can use. However, the creation of new reports is often complex and involves several Information technology (IT) specialists. A business user first may need to fill out a form that describes what data to provide in a BI report.

The form is taken to an information technology (IT) specialist who generates the correct relational database management system (RDBMS) queries and then creates reports from on the query results. The process of the business user specifying what data to retrieve and then getting the final report back from the IT specialist can often take several weeks. Existing database solutions may not be fast enough to provide an interactive business user experience when large volumes of data need to be processed.

Internet search engines are designed to search through documents and help users formulate questions. However, Internet search engines are not aware of the relationships that exist in typical relational databases. Internet search queries only perform simply string matches and do not have the intelligence to perform searches on structured data and correlate/aggregate/filter the search results.

SUMMARY

Disclosed herein are implementations of semantic analysis to resolve ambiguous user input data with respect to a request for data.

An aspect of the disclosure is a method of semantic analysis to resolve ambiguous user input data with respect to a request for data. Semantic analysis to resolve ambiguous user input data with respect to a request for data includes obtaining first user input data indicating a request for data and including a text string. Semantic analysis to resolve ambiguous user input data with respect to a request for data includes automatically identifying a first token based on a first portion of the text string using a finite state machine and a token index, wherein the token index indexes tokens, including the first token and a second token, such that tokens are computer accessible. Semantic analysis to resolve ambiguous user input data with respect to a request for data includes automatically identifying a first table in a database, wherein the first token indicates a first column from the first table, and wherein the first table includes a second column. Semantic analysis to resolve ambiguous user input data with respect to a request for data includes automatically identifying the second token based on a second portion of the text string using the finite state machine and the token index. Semantic analysis to resolve ambiguous user input data with respect to a request for data includes automatically identifying a second table in the database, wherein the second token indicates a third column from the second table, and wherein the second table includes a fourth column and a fifth column. Semantic analysis to resolve ambiguous user input data with respect to a request for data includes automatically identifying a first candidate join path for joining data from the first column from the first table with data from the third column from the second table based on an association between the fourth column from the second table and the second column from the first table. Semantic analysis to resolve ambiguous user input data with respect to a request for data includes automatically identifying a second candidate join path for joining data from the first column from the first table with data from the third column from the second table based on an association between the fifth column from the second table and the second column from the first table. Semantic analysis to resolve ambiguous user input data with respect to a request for data includes automatically identifying the request for data as ambiguous in response to automatically identifying the first candidate join path and the second candidate join path, and in the absence of data selecting the first candidate join path or the second candidate join path as a selected join path. Semantic analysis to resolve ambiguous user input data with respect to a request for data includes automatically obtaining first candidate results responsive to the input data, wherein automatically obtaining first candidate results includes using the first candidate join path and omits using the second candidate join path, such that the first candidate results include a first set of candidate values based on the first column from the first table and a second set of candidate results based on the third column from the second table. Semantic analysis to resolve ambiguous user input data with respect to a request for data includes automatically obtaining second candidate results responsive to the input data, wherein automatically obtaining second candidate results includes using the second candidate join path and omits using the first candidate join path, such that the second candidate results include a third set of candidate values based on the first column from the first table and a fourth set of candidate results based on the third column from the second table. Semantic analysis to resolve ambiguous user input data with respect to a request for data includes automatically outputting, for presentation to a user, combined candidate results including a first value from the first set of candidate values, a second value from the second set of candidate results, a third value from the third set of candidate values, and a fourth value from the fourth set of candidate results. Semantic analysis to resolve ambiguous user input data with respect to a request for data includes obtaining second user input data indicating a selection of the first value, the second value, the third value, or the fourth value. Semantic analysis to resolve ambiguous user input data with respect to a request for data includes, in response to obtaining the second user input data, automatically identifying the request for data as unambiguous and identifying the selected join path. Identifying the selected join path includes identifying the first candidate join path as the selected join path in response to automatically determining that the second user input data indicates the selection of the first value or the second value. Identifying the selected join path includes identifying the second candidate join path as the selected join path in response to automatically determining that the second user input data indicates the selection of the third value or the fourth value. Semantic analysis to resolve ambiguous user input data with respect to a request for data includes, in response to automatically identifying the request for data as unambiguous, automatically outputting, for presentation to the user, data responsive to the request for data using the selected join path.

Another aspect of the disclosure is an apparatus for token based dynamic data indexing with integrated security. The apparatus includes a memory, and a processor configured to execute instructions stored in the memory to implement semantic analysis to resolve ambiguous user input data with respect to a request for data. To implement semantic analysis to resolve ambiguous user input data with respect to a request for data, the processor may execute instructions stored in the memory to obtain first user input data indicating a request for data and including a text string. To implement semantic analysis to resolve ambiguous user input data with respect to a request for data, the processor may execute instructions stored in the memory to automatically identify a first token based on a first portion of the text string using a finite state machine and a token index, wherein the token index indexes tokens, including the first token and a second token, such that tokens are computer accessible. To implement semantic analysis to resolve ambiguous user input data with respect to a request for data, the processor may execute instructions stored in the memory to automatically identify a first table in a database, wherein the first token indicates a first column from the first table, and wherein the first table includes a second column. To implement semantic analysis to resolve ambiguous user input data with respect to a request for data, the processor may execute instructions stored in the memory to automatically identify the second token based on a second portion of the text string using the finite state machine and the token index. To implement semantic analysis to resolve ambiguous user input data with respect to a request for data, the processor may execute instructions stored in the memory to automatically identify a second table in the database, wherein the second token indicates a third column from the second table, and wherein the second table includes a fourth column and a fifth column. To implement semantic analysis to resolve ambiguous user input data with respect to a request for data, the processor may execute instructions stored in the memory to automatically identify a first candidate join path for joining data from the first column from the first table with data from the third column from the second table based on an association between the fourth column from the second table and the second column from the first table. To implement semantic analysis to resolve ambiguous user input data with respect to a request for data, the processor may execute instructions stored in the memory to automatically identify a second candidate join path for joining data from the first column from the first table with data from the third column from the second table based on an association between the fifth column from the second table and the second column from the first table. To implement semantic analysis to resolve ambiguous user input data with respect to a request for data, the processor may execute instructions stored in the memory to automatically identify the request for data as ambiguous in response to the automatic identification of the first candidate join path and the second candidate join path, and in the absence of data selecting the first candidate join path or the second candidate join path as a selected join path. To implement semantic analysis to resolve ambiguous user input data with respect to a request for data, the processor may execute instructions stored in the memory to automatically obtain first candidate results responsive to the input data, wherein to automatically obtain the first candidate results the processor is configured to execute the instructions stored in the memory to use the first candidate join path and omit using the second candidate join path, such that the first candidate results include a first set of candidate values based on the first column from the first table and a second set of candidate results based on the third column from the second table. To implement semantic analysis to resolve ambiguous user input data with respect to a request for data, the processor may execute instructions stored in the memory to automatically obtain second candidate results responsive to the input data, wherein to automatically obtain the second candidate results the processor is configured to execute the instructions stored in the memory to use the second candidate join path and omit using the first candidate join path, such that the second candidate results include a third set of candidate values based on the first column from the first table and a fourth set of candidate results based on the third column from the second table. To implement semantic analysis to resolve ambiguous user input data with respect to a request for data, the processor may execute instructions stored in the memory to automatically output, for presentation to a user, combined candidate results including a first value from the first set of candidate values, a second value from the second set of candidate results, a third value from the third set of candidate values, and a fourth value from the fourth set of candidate results. To implement semantic analysis to resolve ambiguous user input data with respect to a request for data, the processor may execute instructions stored in the memory to obtain second user input data indicating a selection of the first value, the second value, the third value, or the fourth value. To implement semantic analysis to resolve ambiguous user input data with respect to a request for data, the processor may execute instructions stored in the memory to, in response to the second user input data, automatically identify the request for data as unambiguous and identify the selected join path. To automatically identify the selected join path the processor is configured to execute the instructions stored in the memory to identify the first candidate join path as the selected join path in response to a determination that the second user input data indicates the selection of the first value or the second value. To automatically identify the selected join path the processor is configured to execute the instructions stored in the memory to identify the second candidate join path as the selected join path in response to a determination that the second user input data indicates the selection of the third value or the fourth value. To implement semantic analysis to resolve ambiguous user input data with respect to a request for data, the processor may execute instructions stored in the memory to, in response to the identification of the request for data as unambiguous, automatically output, for presentation to the user, data responsive to the request for data using the selected join path.

Another aspect of the disclosure is a non-transitory computer-readable storage medium, comprising executable instructions that, when executed by a processor, facilitate performance of semantic analysis to resolve ambiguous user input data with respect to a request for data. Semantic analysis to resolve ambiguous user input data with respect to a request for data includes obtaining first user input data indicating a request for data and including a text string.

Semantic analysis to resolve ambiguous user input data with respect to a request for data includes automatically identifying a first token based on a first portion of the text string using a finite state machine and a token index, wherein the token index indexes tokens, including the first token and a second token, such that tokens are computer accessible. Semantic analysis to resolve ambiguous user input data with respect to a request for data includes automatically identifying a first table in a database, wherein the first token indicates a first column from the first table, and wherein the first table includes a second column. Semantic analysis to resolve ambiguous user input data with respect to a request for data includes automatically identifying the second token based on a second portion of the text string using the finite state machine and the token index. Semantic analysis to resolve ambiguous user input data with respect to a request for data includes automatically identifying a second table in the database, wherein the second token indicates a third column from the second table, and wherein the second table includes a fourth column and a fifth column. Semantic analysis to resolve ambiguous user input data with respect to a request for data includes automatically identifying a first candidate join path for joining data from the first column from the first table with data from the third column from the second table based on an association between the fourth column from the second table and the second column from the first table. Semantic analysis to resolve ambiguous user input data with respect to a request for data includes automatically identifying a second candidate join path for joining data from the first column from the first table with data from the third column from the second table based on an association between the fifth column from the second table and the second column from the first table. Semantic analysis to resolve ambiguous user input data with respect to a request for data includes automatically identifying the request for data as ambiguous in response to automatically identifying the first candidate join path and the second candidate join path, and in the absence of data selecting the first candidate join path or the second candidate join path as a selected join path. Semantic analysis to resolve ambiguous user input data with respect to a request for data includes automatically obtaining first candidate results responsive to the input data, wherein automatically obtaining first candidate results includes using the first candidate join path and omits using the second candidate join path, such that the first candidate results include a first set of candidate values based on the first column from the first table and a second set of candidate results based on the third column from the second table. Semantic analysis to resolve ambiguous user input data with respect to a request for data includes automatically obtaining second candidate results responsive to the input data, wherein automatically obtaining second candidate results includes using the second candidate join path and omits using the first candidate join path, such that the second candidate results include a third set of candidate values based on the first column from the first table and a fourth set of candidate results based on the third column from the second table. Semantic analysis to resolve ambiguous user input data with respect to a request for data includes automatically outputting, for presentation to a user, combined candidate results including a first value from the first set of candidate values, a second value from the second set of candidate results, a third value from the third set of candidate values, and a fourth value from the fourth set of candidate results. Semantic analysis to resolve ambiguous user input data with respect to a request for data includes obtaining second user input data indicating a selection of the first value, the second value, the third value, or the fourth value. Semantic analysis to resolve ambiguous user input data with respect to a request for data includes, in response to obtaining the second user input data, automatically identifying the request for data as unambiguous and identifying the selected join path. Identifying the selected join path includes identifying the first candidate join path as the selected join path in response to automatically determining that the second user input data indicates the selection of the first value or the second value. Identifying the selected join path includes identifying the second candidate join path as the selected join path in response to automatically determining that the second user input data indicates the selection of the third value or the fourth value. Semantic analysis to resolve ambiguous user input data with respect to a request for data includes, in response to automatically identifying the request for data as unambiguous, automatically outputting, for presentation to the user, data responsive to the request for data using the selected join path.

BRIEF DESCRIPTION OF THE DRAWINGS

FIGS. 6A-6C depict example auto-completions and explanations performed by the search engine.
FIG. 15 depicts an example priority queue.

FIG. 29 depicts an example scheme for processing formulaic search queries.

DETAILED DESCRIPTION

Overview

A search engine converts unstructured ad-hoc search queries into search instructions that retrieve data from a structured relational database. The search engine allows most users to express search requirements by just typing a few words.

Tokens are generated based on content, attributes, measures, and other metadata located in the relational database and in any other structured or unstructured data sources. The search engine identifies and displays the tokens in response to user inputs. The tokens may include any word, phrase, set of characters, value, symbols, or the like, or any combination thereof.

The search engine uses the tokens to guide the user through a selection of search terms that are then used for generating a structured query instruction. The structured query instruction is then used for retrieving data in the database system.

The search engine may determine and/or predict what tokens and/or data are associated with the user input. For example, the search engine may provide suggestions and display data before the user completes entering a search term or completes the search query. The suggestions help guide the user to relevant data that currently exists in the database system.

The retrieval system may use a ranking-based scheme to predict user inputs and fetch corresponding results. For example, the search engine may predict the user is looking for sales data based on only a few search characters. The search engine then may suggest search terms for accessing different types of sales data and may initiate a preliminary search to retrieve and display sales data for different sales regions.

The preliminary search may display the precise information the user was initially searching. In other situations, the preliminary search may display other helpful information that the user did not know existed, that the user would not have normally requested, or that helps the user locate the correct information.

The search engine may resolve ambiguities between the search input and the available data. For example, the user may enter the input REVENUE BY YEAR. A transaction table may include revenue data based on order date and ship date. The search engine may ask the user if revenue should be calculated based on the order date or the ship date? The search engine also may provide an explanation of how operations were performed on particular data to generate the results. The search engine also may use a security scheme to restrict what data can be viewed by different users.

The search engine also may allow users the select mappings between search terms and columns in different tables. The search engine may generate a worksheet table containing the selected mappings. The search engine also may perform user definable formulaic operations on the data in the different user selected table mappings.

Figure 1:
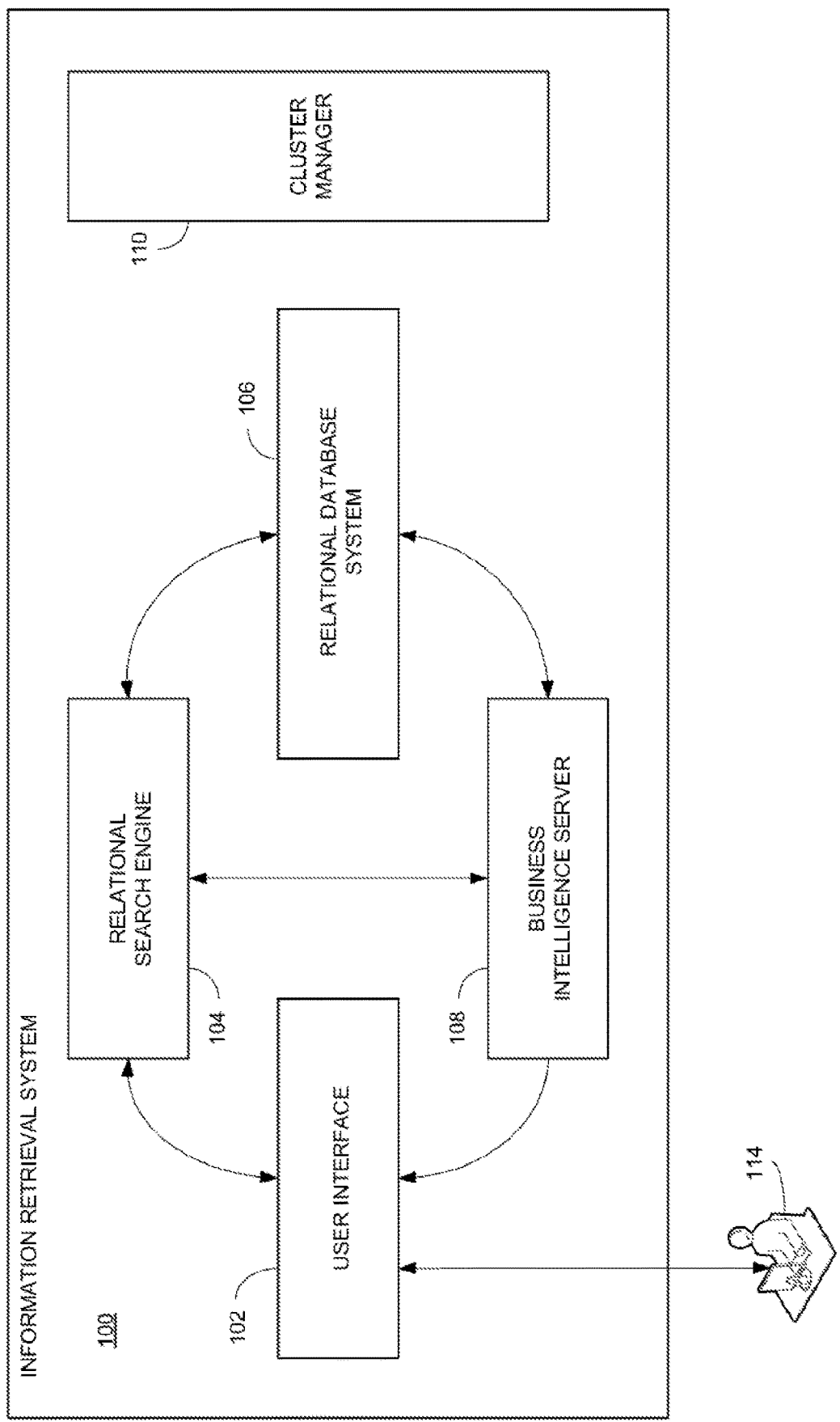
FIG. 1 depicts an example information retrieval system.

FIG. 1 depicts an example information retrieval system 100 (retrieval system). Information retrieval system 100 may comprise an array of local and/or cloud-based computing and storage devices, such as servers, database systems and/or any other computing logic. The different computing devices and database systems within retrieval system 100 may be coupled together via one or more buses or networks. The buses or networks may comprise local area networks (LANs), wide area networks (WANs), fiber channel networks, Internet networks, or the like, or any combination thereof. A user may use computing device 114 to access retrieval system 100. Computing device 114 may comprise a personal computer, computer terminal, mobile device, smart phone, electronic notebook, or the like, or any combination thereof.

Relational database system 106 may comprise one or more structured relational databases and/or unstructured databases, such any database system storing business intelligence (BI) information for an enterprise. The BI information may include sales data, revenue data, profit data, tax data, or the like, or any combination thereof. In one example, database system 106 may comprise dynamic random-access memory (DRAM), Flash memory, disc memory, or any other type of data storage medium with relatively fast data access. In one example, some of the data in database system 106 is stored in a column/row structure and assigned additional metadata identifying particular data parameters and relationships. For example, retrieval system 100 may identify different characteristics of the data such as, attributes, measures, values, unique identifiers, tags, links, column and row keys, etc.

Retrieval system 100 may generate tokens based on the data characteristics and associate the tokens with different columns in database system 106. For example, a column in database system 106 may contain revenue data. Retrieval system 100 may generate a token comprising the word REVENUE and load the token into an index that compares user inputs with the letters in the word revenue.

Search engine 104 may use the indexes and state machines to guide the user into using search terms associated with the data and data structures contained in database system 106. The state machine may identify different states and types of data associated with the search input. For example, some search terms may be identified as attributes or measures.

The attributes may comprise any data characteristic, category, content, etc. that in one example may be non-quantifiable or non-numeric. In another example, the attributes are drawn from a fixed universe of numeric values, such as age, zip codes, Boolean operators, status codes, or the like, or any combination thereof.

The measures may comprise quantifiable numeric values such as sizes, amounts, degrees, etc. A first column containing the names of states may be considered an attribute column and a second column containing the numbers of orders received for the different states may be considered a measure column. Search engine 104 then may initiate a search query in response to a user input requesting revenue data (measure column) for a state (attribute column).

Search engine 104 displays different tokens and/or data associated with current states of the user inputs. Again, the tokens may be associated with the structured tables or columns in database system 106. The tokens help guide the user into using search terms that refer to specific structured data within database system 106. For example, retrieval system 100 may bind the user into using tokens that are associated with data that currently exists within database system 106. This prevents the user from generating search queries for data that does not exist in database system 106 and from using invalid search terms that cannot be linked with the data in database system 106.

The user also may enter valid search terms that have no corresponding data in database system 106. Retrieval system 100 may generate a response that indicates no data exists for the search query. For example, the search term may request the number of orders received for the month of July in California. The database system may contain columns for orders and California. However, the columns may have no orders for the month of July from California. The retrieval system may generate a response that indicates that no orders were received for the month of July from California.

In one example, the user accesses user interface 102 via a web browser or a web application. In another example, the user may access a local native application that contacts information retrieval system 100 and search engine 104. The user enters characters into a search field within user interface 102. Search engine 104 compares the characters with the tokens previously generated from database system 106. Search engine 104 may display suggested tokens to the user before the user completes the search query. For example, search engine 104 may display a revenue token immediately after the user enters the letter R. If relevant, the user may select the displayed revenue token. Otherwise, the user may enter additional characters into the search field and search engine 104 may compare the additional characters with the tokens.

Search engine 104 may use ranking algorithms before displaying the tokens to the user. In other words, search engine 104 may try to predict what data in database system 106 is associated with the user inputs. For example, there may be hundreds of different tokens associated with the letter R. Search engine 104 may rank the tokens and initiate a search query based on the ranking.

Token ranking may be based on usage, table cardinality, or any other criteria. For example, a first token may be associated with a first column in the database system having four values and a second token may be associated with a second column in the database system having hundreds of values. Search engine 104 may rank the first token higher than the second token, since the fewer number of values in the first column may have a higher likelihood of containing the correct data. Search engine 104 also may rank the tokens based on how frequently associated columns have been accessed in prior search queries.

Search engine 104 initiates a search query by sending a search object to a business intelligence server 108 (BI server). Search query and structured search query are used interchangeably below and refer to any combination of text, symbols, operators, commands, instructions, code, or the like or any combination thereof, used for accessing any type of data in database 106.

Search queries may be initiated before, during and/or after search terms are entered into the search field. For example, search engine 104 may send a search object to BI server 108 after the user enters a few characters into user interface 102. Search engine 104 may initiate other search queries and send associated search objects to BI server 108 after additional characters are entered for the user search query.

BI server 108 generates instructions based on the search objects received from search engine 104. In one example, the instructions comprise SQL-like queries. However, other query formats also may be used. Database system 106 sends data back to BI server 108 in response to the search instructions. The search object and associated structured search instructions also may direct database system 106 to perform different operations. For example, the structured search instructions may request database system 106 to join different columns and sum together different data in the columns.

BI server 108 receives data back from database system 106 in response to the structured search instructions and displays the data within user interface 102. As mentioned above, the data may be displayed before the user completes entering a search term. For example, after the user enters the letter R, search engine 104 may identify a revenue token and send an associated search object to BI server 108. BI server 108 may generate structured search instructions based on the search object that retrieve content from database system 106 associated with the revenue token. BI server 108 receives the associated revenue data from database system 106 and displays the revenue data within user interface 102.

A cluster manager 110 manages the configuration and distribution of processes within retrieval system 100. For example, cluster manger 110 may assign user interface 102, search engine 104, BI server 108, and associated backup processes, to different computing devices within retrieval system 100.

Figure 2:
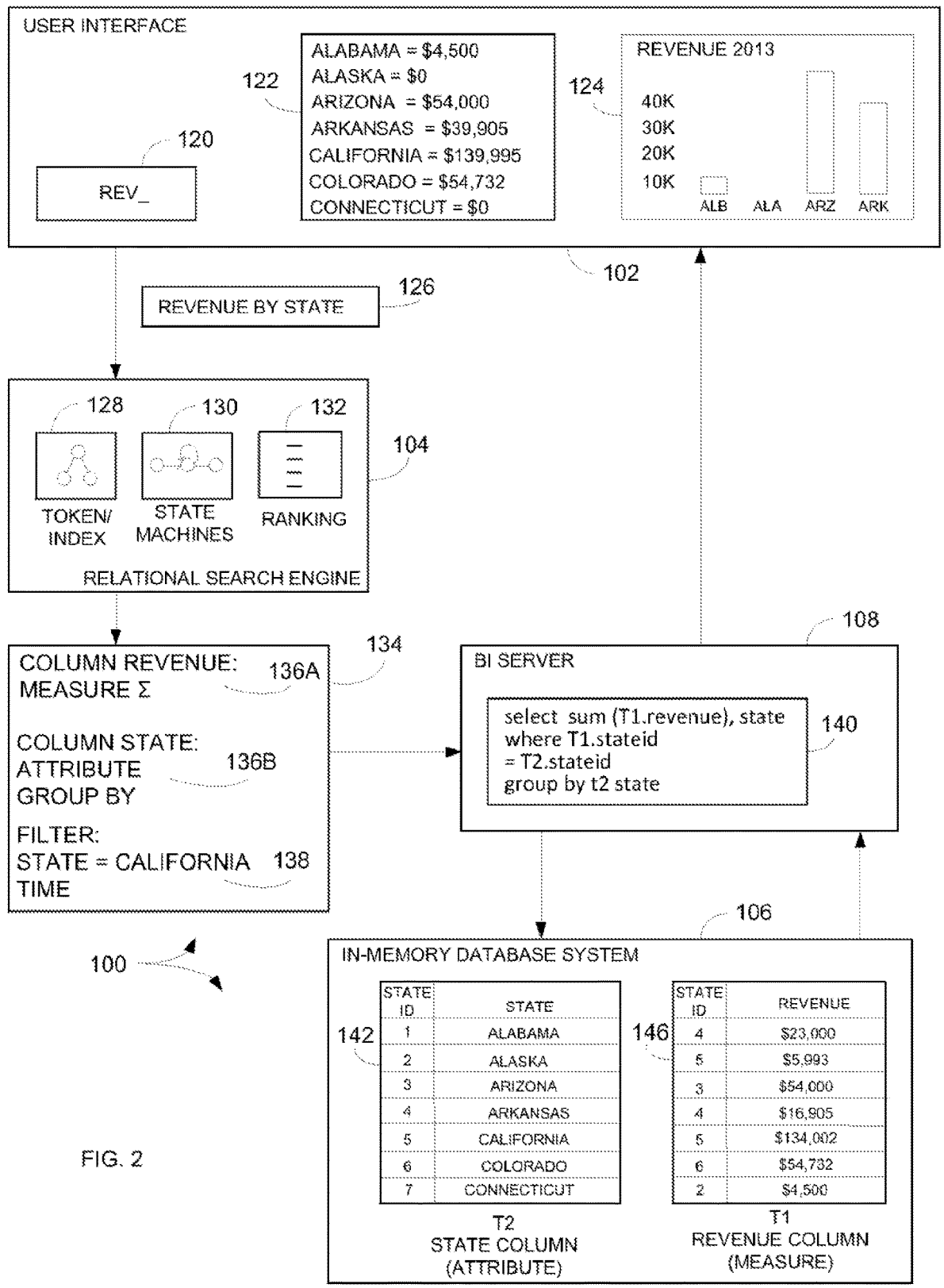
FIG. 2 depicts an example process flow for the information retrieval system.

FIG. 2 depicts in further detail an example of operations performed by information retrieval system 100. A user enters portions of search term 126 into search field 120 of user interface 102. The portions of search term 126 are analyzed by search engine 104. For example, index 128, state machine 130, and a ranking algorithm 132 may analyze each character entered into search field 120. As explained above, based in the data identified in database system 106, search engine 104 may anticipate, predict, suggest, and/or direct the user to available data as the user is entering search term 126.

Search engine 104 may generate a search object 134 for different logic states of search term 126. For example, search engine 104 may generate a first search object 134 after detecting the measure search term REVENUE. The search engine 104 may generate a second search object 134 after the user completes entering the entire search term REVENUE BY STATE. In this example, search object 134 comprises pseudo-code, instructions, text or some other type of message 136A that identifies the matching revenue token associated with measure column 146 in database system 106. Instruction 136A also includes an operator indicating the revenue data should be summed together.

In this example, search object 134 also includes an instruction 136B that identifies the matching state token associated with state attribute column 142 in database system 106. Instruction 136B also includes an operator indicating the revenue data in column 146 should be grouped according to the attributes in state column 142.

Search object 134 may include any other information needed for generating structured search query instructions. For example, search engine 104 may include instructions 138 for filtering the data based on an identified search term. For example, search term 126 may have included the value REVENUE BY STATE=CALIFORNIA. Search engine 104 may generate filter instructions 138 in search object 134 such as:

FILTER 1: STATE=CALIFORNIA.

Search object 134 also may include instructions for displaying the retrieved data. For example, a time value may direct the BI server to plot the retrieved data on a time graph.

BI server 108 operates as a metadata server and as a query delivery server. The metadata server generates relational models that identify the locations and relationships for different tables, columns, and data within database system 106. BI server 108 may generate the relationship models from metadata extracted from the tables, columns, data, and link information in enterprise database. In another example, a system administrator may generate some of the relationship models.

The query delivery server portion of BI server 108 converts search object 134 into structured search instructions 140, sends instructions 140 to database system 106, and delivers the data retrieved from database system 106 to user interface 102. Structured search instructions 140 are based on the table, column, and/or data locations and relationships identified in the relational models. For example, the relational models in BI server 108 may indicate that revenue column 146 is located in a table T1 within database system 106 and state column 142 is located within a table T2 of database system 106. BI server 108 generates structured search instructions 140 that reference the tables T1 and T2 containing columns 146 and 142, respectively.

Search engine 104 may include relational models for determining when queries can be processed. For example, search engine 104 may identify valid tokens that are associated with columns in database system 106. Search terms that do not correspond with valid tokens may be identified as invalid search requests.

In another example, the user may enter the term REVENUE COUNTRY as the query. The search engine may determine the query is invalid because revenue comes from table T1 and country comes from table T2 and there is no relationship that connects table T1 and table T2. Thus, the search engine uses an awareness of the relationships between data elements to improve efficiency and effectiveness of user search queries. In another scheme described below, the user may be able to dynamically map or link together table T1 and table T2 and generate search results for related columns.

Search engine 104 also may use relational models for resolving search ambiguities. A user query comprising valid tokens may potentially map to multiple tables or multiple columns in database system 106. In these examples, search engine 104 may ask the user for more information to disambiguate user search terms or may suggest alternative search terms.

For example, a user may enter the search term PRODUCTS FOR CALIFORNIA. Search engine 104 may determine that a first table or column exists for products sold in California and a second table or column exists for products produced in California. Search engine 104 may query the user to select between products sold and products produced.

Structured search instructions 140 also may include operators that indicate how database system 106 should process the identified data. For example, instructions 140 may include a sum operator that instructs database 106 to sum the data in revenue column 146 of table T1. Instructions 140 also may include a GROUP BY OPERATOR that instructs database 106 to group the revenue data in revenue column 146 of table T1 according to the state names contained in state column 142 of table T2. In one example, search instructions 140 may comprise or be similar to SQL instructions.

BI server 108 displays data retrieved back from database 106 within user interface 102. For example, BI server 108 may display a table 122 that identifies the total revenue for individual states. BI server 108 also may display the same data or different data in different formats, such as within bar graph 124.

BI server 108 may automatically change the format used for displaying data in user interface 102 based on the parameters and dimensions of the associated data in database system 106. For example, state column 142 may have a relatively few number of entries and revenue column 146 have a relatively large number of entries.

BI server 108 may determine that bar graph 124 is the best format for displaying the data from columns 142 and 146 and may determine that the relatively few entries in state column 142 should be displayed on the x-axis of bar graph 124 while the relatively large number of entries in revenue column 146 should be displayed along the y-axis of bar graph 124. Of course BI server 108 may use other formats or criteria for displaying data.

BI server 108 also may display the data based on any filter values 138 identified in search object 134. For example, filter instruction 138 may direct BI server to only display revenue data for California or for a particular year.

BI server 108 may automatically and dynamically suggest additional filters based on the retrieved data. For example, the relational models generated by BI server 108 may identify other columns in database system 106 associated with column 142 and/or column 146. For example, a third column may include the same state identifiers used in columns 142 and 146. The third column may contain zip codes. BI server 108 may display a filter within user interface 102 that allows the user to filter the retrieved data by the different zip codes contained in the third column.

Figure 3:
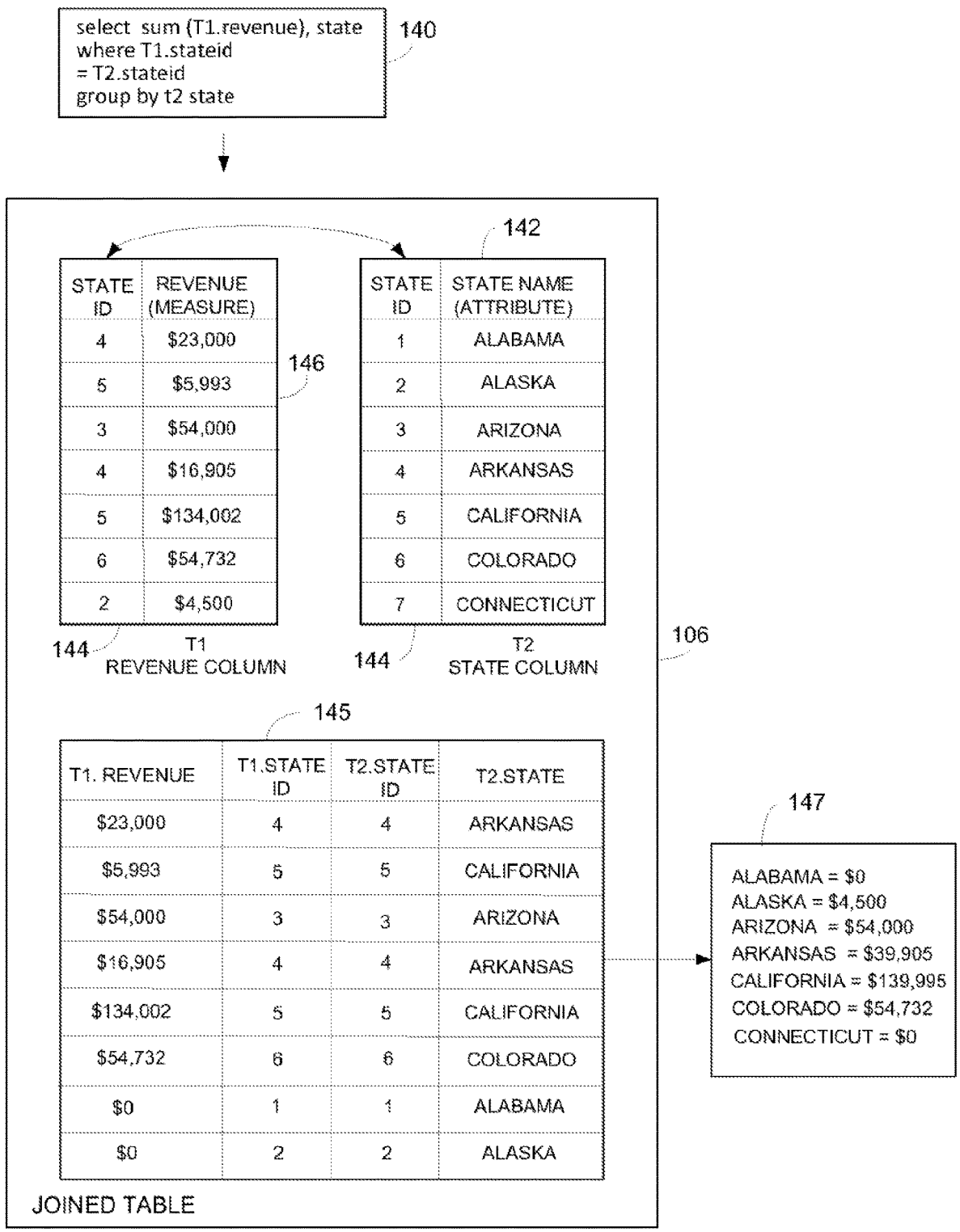
FIG. 3 depicts an example of how data columns are joined in the database system.

FIG. 3 depicts an example of how database system 106 may join revenue column 146 from table T1 with state column 142 from table T2 in response to structured search instructions 140. Database system 106 may join columns 146 and 142 by appending rows with common state identifiers 144. For example, the second row of state column 142 may include state identifier 2 associated with the attribute Alaska. The seventh row of revenue column 146 also may include the state identifier 2 associated with the measure $4,500. Database system 106 may join the data contained in the second row of column 142 in table T2 with the data contained in the seventh row of column 146 of table T1.

Database system 106 then may sum and group the joined columns based on operators in structured search instructions 140. For example, database system 106 may group together all revenue data associated with California state identifier 5 and sum the group of data together to generate a total of $139,995. Database system 106 may perform similar operations for the other entries in columns 142 and 146 to generate results 147. Database system 106 sends results 147 back to the BI server and the BI server then displays the results within the user interface.

Joined table 145 may be cached by a particular database coordinator operating in database system 106. The database coordinator that computes the final result may insert the results into the cache. If the BI server issues the same query to the same database coordinator, the BI server may receive the previously cached results. The BI server also may cache some results or may cache responses provided to the user interface instead of caching database query results.

Figure 4:
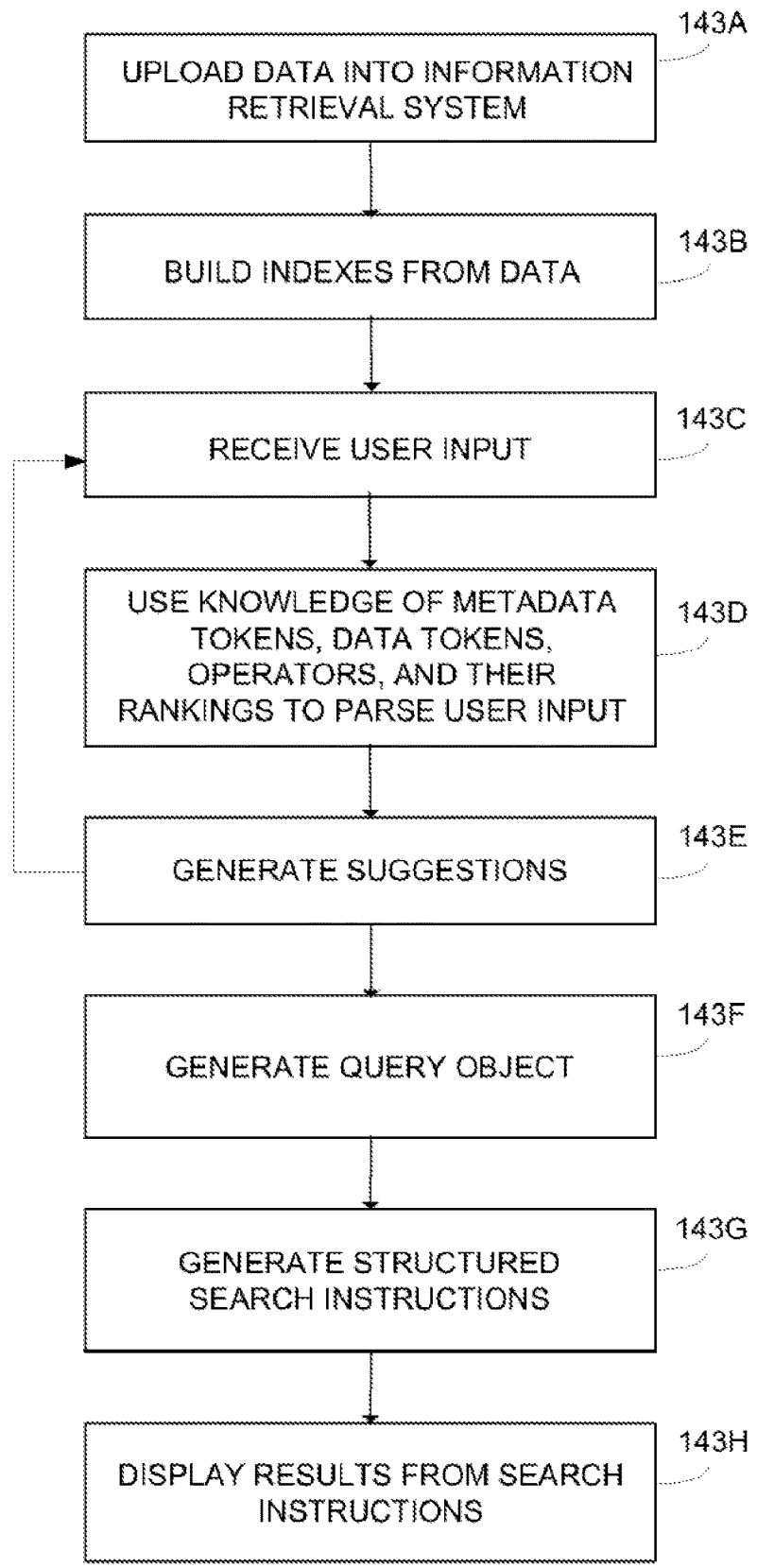
FIG. 4 depicts an example process for generating structured search instructions from ad-hoc user inputs.

FIG. 4 depicts an example process for retrieving structured relational data based on unstructured user inputs. Operation 143A loads data into the information retrieval system. As mentioned above, the data may comprise any combination of structure relational data, and/or non-structured data.

Operation 143B identifies data, columns, attributes, measures, values and any other information associated with the data. Metadata tokens and data tokens are generated based on the identified data and used for building indexes.

Operation 143C receives a user input. The user input may comprise one or more characters or any other input entered into the search field of the user interface. Operation 143D uses the knowledge of the metadata tokens, data tokens, operators and their rankings to parse the user input. Operation 143E may generate suggestions based on the parsed user input.

Operation 143F generates a query object based on the parsing of the user input. For example, a first character of the user input may match a first character of four different tokens. Operation 143F may generate a query object that requests the column data associated with all four tokens. The query object may identify the tokens and identify token classifications, such as an attribute, measure, or value. The query object also may identify operators such as, a group by operator, a summation operator, a standard deviation operator, an average operator, or a count operator.

Operation 143G generates structured search instructions based on the query object. For example, operation 143G may identify the tables and columns in the database system associated with the tokens identified in the search object. The structured search instructions retrieve and join the data in the identified tables and columns. The structured search instructions also may instruct the database system to perform functions identified by the operators in the search object.

Operation 143H may display the data received back from the database system. For example, operation 143H may display a sum for all revenue in the revenue column and may display tokens associated with each entry in the state column. Selection of a state token may display the revenue for the state associated with the selected token. Operation 143H may identify multiple columns associated with the search query. All columns may be ranked based on cardinality and usage. The data and/or tokens associated with the highest ranked columns may be displayed in the user interface Search Engine FIGS. 5-7 show inputs and responses received and generated by the search engine. The search engine may receive a natural input, such as "how many people live in America". For natural language inputs, natural language algorithms may extract relevant information and map the information to a more structured form. The input also may be structured, such as "count of social security numbers, country=America."

The search engine may provide sophisticated spell correction. For example, if the input is CALP, the search engine provides feedback asking if the input should really be CLAP. After analyzing and recognizing the input, the search engine may provide additional guidance. For example, the search engine may provide some indication of possible additional search terms.

Different search terms may be correlated to determine the correct search query. For example, if the user input includes the words Dublin and California, the search engine may determine that the search is related to Dublin Calif. and not Dublin Ireland.

The search engine may provide prefix completions. For example, if the input is currently CAL, the search engine may automatically complete the input to CALIFORNIA. The search engine can also provide suffix completion. For example, if the input is currently PAL, the search engine may complete the input with PRINCIPAL.

The search engine may complete the phrase and/or provide a ghost term completing the search term. For example, the user may type in REVENUE. The search engine complete the input with REVENUE FOR STATE=CALIFORNIA.

The search engine also may anticipate what may come after a properly entered input and query the user. For example, for the input REVENUE FOR CALIFORNIA, the search engine may ask DO YOU WANT QUARTLY REVENUE FOR CALIFORNIA? Thus, even with a correct and complete input, the search engine still may provide additional guidance for accessing other available and related information.

If an input is not recognized, the search engine may provide intelligent analysis to determine the error. If an input cannot be matched with stored data, the search engine may provide suggestions of what should be typed or ask questions about the input. For example, the search engine may provide feedback "This doesn't make sense, did you mean this?" Certain keywords are part of the search engine language. If these keywords are used incorrectly, the search engine may provide suggestions for the correct usage of the keyword, phrase, or language construct.

The search engine also may generate a query for ambiguous inputs. For example, a transaction table may have data associated with an order date and a ship date. The input may request REVENUE BY YEAR. The search engine may resolve the ambiguity by asking the user if they want revenue data based on order date or ship date. The search engine also may sort out inconsistent data. For example, the input may include year=1980. Since there were no smart phones for sale in 1980, the search engine may filter out tokens and data from the search query related to smart phones.

The search engine may perform unstructured text searches. For example, the database system may include unstructured data, such as employee notes, in addition to the structured data. The search engine may perform a keyword search for any other unstructured data.

The search engine allows the user to select different join paths. For example, the search engine may allow the user to select which columns in which tables are associated with different search terms. The search engine then may generate a worksheet table containing the selected mappings.

Inputs

Figure 5A:
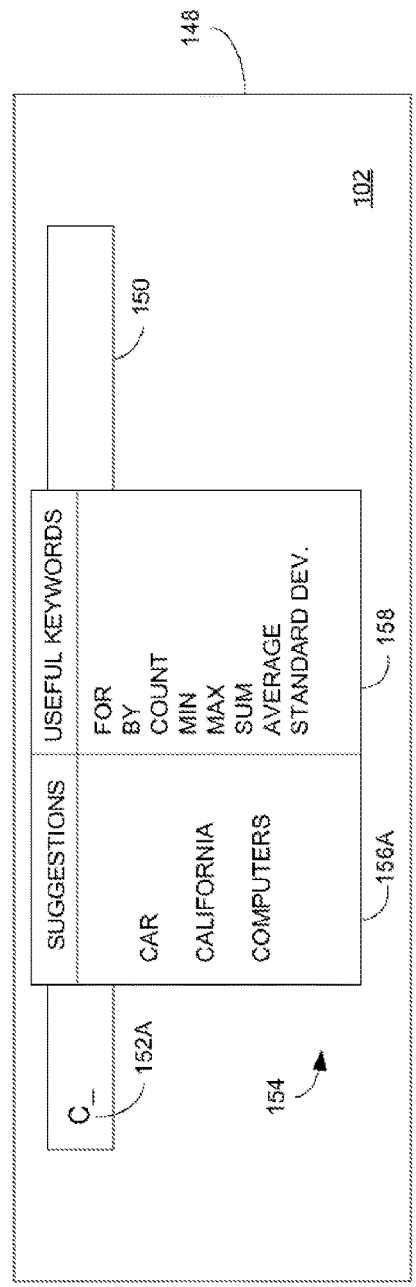
FIGS. 5A-5C depict example inputs entered into the search engine.

FIG. 5A depicts an example of inputs entered into a user interface 102 operated by the information retrieval system. This is just one example of a variety of different ways search terms may be entered and feedback presented to a user. User interface 102 may display an electronic page 148 within a web browser or other mobile or desktop application. A user may use computing device 114 in FIG. 1 to enter a search term 152A into a search field 150 within electronic page 148.

The search engine may display a menu 154 including a first list of tokens 156A alternatively referred to as suggestions. Menu 154 also may include a second list of operators 158 alternatively referred to as useful keywords. The search engine may display some tokens 156A as soon as the user mouse clicks within search field 150 and before the user enters any characters into search field 150. For example, an initial set of tokens 156A may be associated with the most frequently used search queries or the most frequently accessed data.

Operators 158 may determine how search results are retrieved and displayed. A FOR operator 158 may direct the retrieval system to retrieve and display data for a particular attribute or category of search data, such as REVENUE DATA FOR CARS. A BY operator 158 may direct the retrieval system to group an identified category of search data by a particular sub-category, such as REVENUE BY YEAR.

If operators are not specified, the retrieval system may automatically figure out the operator from the context. For example, the user may enter the search terms REVENUE STATE. The retrieval system may interpret the search term as REVENUE BY STATE since state is the name of a column. In another example, the user may enter the search term REVENUE CALIFORNIA. The retrieval system may interpret the search term as REVENUE FOR CALIFORNIA since California is a value in a column and is not the name of the column.

Operators 158 also may include mathematical functions. For example, a count operator 158 may direct the retrieval system to display the number of an identified type of data, and minimum and maximum operators 158 may direct the retrieval system to display minimum and maximum values for the data, respectively. A summation (sum) operator 158 may direct the retrieval system to add up a total value for the data, an average operator 158 may direct the retrieval system to calculate an average value for the data, and a standard deviation (std. dev.) operator 158 may direct the retrieval system to calculate a standard deviation for the data. The retrieval system also may use other types of operators 158.

The retrieval system may repeatedly update tokens 156A in response to any combination of characters or terms entered into search field 150. For example, the user may initially enter the character C into search field 150. The search engine may identify and display a first set of tokens CAR, CALIFORNIA, and COMPUTERS. Simultaneously, the search engine may initiate a structured search query for data in the database system associated with the displayed tokens.

The user may enter a second character A into search field 150. The search engine may identify and display a new second set of tokens CAR and CALIFORNIA. At the same time, the search engine may refine the previously structured search query for data in the database system associated with the second set of displayed tokens.

Figure 5B:
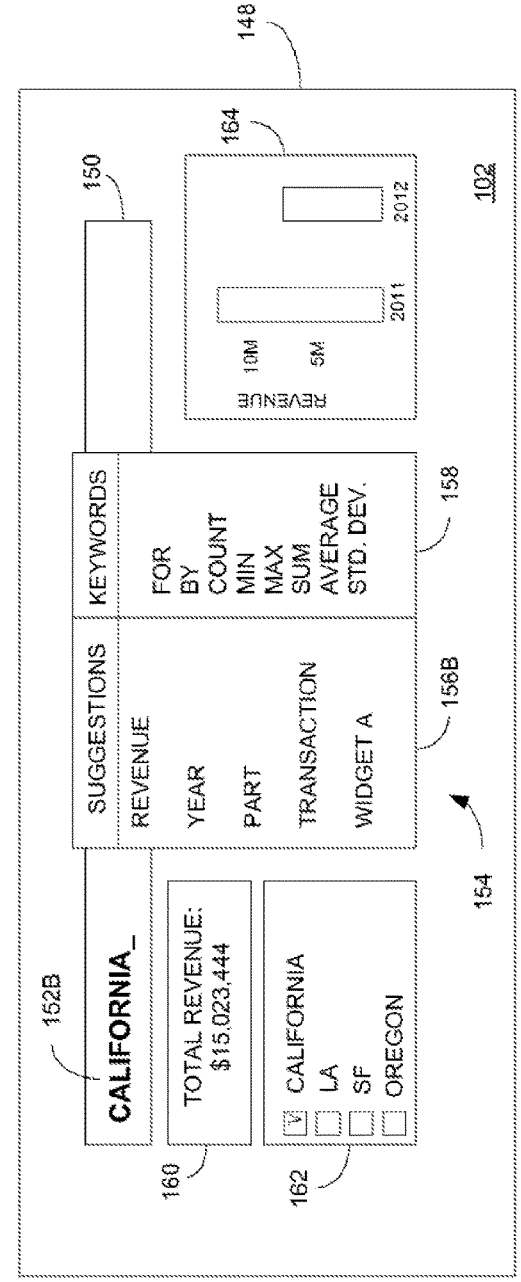

FIG. 5B shows another state of user interface 102 after a user has completed entry of a search term 152B. The user may type in search term 152B or the user may have selected the associated CALIFORNIA token 156A previously displayed in menu 154 of FIG. 2A. The retrieval system may initiate another search in response to the user entering the complete CALIFORNIA token into search field 150.

The retrieval system may automatically update tokens 156B to correspond with search term 152B. For example, columns in the database system associated with tokens 156B may be linked to the column in the database system associated with the CALIFORNIA token. For example, REVENUE, YEAR, PART, TRANSACTION, AND WIDGET columns in the database system may be linked to the CALIFORNIA column in the database system. The retrieval system may display tokens 156B associated with the REVENUE, YEAR, PART, TRANSACTION, AND WIDGET columns.

The retrieval system may rank tokens based on the state of the search query, data usage, cardinality, or user preferences. For example, the retrieval system may have identified dozens of tokens associated with the CALIFORNIA token. The retrieval system may have given the REVENUE token 156B a highest ranking. Accordingly, the retrieval system may display the REVENUE token 156B in menu 154 and may display associated revenue data for the state of California within a graph 164. The retrieval system also may display total revenue for the state of California within a display box 160.

The retrieval system also may display filters 162 based on the data associated with search term 152B. For example, filters 162 may identify other revenue data associated with other geographic regions.

Figure 5C:
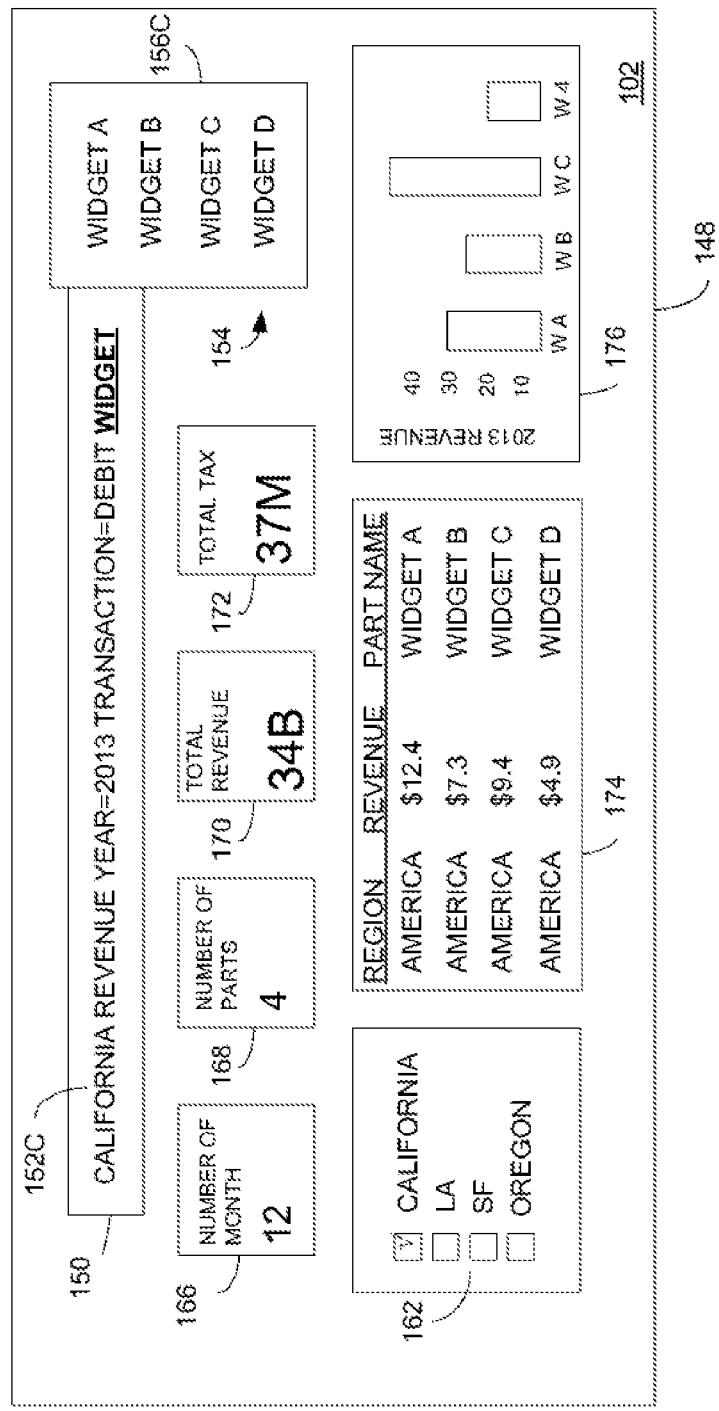

FIG. 5C depicts yet another state of a user search query where additional parameters have been added to form search term 152C. For example, a year value, a transaction value, and a product type have been added to search term 152C. The retrieval system may identify a new refined set of tokens 156C and also refine the search query and/or the displayed data in response to the additional parameters in search term 152C. For example, the retrieval system may display the revenue data for California, for year 2013, for debit transactions, and for different types of widgets.

The retrieval system also may display a time period 166, a number of parts 168, a total revenue 170, and a total tax 172 within a headline view associated with search term 152C. Of course these are only examples of any data that may be extracted from the database system and displayed within user interface 102. The retrieval system also may display other tables 174 and graphs 176 associated with the retrieved data.

In one example, the retrieval system may automatically determine a best format for displaying the data. For example, the data associated with a search term may comprise a large range of values for a limited number of attribute categories. The retrieval system may decide a bar graph similar to graph 176 is the best way to display the data.

The retrieval system may determine the number of measures, number of attributes, and number of values associated with the data and present data based on these data dimensions. The retrieval system may use other formats for displaying data, such as bubble charts, line graphs, pie charts, or the like, or combinations thereof, based on the dimensions of the associated tables or columns in the database system.

Guidance

Figure 6A:
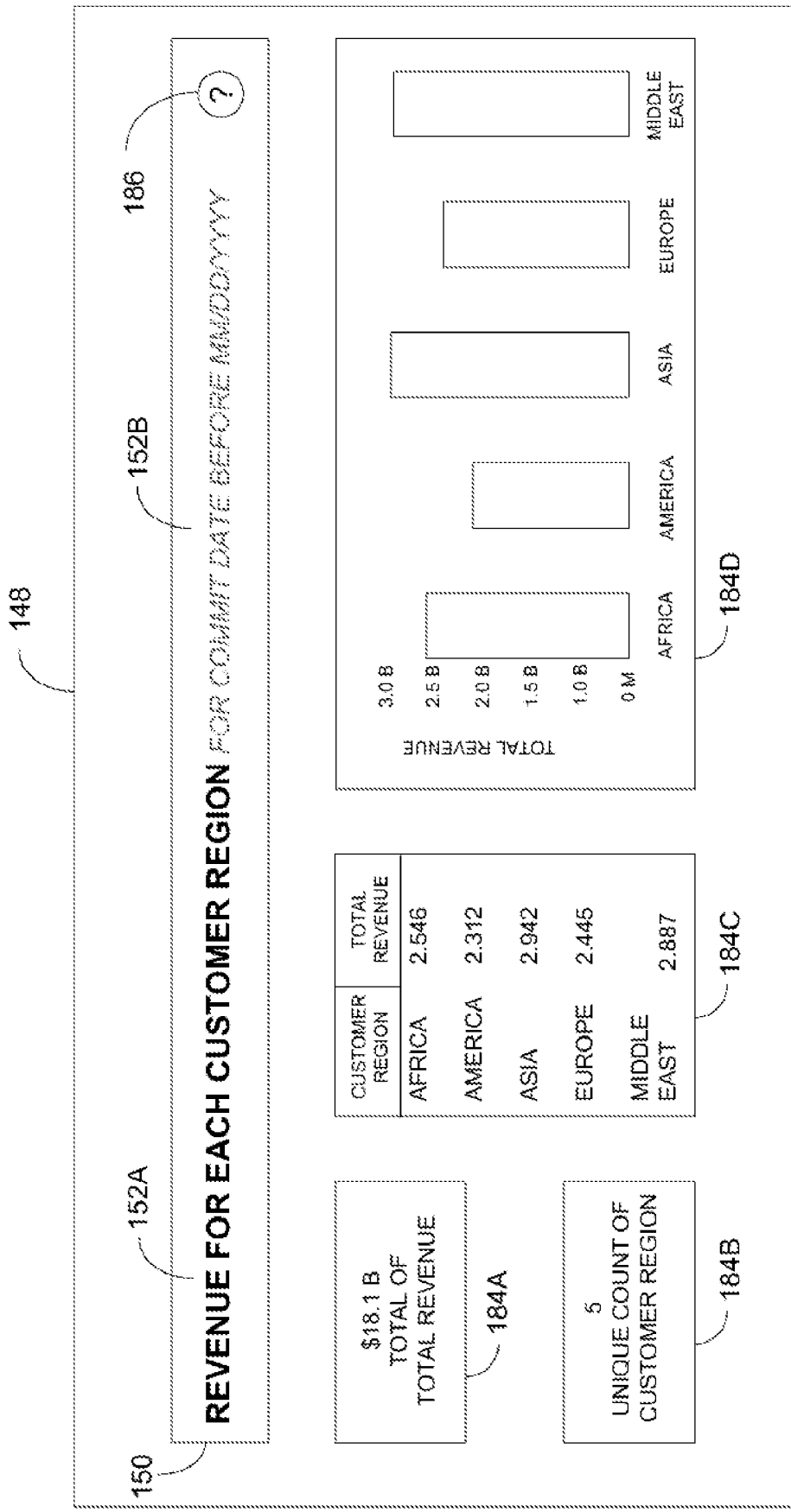

FIG. 6A depicts another example of how the search engine may suggest, predict, and/or complete search terms. The user may enter a search term 152A and the search engine may complete the input with search term 152B. For example, the user may enter the search term REVENUE FOR EACH CUSTOMER REGION. The search engine may determine that revenue data associated with the search term includes associated commit order dates. The search engine may complete the search term by adding FOR COMMIT DATA BEFORE MM/DD/YYYY. The search engine may display additional search term 152B in a different font, color, and/or image intensity to represent the portion of the input added by the search engine.

The search engine may generate a search request obtaining data 184B identifying the unique number of customer regions and data 184C identifying the total revenue for each of the identified customer regions. The search engine may automatically generate a bar graph 184D also displaying the total revenue for each of the identified customer regions. The search engine also may sum the revenue for all of the different regions and display the results as total revenue 184A.

Figure 6B:
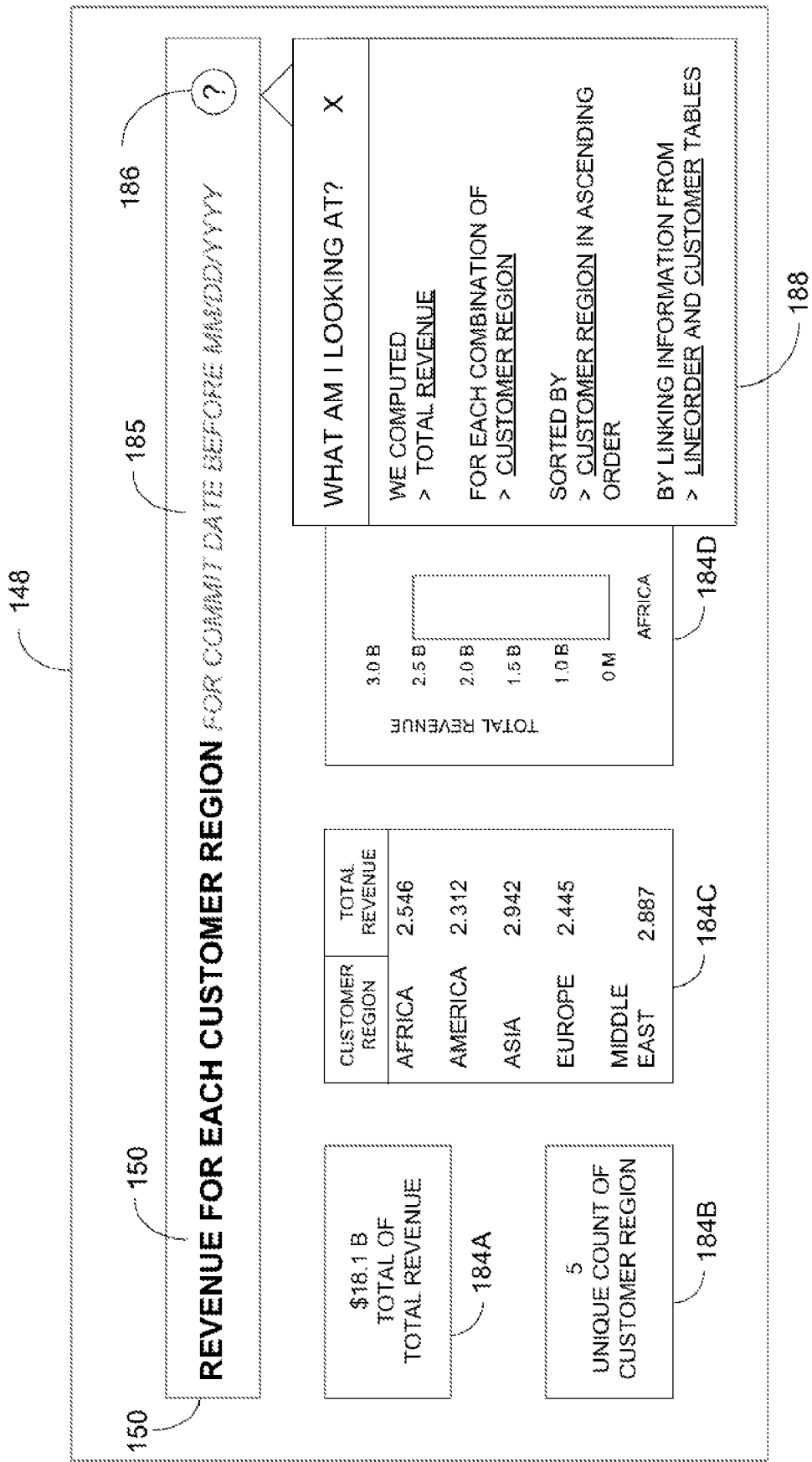

FIG. 6B depicts one example of how the search engine provides explanations regarding data 184. An inquiry icon 186 is displayed in search field 150. In response to selection of icon 186, the search engine displays information box 188 explaining how revenue data was computed for each customer region and then sorted in ascending. Information box 188 further explains that the revenue information was generated by linking data from a line order table with data in a customer table. In this example, the columns and/or tables containing the data are underlined in information box 188

FIG. 6C shows another example of how the search engine may suggest additional search terms based on a partial search term 152. The search engine may identify tokens and/or operators 192 matching with the partial search term 152. For example, the search engine may identify tokens matching the partial input MICHAEL JAC. The search engine also may identify other attributes, measures, values and/or operators associated with the identified tokens. The search engine displays tokens 192 along with the other parameters in menu 190 as suggested or completed search terms.

Error Messages

The search engine uses state machines, indexes, and the content of data to perform a structured analysis of the search terms. For example, the search engine may identify search terms as measures, attributes, values, and operators and determine a correct sequence of the search terms based on these characteristics of the search term. The search engine may identify valid data associated with the search term and may determine that the search term is not valid for a current state of the search term. The search engine also may provide suggestions for correct search terms to add to the current state of the search input.

Figure 7A:
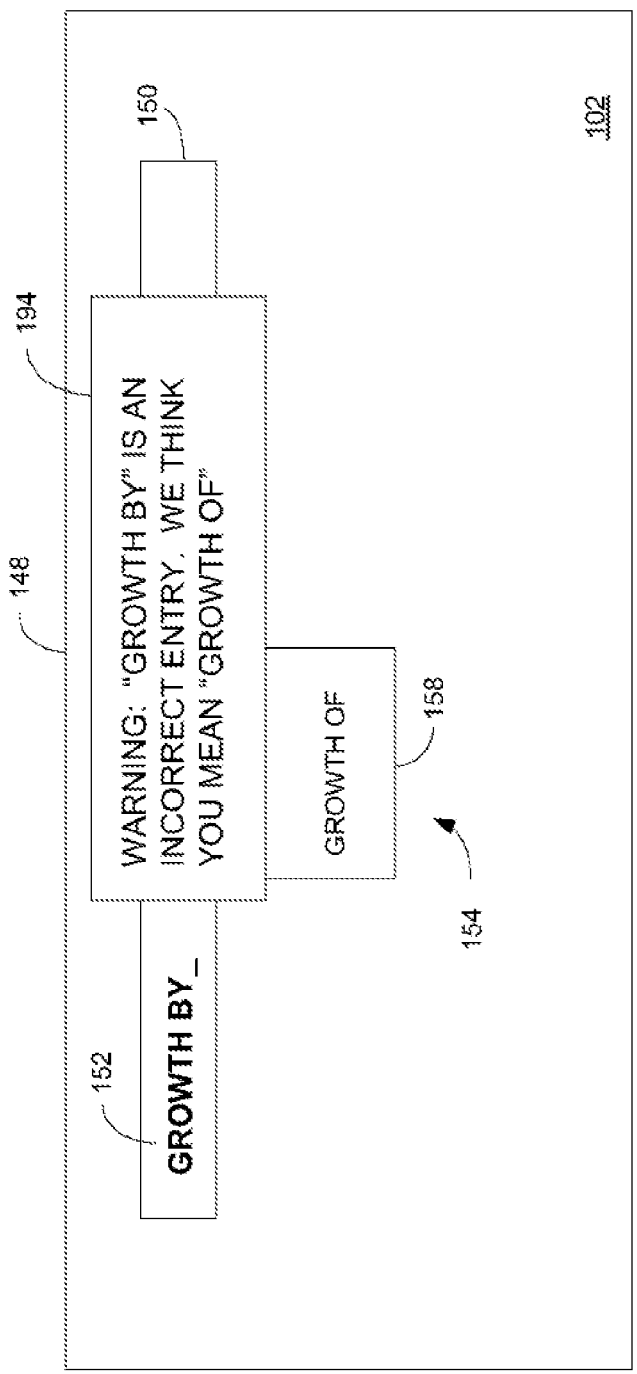
FIGS. 7A-7B depict example error messages generated by the search engine.

FIG. 7A depicts an example error message 194 generated by the search engine. The search engine may generate different error messages based on both the understood tokens and the unrecognized words in the search term. In this example, the search engine generates error message 194 in response to the search term GROWTH BY. OF may be the only valid input after GROWTH. The search engine may generate error message 194 identifying the incorrect input and suggesting a correct input for that particular state.

Figure 7B:
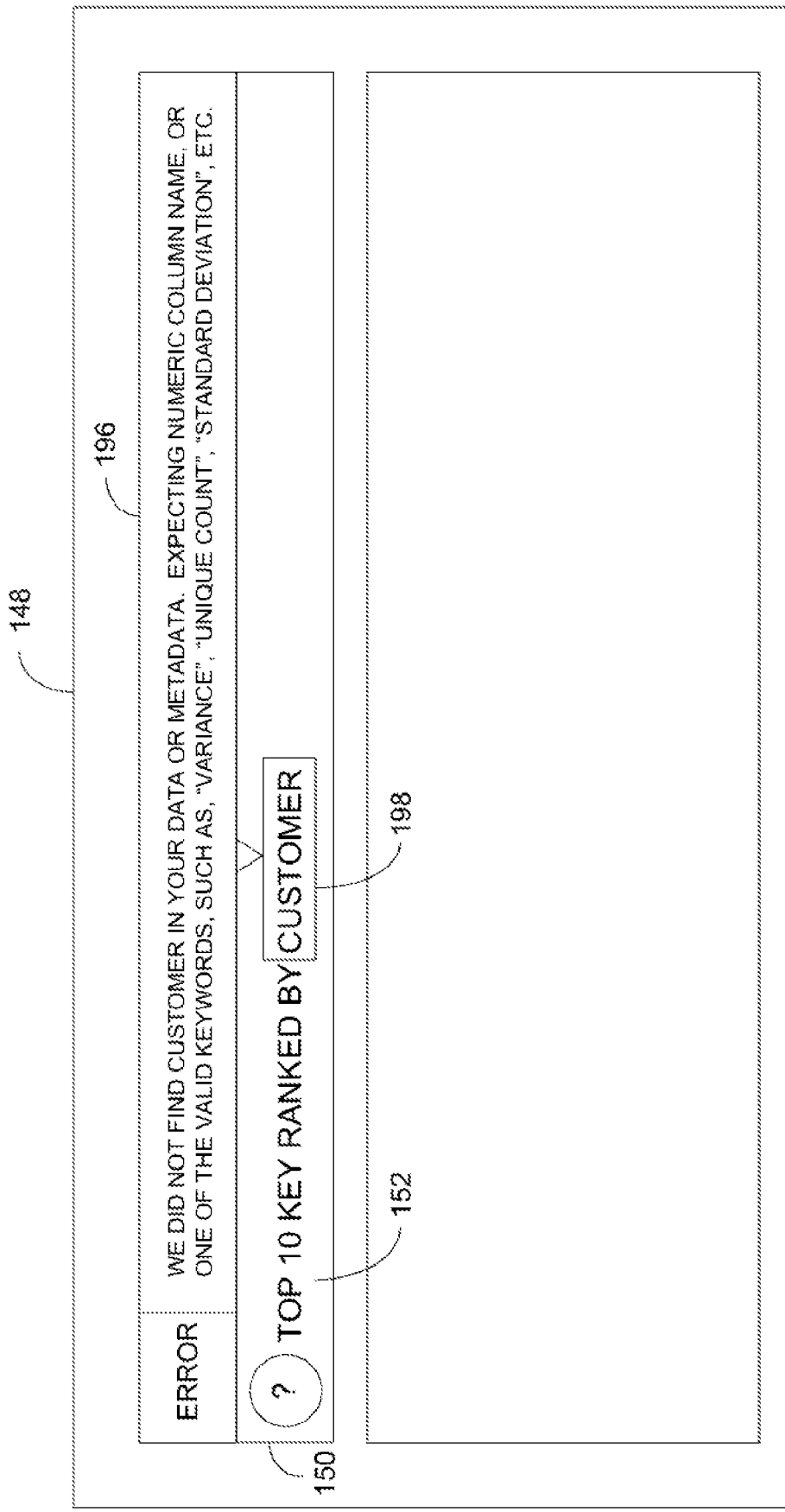

FIG. 7B shows another example error message generated by the search engine. In this example, error message 196 explains that the search engine could not find customer data metadata associated with search term 198. Error message 196 also indicates search term 198 was expected to be either a keyword or a numeric column name.

Error messages may be generated in a variety of different ways. One scheme may provide error messages for different keywords. The search engine checks rules associated with the error messages that indicate where or how keywords should be used in a search term. The search engine displays the associated error message when the keyword is located in the wrong location or used in the wrong syntax within the search term. The error message may identify the current incorrect location of the keyword and the expected correct location of the keyword. For example, the error message may state: THE KEYWORD TOP IS LOCATED AT THE END OF YOUR SEARCH BUT WAS EXPECTED AT THE BEGINNING OF THE SEARCH.

The state machines may branch to different error messages based on the state of the search. For example, an acceptable search term may be MEASURE BY ATTRIBUTE. However, the entered search term may comprise MEASURE BY MEASURE. The search engine may include a state machine that branches to an associated error message in response to receiving the second measure.

The search engine also may identify a current state of the search, determine all acceptable inputs for a next state, and generate error messages based on the analysis. For example, the search engine may generate an error message: YOU COULD HAVE TYPED A NUMERIC ATTRIBUTE OR TYPED "GREATER THAN (>)" BUT YOU DIDN'T AND ACTUALLY TYPED AN INPUT THAT WE DO NOT UNDERSTAND.

The search engine may determine the meaning or type of search term by searching through tables and columns. The search engine may generate an error message when the type of search term does not correlate with a current state of the search. For example, the search engine may generate the error message: THE WORD YOU TYPED IS ACTUALLY A CUSTOMER NAME, BUT WE WERE EXPECTING A COLUMN NAME.

In another example, the user may enter the search term REVENUE FOR TAX BEFORE. The token BEFORE may be a valid keyword for date but not a valid floating operator. The search engine may generate the error message: THE KEYWORD "BEFORE" IS ONLY APPLICABLE WHEN PRECEEDING A DATE COLUMN. TRY ENTERING AN OPERATOR, SUCH AS=, <, >.

The user may enter the keyword AND. The acceptable types of token entries for the current state may be attribute, measure, or value tokens. The search engine may generate a generic error message: THE WORD "AND" DOES NOT MAKE SENSE.

In another example, the user may enter STATE as a search term. The search engine may generate the helpful hint message: YOU TYPED IN "STATE" YOU CAN NOW TYPE IN "=" OR ANOTHER COLUMN NAME.

In another example, the user may enter a search term SUM REVENUE >100. The search term may be invalid and the user may be trying to sum up all of the rows of a revenue column that are greater than the value 100. The search engine may generate the error message: WE DON'T SUPPORT THIS SYNTAX. YOU COULD TRY ENTERING "SUM REVENUE, REVENUE >100".

In another example, the user may input the search term, REVENUE FOR CUSTOMER CITY MEERUT. The city MEERUT may not exist in any index. The search engine 104 may display a message saying: "MERRUT" DOES NOT EXIST IN THE DATABASE SYSTEM.

Thus, the search engine generates different categories of error messages based on the semantics of the search term that help the search engine understand/predict what the user was trying to search. The search engine then generates context sensitive messages that guide the user back on a correct search path.

Security

For security reasons, the search engine might not display certain tokens and/or associated data to certain users. The search engine may provide both row level security and object level security. Row level security, for example, may restrict a salesman in the state of California to only viewing transactions in a sale table related to the state of California. Object level security, for example, may restrict a user from viewing all transactions from the sales table or from particular columns of the same table.

In another example, a salesmen may only be authorized to view sales figures under a certain amount. In yet another example, human resources personnel may be authorized to view employee work history data but may not be authorized to view sensitive company financial data.

The search engine not only limits what data is displayed to different users but also restricts which tokens are displayed to the users. Tokens may identify columns of data that some users should not know exists. For example, the tokens may identify companies, people, products, locations, transactions, etc. in the database system that should be kept confidential.

The tokens and associated data may be assigned security values. The tokens associated with the data may be assigned a particular security flag that only allows access by managers. The search engine compares a security tag for the user with the security flags assigned to the data and tokens. If the two security identifiers do not match, the token and associated data will not be displayed to the user.

Ranking

Tokens may be ranked based on different parameters, such as usage. Some columns may be used more than others. For example, a STATE column may be used more than a SALARY column. Based on usage, the search engine may determine which columns/data are more likely to be requested. The search engine then ranks the tokens associated the columns based on the most likely data associated with the user.

Ranking also may take into account the sequence of tokens associated with the search terms. For example, the STATE column may be used more often than the SALARY column. However, the sequence or combination of the SALARY column and a REVENUE column may be used more frequently than a combination of the STATE column and the REVENUE column. Therefore, when the term REVENUE is previously entered into the search field, a next SALARY token may be ranked higher than a next STATE token.

The tokens also may be ranked based on the context of the search term, such as based on a search term being an attribute, value, or measure. The search engine also may rank tokens based on the cardinality of the associated columns. For example, a column #1 may identify 10 million products for the state of California. A column #2 may identify 50 states that include the state of California. If the user enters the search term CALIFORNIA, the search engine may display the list of states in column #2, since the answer may have a better chance of being associated with one of the 50 states versus being associated with one of the 10 million products in column #1.

Figure 8:
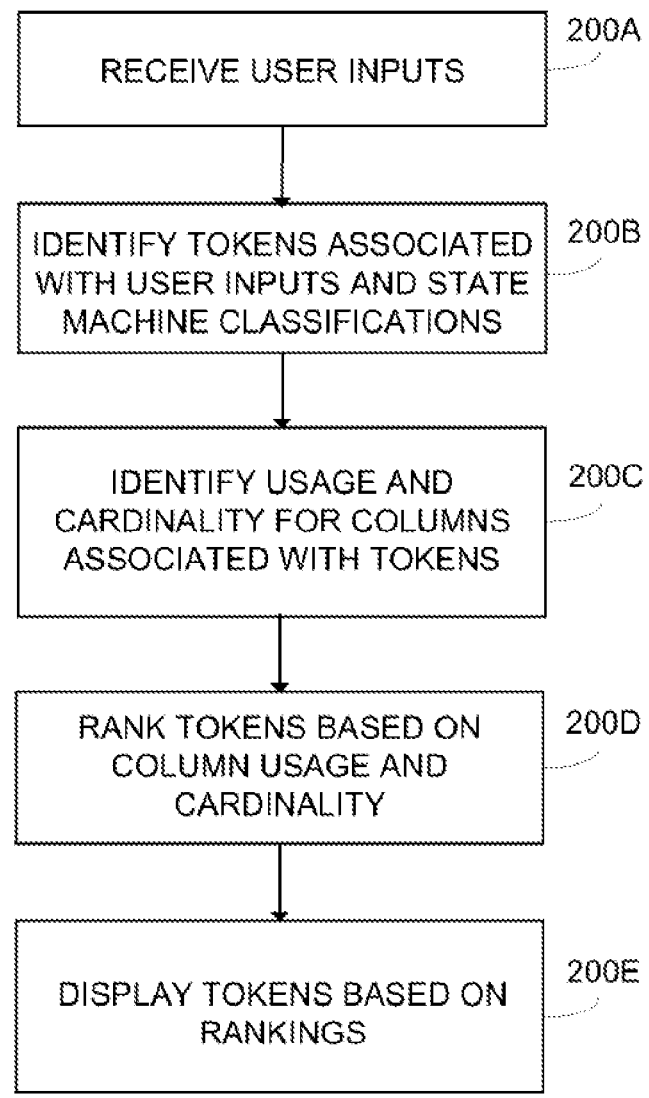
FIG. 8 depicts an example process for ranking and displaying tokens.

FIG. 8 depicts an example process for ranking tokens. Operation 200A receives the user inputs. Operation 200B identifies tokens associated with the user inputs. As explained above, tokens may be identified based on similarities between the characters in the user inputs and the characters in the tokens and the attribute, measure, and value classifications of the tokens. For example, the state machine may require the first search term to be an attribute. Operation 200B may only compare tokens classified as attributes with the first portion of the user input. Operation 200B may query the user for a clarification if the user input is ambiguous.

Operation 200C identifies the usage and cardinality of the columns associated with the identified tokens and operation 200D ranks the tokens based on the usage and cardinality. Operation 200D displays the tokens based on the rankings. For example, the highest ten ranked tokens may be displayed to the user.

Figure 9:
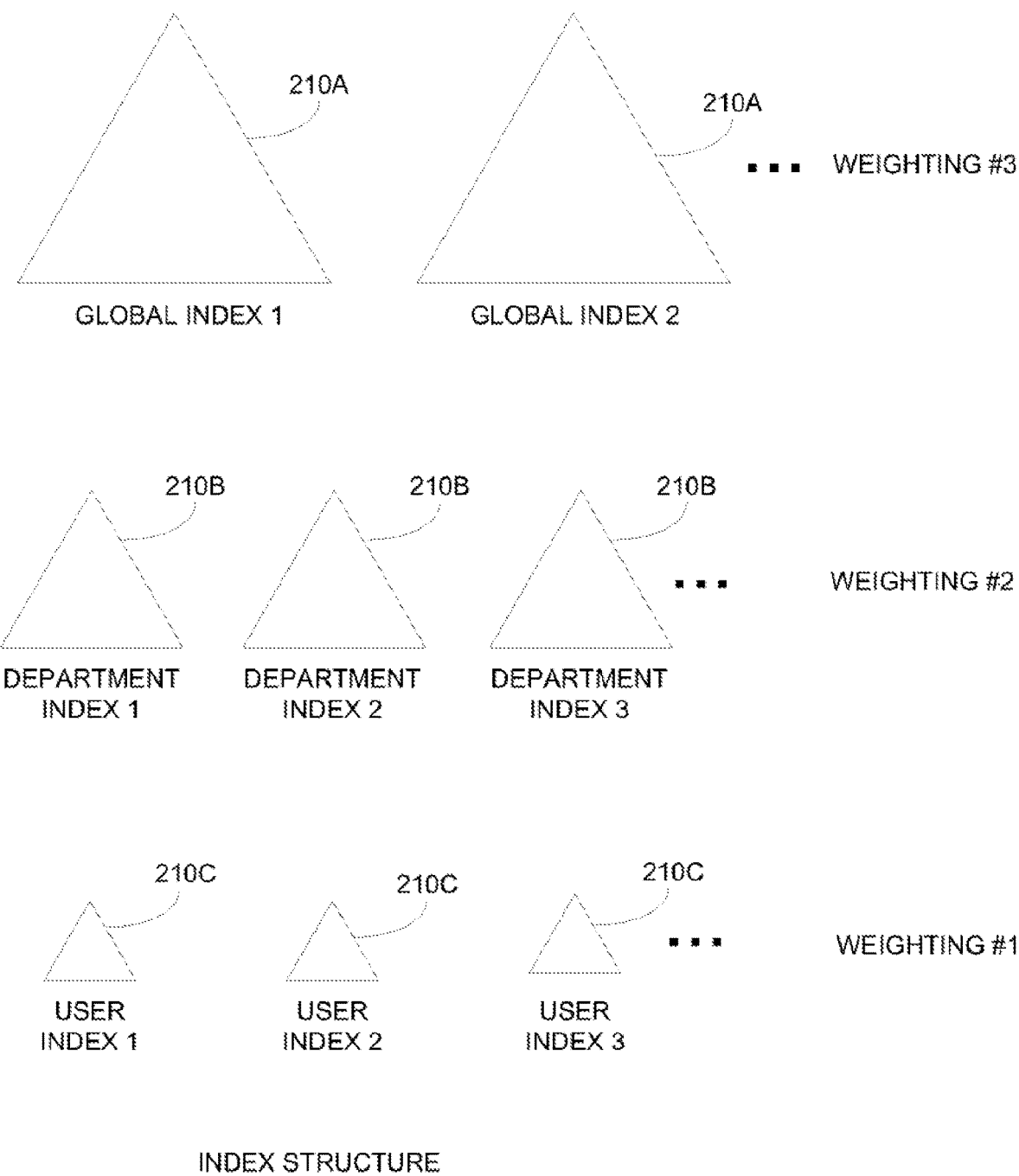
FIG. 9 depicts example indexes having different token weightings.

FIG. 9 depicts examples of different indexes that the search engine may use for ranking tokens. For example, indexes 210A may be global indexes that track token usage for all users of an enterprise. Indexes 210B may be department indexes that track token usage for different departments within the enterprise. A first department index 210B may track token usage for a group of users associated with the sales department and a second department index 210B may track token usage for a group of users associated with the finance department. User indexes 210C may track token usage for individual users of the enterprise.

Indexes 210A, 210B, and 210C may have different token scores for different tokens. A California token may have a highest score in global index 210A based on usage from all users. For example, the California token, and/or the data associated with California token, may have been displayed and/or selected by users of the enterprise more than any other token. However, the group of users in the legal department may have selected a different token more often than the California token. Accordingly, the tokens in global indexes 210A may have different token scores than the tokens in legal department index 210B.

Token scores in user indexes 210C may be different from token scores in global indexes 210A and department indexes 210B. For example, a user responsible for sales in Colorado may select a Colorado token more often than a California token. Accordingly, the Colorado token in user index 210C associated with the user may have a highest token score.

The search engine may rank tokens based on the token scores in indexes 210A, 210B, and 210C. The search engine may identify one or more department indexes 210B and a user index 210C associated with the user. The search engine may identify the indexes 210A, 210B, and 210C associated with the user and identify tokens in each of the indexes associated with the search term entered by the user.

The search engine then may identify the top ranked tokens in each of indexes 210A, 210B, and 210C based on the associated token scores. Some tokens may be assigned higher weights than other tokens. For example, tokens from user index 210C associated with the user may be given a highest weighting, tokens from department indexes 210C associated with the user may be given a next highest weighting, and tokens from global indexes 210C may be assigned the lowest weighting.

With all else equal, tokens with the highest scores in user index 210C may be ranked higher than the tokens with the highest scores in department index 210B and global index 210A. If the user is associated with a particular department index 210B, tokens identified in the associated department index 210B having a given token score may be ranked higher that tokens in global index 210A with an equivalent token score. Of course, other weighting can be assigned to the tokens scores in the different indexes 210.

Any combination of weightings and ranking criteria may be assigned to the global indexes 210A, department indexes 210B, and user indexes 210C. For example, the top three ranked tokens from each of the indexes 210A, 210B, and 210C may be displayed. This enables the search engine to display a wider variety of tokens from a wider variety of columns.

The search engine may perform another ranking based on the state machines that analyze the search term. Based on a state of the search term, the state machine may determine that one particular category of token is more likely than another type of token.

For example, the user may enter the search term REVENUE BY. The search engine may determine that the next token could either be an attribute or a measure. The state machine also may determine that the next search term is more likely an attribute token than a measure token. For example, the search engine may determine that REVENUE BY STATE is a more likely search term than REVENUE BY AGE. Accordingly, the search engine may rank the state attribute token higher than the age measure token.

Figure 10:
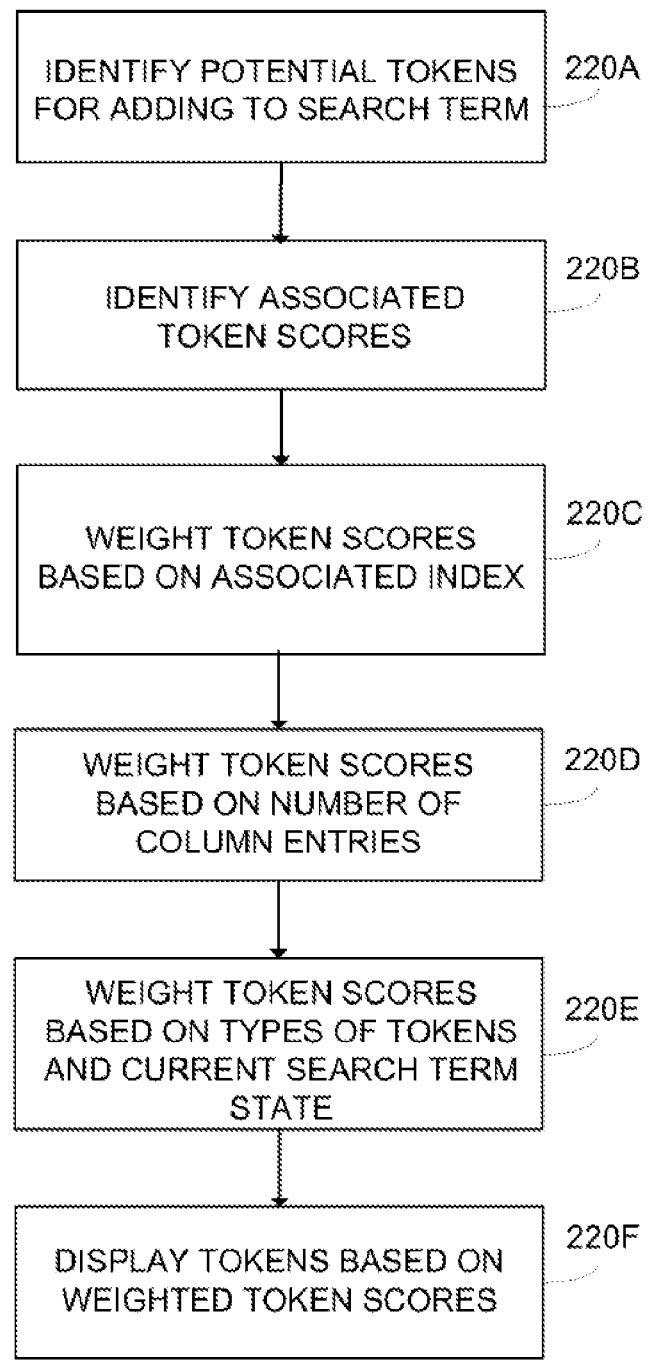
FIG. 10 depicts another example process for ranking tokens.

FIG. 10 summarizes some of the ranking operations used by the search engine for predicting and displaying tokens. In operation 220A, the search engine may identify potential tokens for displaying to the user. For example, based on a user input, one or more indexes may identify matching tokens or other tokens associated with the predicted intent of the user.

Operation 220B identifies the scores for the identified tokens. Not all tokens need to be identified in operation 220A. As mentioned above, a ranked subset of tokens may be identified based on the token scores identified in operation 220B. Operation 220C weights the token scores based on the associated indexes. As mentioned above, token scores from a user index may be assigned a higher weighting that a token score from a global index.

Operation 220D may further weight the token scores based on the token column cardinality. A token associated with a column with few entries may be given a higher weight than a token associated with a column with a large number of entries.

Operation 220E also may weight token scores based on the types of tokens and the current state of the search term. As explained above, the search engine may determine a first token category is more likely than other token categories. The tokens with the first token category may be assigned higher weights than the other token categories. Operation 220F displays tokens to the user based on the associated weighted token scores.

Language State Machine

Figure 11:
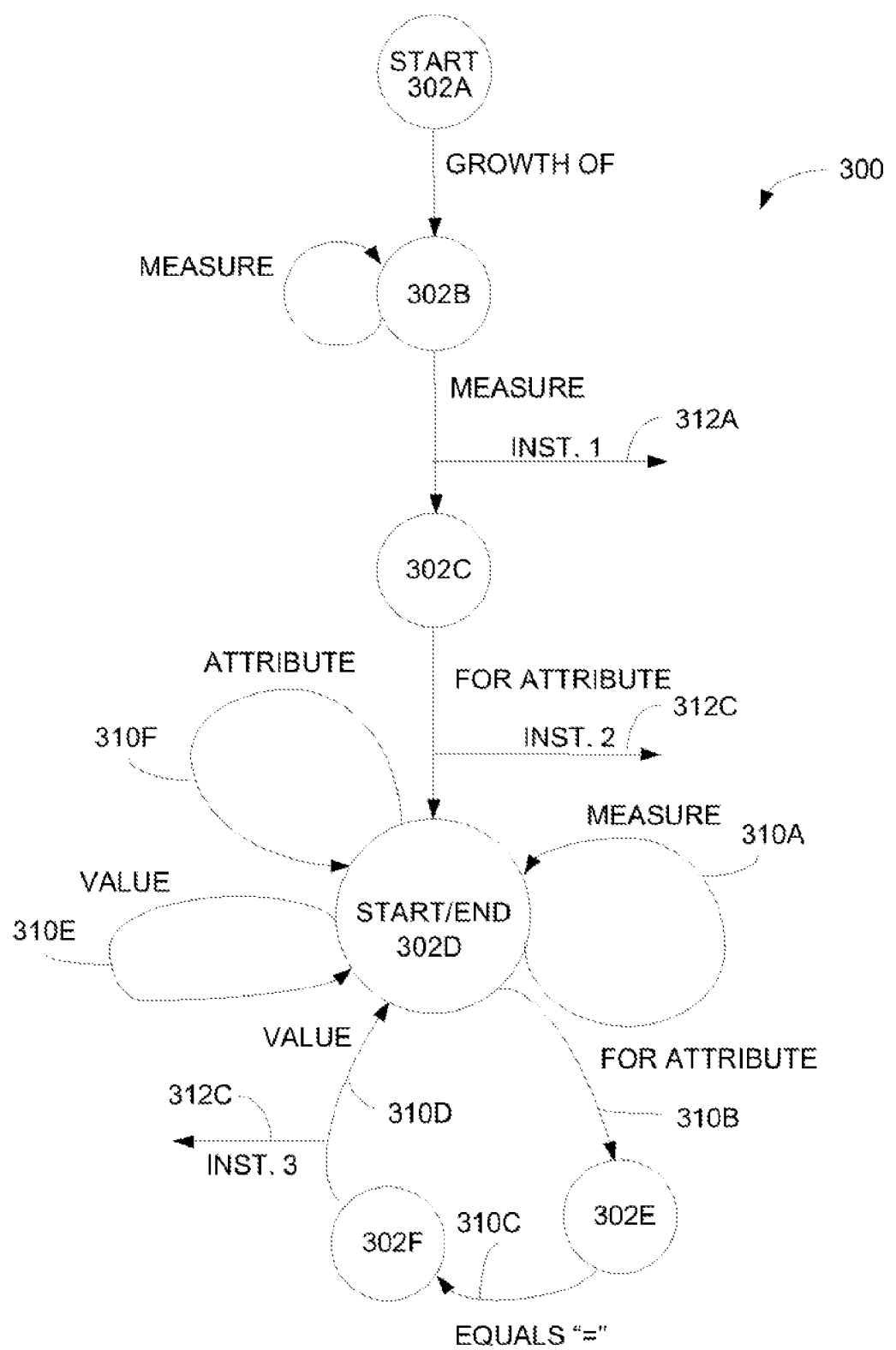
FIG. 11 depicts an example state machine.

FIG. 11 depicts an example state machine 300 used by the search engine. State machine 300 is just one example of almost limitless combinations of functions that may be performed based on any combination of search terms. In one example, state machine 300 identifies valid inputs and any constraints on completion of a search term. State machine 300 generates query instructions from the search term that are then used for performing a structured SQL type search or an unstructured keyword search in the database system.

State machine 300 may accept search terms that are relatively unconstrained. For example, state machine 300 may accept search terms with different column orderings. In one example, the user may specify a value in the search term and then specify a filter in the search term. In another example, the user may specify the filter in the search term and then specify the value.

In one example, state machine 300 may not have a designated end state thus allowing the user to continue to add search terms and change search results. For example, state machine 300 may determine the search term comprises an attribute and guide the user into selecting a filter. State machine 300 then may return to a previous state allowing the user to enter additional search terms.

As mentioned above, state machine 300 also may rank tokens. For example, state machine 300 may predict a next entry in the search term is most likely a measure, and assign a higher weight to measure tokens and assign a lower weight to attribute tokens. State machine 300 may determine that the next search term is least likely a value and assign even lower weights to the value tokens.

Figure 12A:
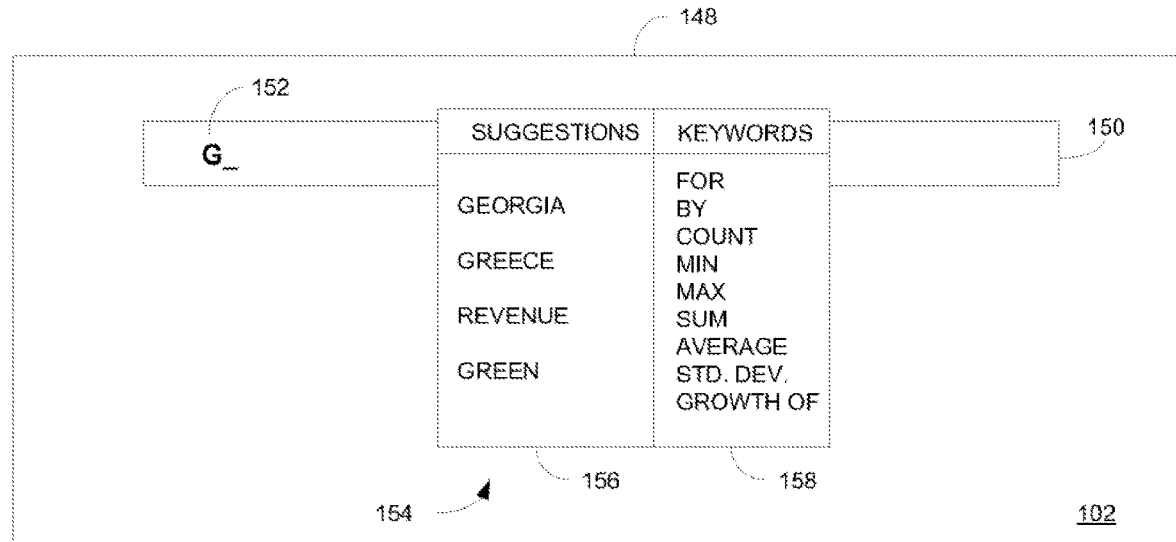
FIGS. 12A-12G depict example electronic pages displayed based on states identified by the state machine in FIG. 11.

Referring both to FIG. 11 and FIG. 12A, the user may enter the letter G into search field 150. State machine 300 could start either in state 302A or state 302D. The only valid input for state 302A is GROWTH OF. State machine 300 may predict that GROWTH OF is a likely input and display GROWTH OF in menu 154 as one of keywords 158.

An index associated with state 302D may include a GEORGIA token and a GREECE token. GEORGIA and GREECE are valid value type tokens for state 302D. Accordingly, the search engine may display the GEORGIA token and the GREECE tokens in menu 154.

While not starting with the letter G, a REVENUE token may have a relatively high token score. For example, the REVENUE token might be the most frequently used token in the global index, and/or a department index associated with the user, and/or a user index associated with the user. The REVENUE token is also a valid measure type input for state 302D. Accordingly, the search engine also displays the REVENUE token in menu 154. A GREEN token also may exist within one of the indexes associated with state 302D and a value type GREEN token is also a valid input for state 302D. According, the search engine also displays the GREEN token in menu 154.

Figure 12B:
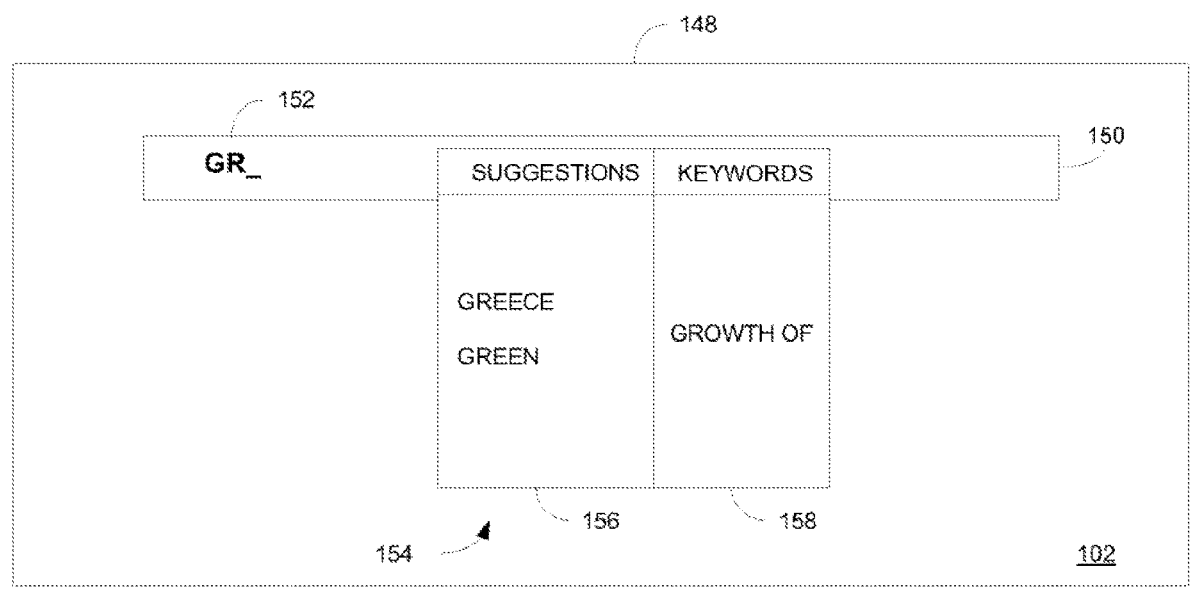

In FIG. 12B, the user may add a second letter R to search term 152. GR is still a valid search term for state 302A and GREECE and GREEN are still valid search terms for state 302D. Accordingly, the search engine may continue to display GROWTH OF, GREECE and GREEN in menu 154. The search engine now determines that the GEORGIA and REVENUE tokens are not unlikely inputs and removes them from menu 154 and/or displays other more likely tokens.

Figure 12C:
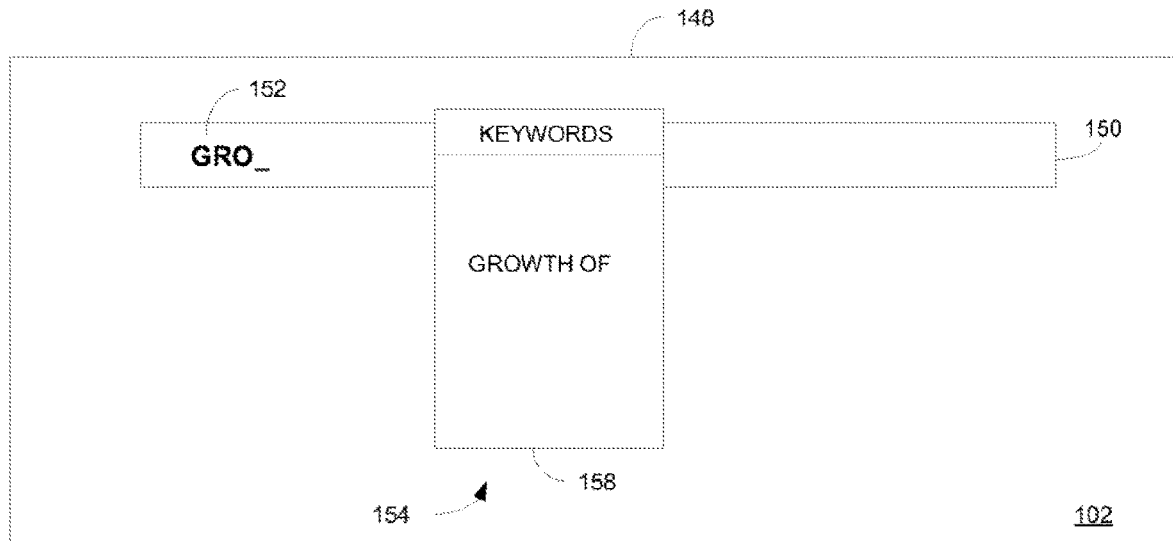

FIG. 12C shows a next state where the user enters the letter O to search term 152. In this example, state machine 300 determines that GREECE and GREEN are now unlikely tokens and removes them from menu 154. In this example, state 302D may no longer be valid and the user is limited to entering GROWTH OF into search field 150 or selecting the GROWTH OF keyword from menu 154.

Figure 12D:
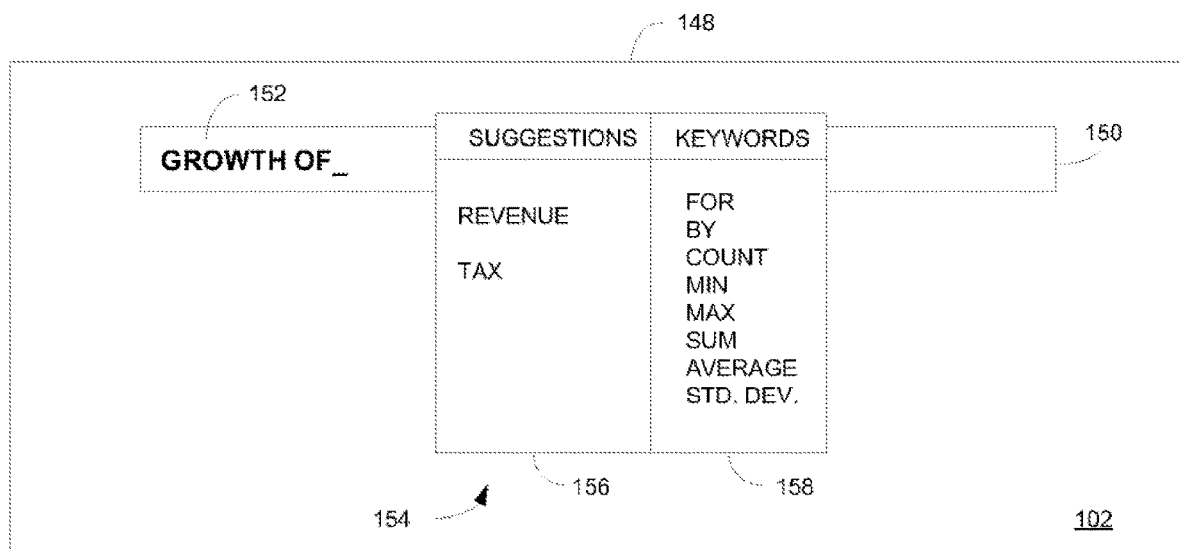

FIG. 12D shows electronic page 148 displayed by the user interface after the user enters GROWTH OF into search field 150. Search term 152 moves state machine 300 into state 302B. The only valid entries in state 302B are measure type tokens. Accordingly, state machine 300 may display the highest ranked REVENUE and TAX measure tokens. The user may type or select the REVENUE token moving state machine 300 into state 302C.

Figure 12E:
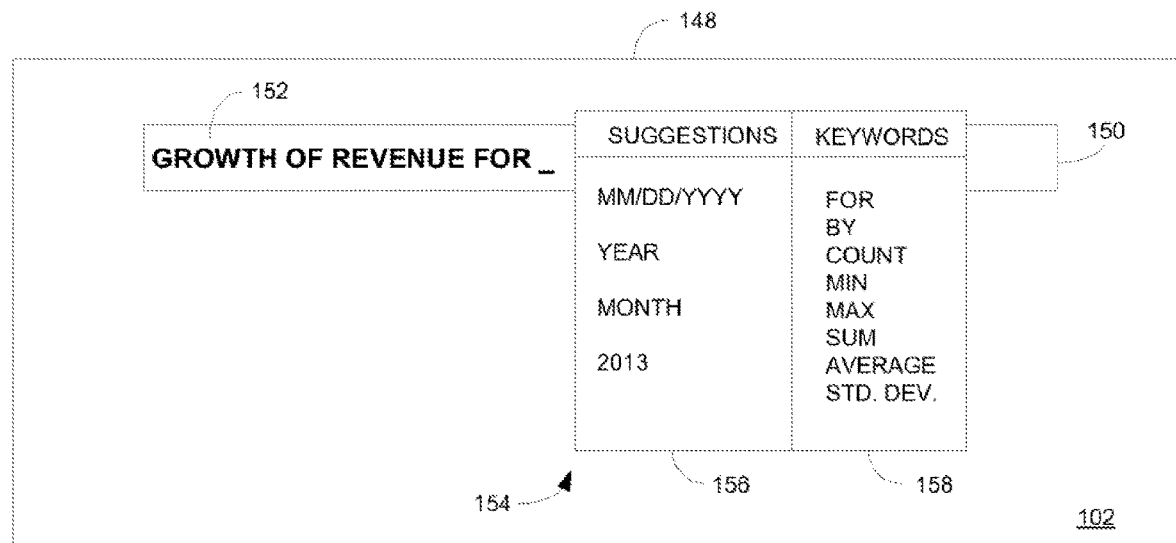

Referring to FIG. 12E, the only valid input in state 302C is a FOR operator. State machine 300 may automatically display FOR in menu 154 or may automatically add the FOR operator to search term 152. State machine 300 then may display a correct format for a next valid input such as a date in menu 154.

Figure 12F:
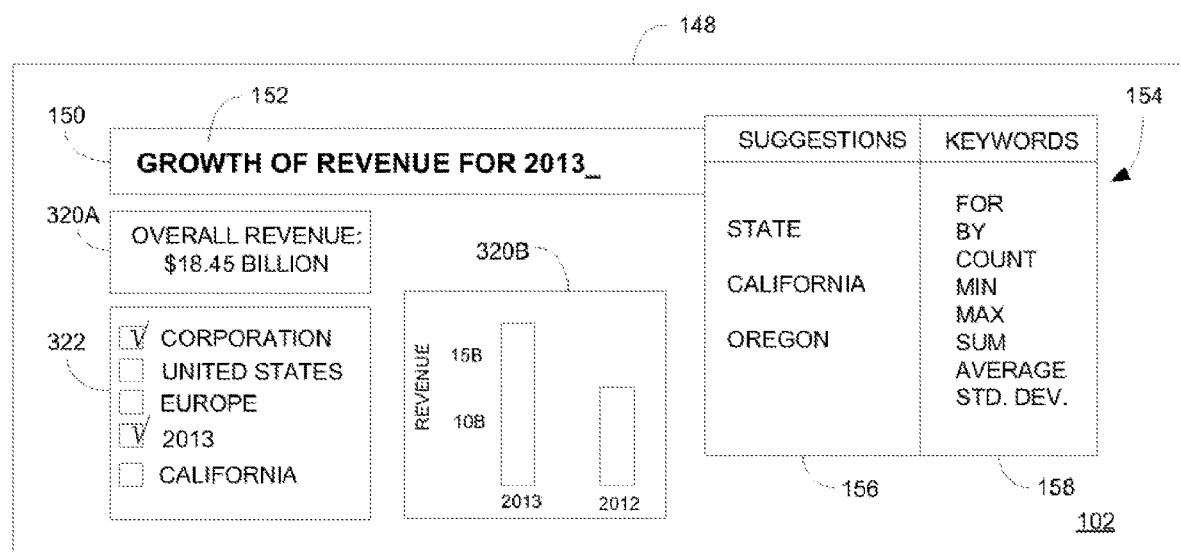

FIG. 12F shows the electronic page 148 after the user adds a date to search term 152 and state machine 300 moves into state 302D. In response to entering state 302D, state machine 300 may generate instructions for calculating revenue growth and display the revenue growth data 320A and 320B. State machine 300 also may display filters 322 identifying other columns associated with the revenue growth data.

Since no specific geographic region or product category is identified prior to moving into state 302D, state machine 300 may generate growth data 320 for all products sold by the enterprise in 2013. In another example, state machine 300 may display revenue growth data 320 for the highest ranked tokens. For example, state machine 300 may generate and display revenue growth data for the state of California.

Different types of tokens can be added to search term 152 after state machine 300 moves into state 302D. For example, valid tokens for state 302D may include a measure token 310A, an attribute token 310B or 310F, or a value token 310E. Attribute tokens may include a highly ranked STATE token and value tokens may include a highly ranked CALIFORNIA token and a highly ranked OREGON token. Accordingly, state machine may display the STATE, CALIFORNIA, and OREGON tokens in menu 154 in response to moving into state 302D.

The user may add a FOR operator followed by a STATE attribute token to search term 152 moving state machine into state 302E. In state 302E, state machine 300 requires an "=" operator 310C. In response to the user entering the "=" operator, state machine 300 may display different state names in menu 154.

Figure 12G:
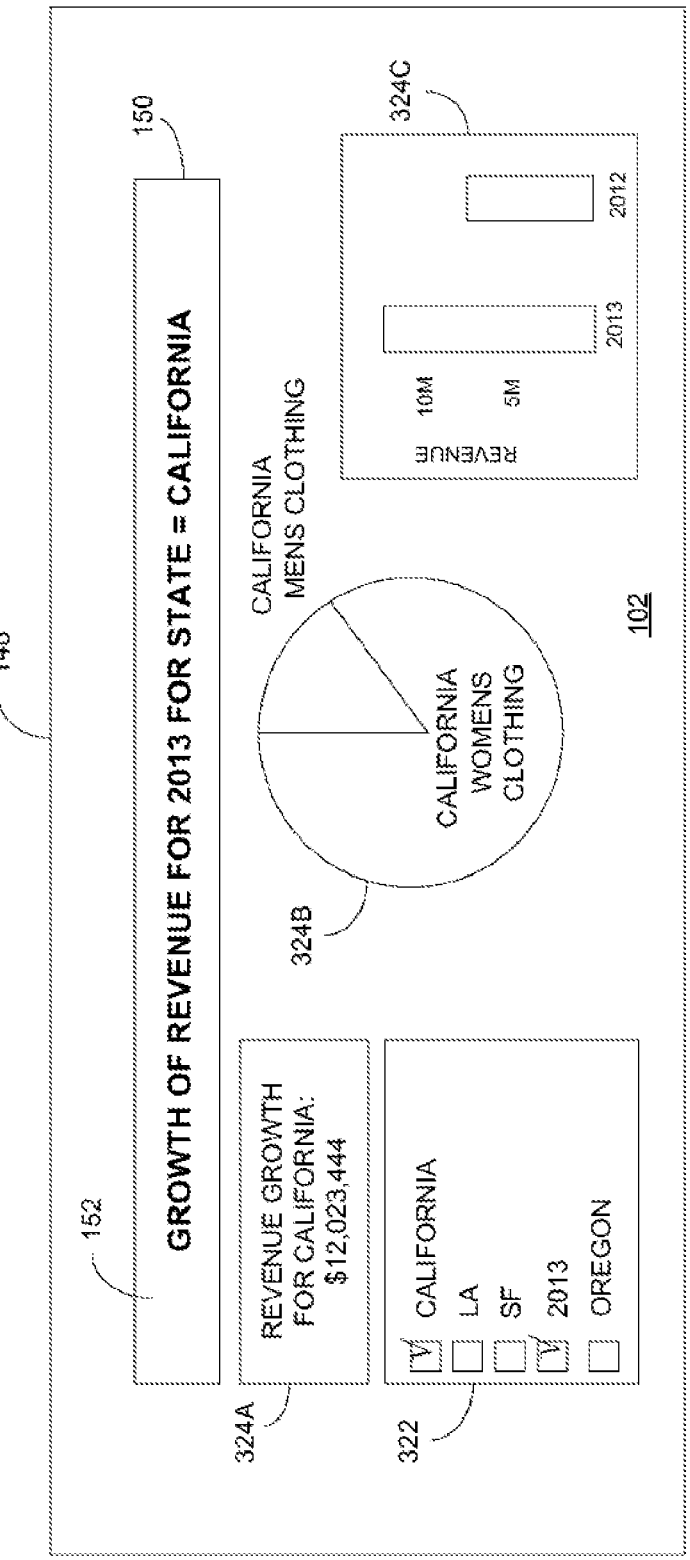

FIG. 12G shows user interface 102 after the user completes entering the search term GROWTH OF REVENUE FOR 2013 FOR STATE=CALIFORNIA. State machine 300 now moves back to state 302D, and derives and displays more specific revenue growth data for the state of California. For example, state machine 300 may display overall revenue growth data 324A for California, revenue growth data 324B for different products sold in California, and display California revenue growth data 324C for different years.

Filters 322 may be updated to show other tokens associated with California. For example, filters 322 may include tokens for other cities in the state of California or for other states. State machine 300 may automatically update growth data 344 based on selection or de-selection of filters 342. For example, the user may un-check the California filter. State machine 300 may automatically change search term 152 back to GROWTH OF REVENUE FOR 2013 and automatically regenerate the growth data 320 previously shown in FIG. 12F. In another example, the user may select LA filter 322. State machine 300 may automatically change search term 152 to GROWTH OF REVENUE FOR 2013 FOR CITY=LOS ANGELES and display growth data for Los Angeles.

Thus, the search may be modified by entering search terms into search field 150 or by selecting one of filters 322. In response to selecting one of filters 322, the search engine automatically displays the associated search terms in search field 150. Thus, the search engine displays to the user the correct syntax for switching between the different data 320 and 324. The search engine may automatically uncheck the CALIFORNIA filter and/or the 2013 filter when the user removes CALIFORNIA or 2013 from search term 152.

State machine 300 generates query generation instructions (QGI) at different states 302. For example, state 302B may generate a first QGI instruction 312A in response to detecting REVENUE in the search term, such as INSTRUCTION 1: ADD COLUMN FOR GROWTH (REVENUE). Instruction 312A specifies the column containing the revenue data and includes a modifier that directs the database to calculate growth for the revenue data.

State 302B generates instruction 312B in response to receiving a date in the search term, such as INSTRUCTION 2: USE COLUMN FOR GROWTH DIMENSION (DATE). Instruction 2 directs the database to compare the growth for the revenue column along a date dimension.

State 302F generates an instruction 312C in response to receiving the value California in the search term, such as INSTRUCTION 3: ADD FILTER (COLUMN=STATE, OPERATOR="=", VALUE=CALIFORNIA). Instruction 312C adds a filter to the column where the revenue data is extracted for the value California in the state column.

As explained above, instructions 312 are sent from search engine 104 in FIG. 1 to the BI server 108. BI server 108 uses instructions 312 to generate SQL type instructions that access the identified data in database system 106 in FIG. 1. The data generated by database system 106 is displayed in user interface 102.

As shown above, state machine 300 may break down a search term into different phrases. For example, state machine 300 broke the search term GROWTH OF REVENUE FOR DATE STATE=CALIFORNIA into a first phrase GROWTH OF REVENUE FOR DATE and a second phrase STATE=CALIFORNIA. This allows state machine 300 to make different annotations and assumptions regarding the search term.

The search term is relatively confined in states 302A-302C but then can expand in multiple directions after reaching state 302D. State machine 300 can customize error messages and predict tokens based on the different phrases. For example, in state 302C state machine 300 can generate a message that directs the user to use the REVENUE token. In state 302D, state machine 300 may generate more general messages for a variety of possible token types.

State machine 300 predicts the intent of the user and obtains data for the predicted inputs. For example, the user may enter the search term REVENUE. Since REVENUE is a measure, state machine 300 may predict that the user would like the measure values summed together. State machine 300 also may assume that since REVENUE is a measure, the user may want to view other related attributes and measures, such as revenue for state, city, tax, etc. Accordingly, state machine 300 may suggest STATE (attribute) and/or display revenue data for particular states, such as for CALIFORNIA (value).

State machine 300 also may predict the intent of the user based on keywords. For example, the user may enter the measure REVENUE followed by a keyword, such as FOR. State machine 300 may predict that the user is searching for revenue data for a particular geographic region or time period and display associated columns in the database, such as city, state, time periods, etc. This allows the user to explore the data within the structured database without having to manually generate SQL instructions.

The search engine may have a hierarchy of state machines that include, but are not limited to, deterministic finite automata state machines and non-deterministic finite automata state machines. The search engine also may use a natural language processor (NLP) to analyze the search term, explain search results, display errors, and make suggestions for correctly entering search terms.

The search engine also may perform unstructured text searches. For example, the enterprise may include unstructured data, such as employee notes, in addition to the structured data in enterprise database 112. The search engine may perform a keyword search with the search term for any other unstructured data that includes the keywords GROWTH, REVENUE and/or CALIFORNIA.

Indexing

Figure 13:
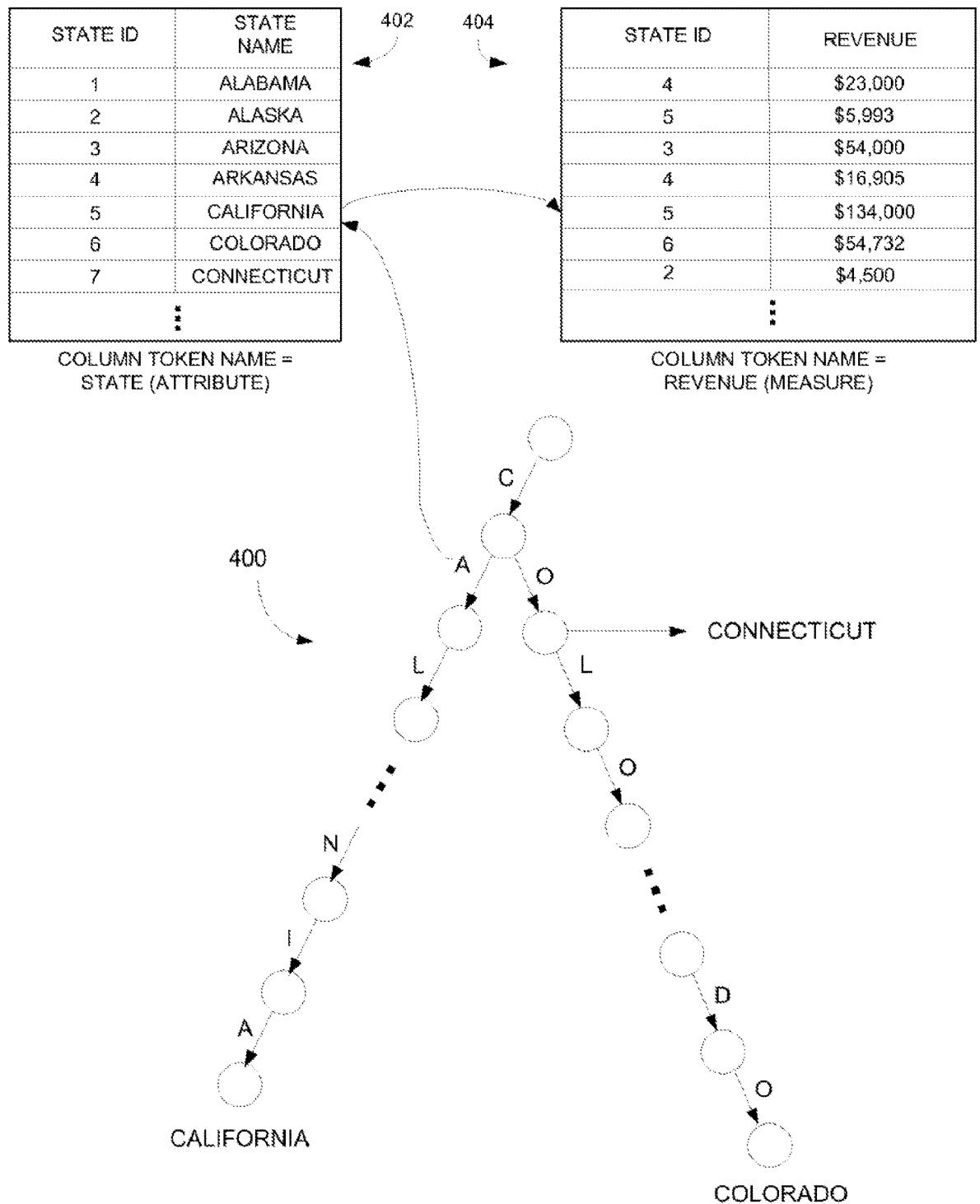
FIG. 13 depicts an example index used by the search engine.

FIG. 13 depicts an example of how the search engine may associate non-structured user inputs with columns in a relational database system. The retrieval system may generate different indexes based on the database tables uploaded from the enterprise relational database or based on any other structured or unstructured data uploaded from the enterprise database. For example, the retrieval system may generate an index 400 that identifies the names of states contained in column 180.

The retrieval system may identify three different state names California, Colorado, and Connecticut in column 402 in response to the user entering the letter C into the search field. The retrieval system not only associates the letter C with the three state names in column 402 but also may associate the user input C with revenue column 404 via state identifiers 5, 6, and 7. Thus, from the user input C, the search engine also may anticipate or predict that the user is searching for revenue data for California, Colorado, or Connecticut.

Index 400 moves into a second logic state after the user enters a second letter A. The retrieval system now may anticipate/predict that the user is searching for data related to California. In response to detecting the second index logic state, the retrieval system may refine the data displayed in the user interface. For example, the retrieval system may display total revenue of $139,993 for California. The retrieval system also may display other data associated with California. For example, the retrieval system may identify other columns in the database system containing state identifier 5 and display tokens and/or data associated with the identified columns.

Figure 14:
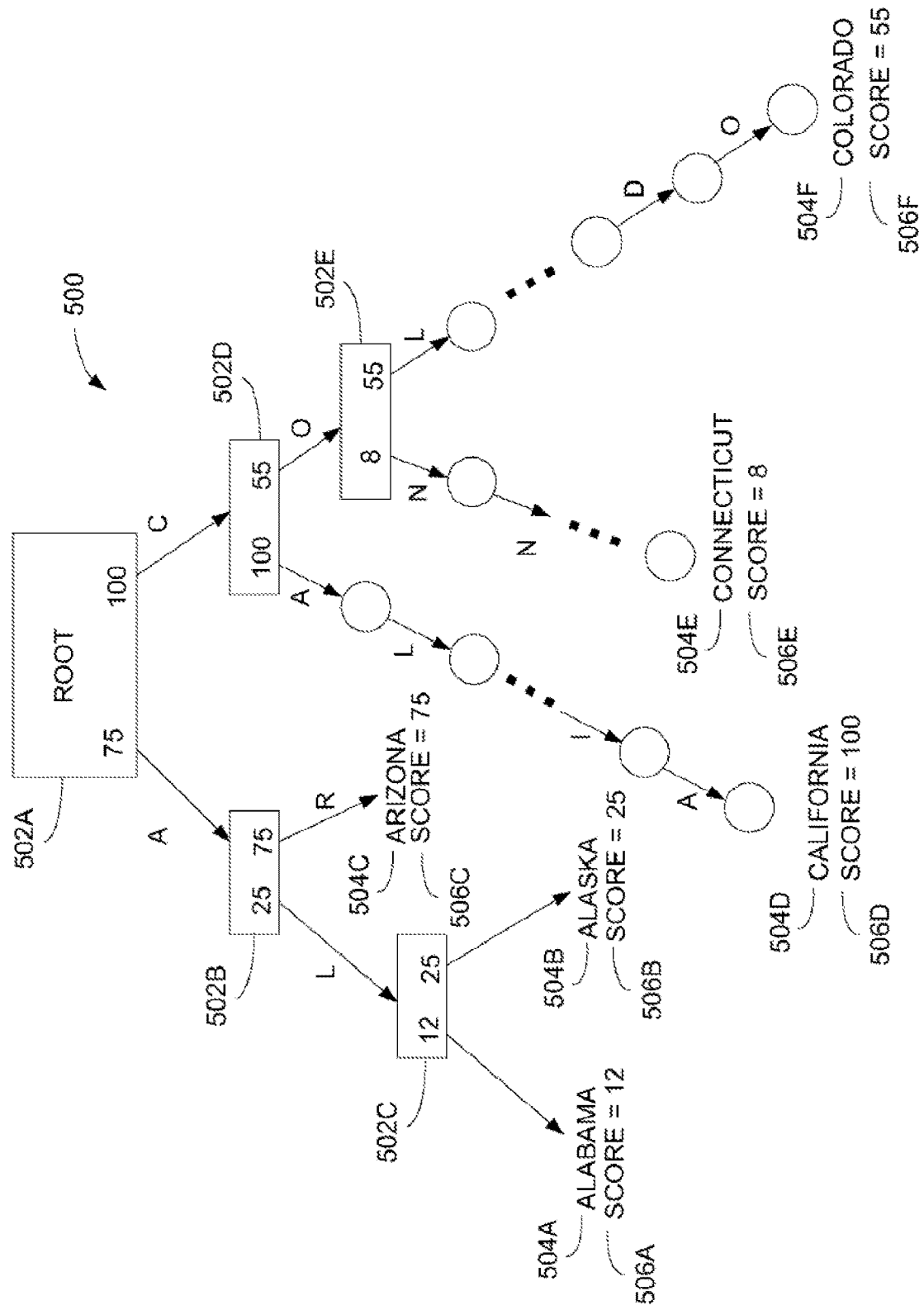
FIG. 14 depicts an example index for ranking tokens.

FIG. 14 depicts another example index 500 generated from columns in database system 106 in FIG. 1. Hundreds of indexes 500 may be generated from database system 106 and for different users and departments with an enterprise. Large numbers of tokens 504 may exist in each index 500. A user may enter a first character of a search term into a search field. The search engine may identify millions of potential tokens 504 based on the first character.

The search engine ranks tokens 504 and uses the rankings to predict which tokens 504 the user intends to enter into the search field. The search engine may assign each token 504 a score 506 based on any combination of factors. For example, scores 506 may be based on the number of times a particular token 504 is selected by users. Scores 506 also may be based on the number or types of columns, rows, measures, attributes, values, etc. associated with tokens 504.

The search engine also may rank tokens 504 based on which type of token is most likely to follow a currently entered search term. For example, a current search term may comprise a measure token. It may be more likely that the next token used in the search term is an attribute type of token. Accordingly, attribute tokens may be ranked higher than measure or value tokens.

The search engine may identify a root state 502A based on the search term entered by the user. For example, the user may enter the search term STATES. The search engine may identify root state 502A and display different tokens 504 within index 500 based on the associated scores 506.

For example, Alabama token 504A may have a score 506A of 12, Alaska token 504B may have a score 506B of 25, Arizona token 504C may have a score 506C of 75, California token 504D may have a score 506D of 100, Connecticut token 504E may have a score 506E of 8, and Colorado token 504F may have a score 506F of 55. Based on scores 506, the search engine may display California token 504D first, Arizona token 504C second, Colorado token 504F third, etc.

In root state 502A, the user may enter a character, such as the letter C. The search engine parses down the right branch of root state 502A to identify tokens 504D, 504E, and 504F and identifies the associated token scores 506D, 506E, and 506F, respectively. The search engine ranks tokens 504D, 504E, and 504F based on the associated scores 506D, 506E, and 506F, respectively, and then displays one or more of the tokens in the ranked order CALIFORNIA, COLORADO, CONNECTICUT.

As mentioned above, hundreds, thousands, or millions of tokens 504 may be associated with a particular index 500. To reduce processing bandwidth, token scores 506 may be propagated up index 500. The search engine then only needs to propagate down the branches associated with the highest ranked tokens 504.

The search engine may identify the highest ranked token in each separate branch. For example, California token 506D has the highest score of 100 in the right branch of root state 502A. The right branch of root state 502A is assigned the score 100 and the left branch of state 502D is also assigned the score 100. Colorado token 504F has the highest score in the right branch of state 502D and is assigned Colorado token score 55. Arizona token 504C has the highest token score 506C in the left branch of root state 502A. The left branch of root state 502A is therefore assigned the Arizona token score 75.

The search engine can quickly determine the highest ranked tokens 504. For example, the search engine may want to display the two top ranked tokens 504 when in root state 502A. As described above, the search engine would typically need to parse down each individual branch in index 500 to identify all of the possible tokens 504 and associated token scores 506, and then display the two tokens 504 with the highest scores 506.

Instead the search engine first identifies the right branch of root state 502A as containing the highest token score. The search engine then determines that the left branch of state 502D has a higher score of 100 then the token score of 55 for the right branch of state 502D. Since, California token 504D is the only token in the left branch of state 502D, the search engine displays California token 504D has the highest ranked token.

The search engine determines that the next highest token score for the right branch of state 502D is 55 and previously determined that the highest token score for the left branch of root state 502A is 75. The search engine then moves down the left branch of root state 502A to find the second highest token score. State 502B indicates the right branch contains the second highest token score. Therefore, the search engine does not need to parse down the left branch of state 502B. Arizona token 504C is the only token in the right branch of state 502B and is accordingly displayed to the user as the second highest ranked token.

Referring to FIGS. 14 and 15, the search engine may generate a priority query 520 for index 500. In operation 522A, the search engine first may identify the scores for each branch in root state 502A. In this example, only two branches and associated branch scores 100 and 75 are associated with root state 502A.

In operation 522B, the search engine may parse down to a next level of the branch with the highest score and identify additional branch or token scores. In this example, state 502D includes a first branch score 100 and a second branch score 55. Operation 522B adds branch score 55 as a current third highest branch score in index 500.

In operation 522C, the search engine parses down a next level of index 500 for the branch with the highest branch score. In this example, the search engine moves down the left branch of state 502D. The left branch of state 502D has no additional branches and terminates at California token 504D. Accordingly, the search engine identifies California token 504D as the highest ranked token for index 500.

In operation 522D, priority queue 520 remains with branch scores 75 and 55. The search engine in operation 522E moves down the right branch in state 502B associated with the next highest branch score 75. In this example, the right branch of state 502B has no additional branches and terminates at Arizona token 504C. Accordingly, the search engine in operation 522F identifies Arizona token 504C as the next highest ranked token for index 500. Operations 522 continue until all, or some specified number of, tokens in index 500 have been ranked.

The search engine displays tokens 504 based on the rankings in priority queue 520. For example, a user may enter a search term that moves the search engine into root state 502A. In response to moving into root state 502A, the search engine may automatically display the three top ranked tokens in index 500. Based on the rankings in priority queue 520, the search engine displays California token 504, Arizona token 504, and Colorado token 504 F. The user then may add the letter A to the search term. Based on priority queue 520, the search engine may display Arizona token 504, Alaska token 504, and Alabama token 504 in order as the three top ranked tokens that begin with the letter A.

Figure 16:
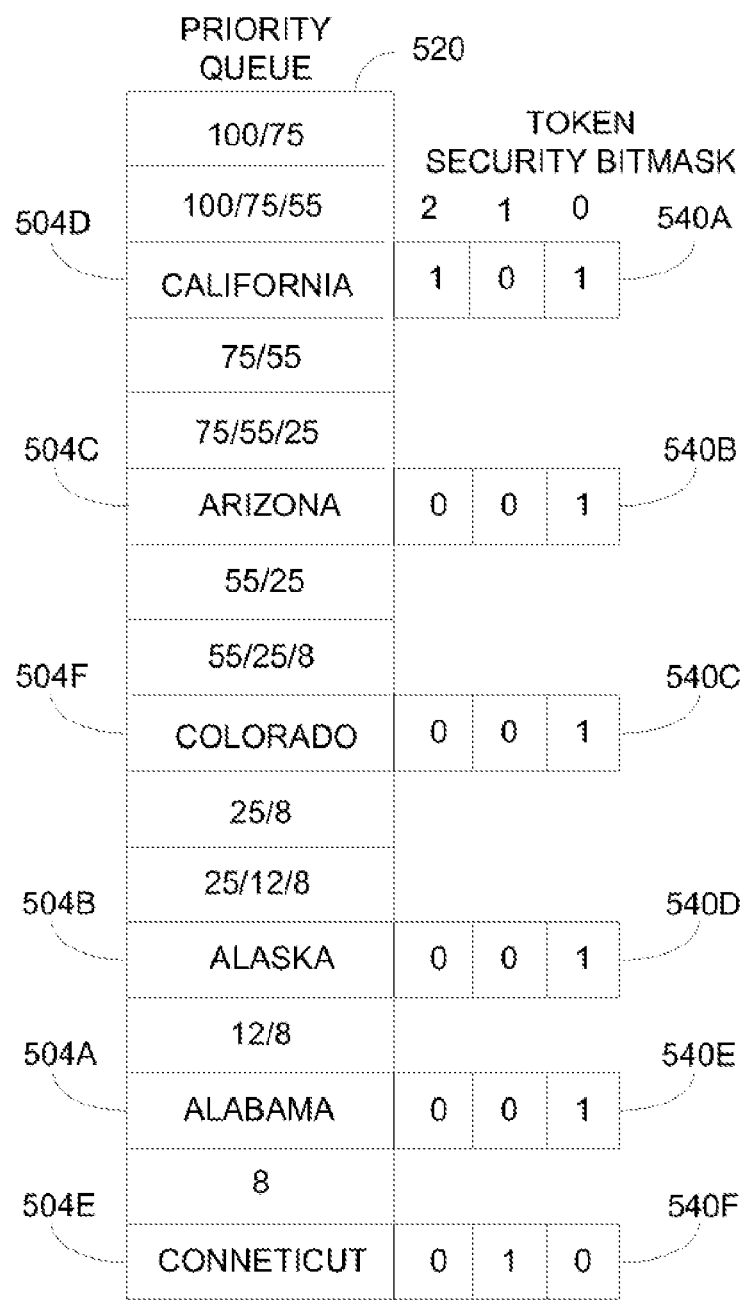
FIG. 16 depicts example token security bitmasks.

Referring to FIG. 16, the search engine may assign security bitmasks 540 to tokens 504. Security bitmasks 540 may include different bits associated with different user groups. For example, a first bit may be associated with a management group, a second bit may be associated with a human resources group, and a third bit may be associated with a sales group. These of course are just examples and any number of bits may be associated with any number of different groups.

The search engine may set token security bitmasks 540 based on which groups of users are authorized to view the tokens and/or the associated data. For example, the search engine may set token bitmask 540A so only management and sales groups can view California token 504D and any associated data. The search engine may set token security bitmask 540B so only the management group can view Arizona token 504C and any associated data.

In another example, different bits in security bitmasks 540 may be associated with different geographic regions. For example, different bits may be associated with different cities, states, countries, sales regions, etc. The geographic bits may limit some users to only viewing tokens and associated data for particular regions. For example, a salesman assigned to an Oregon sales region may only be prevented from viewing sales data for other states.

Figure 17:
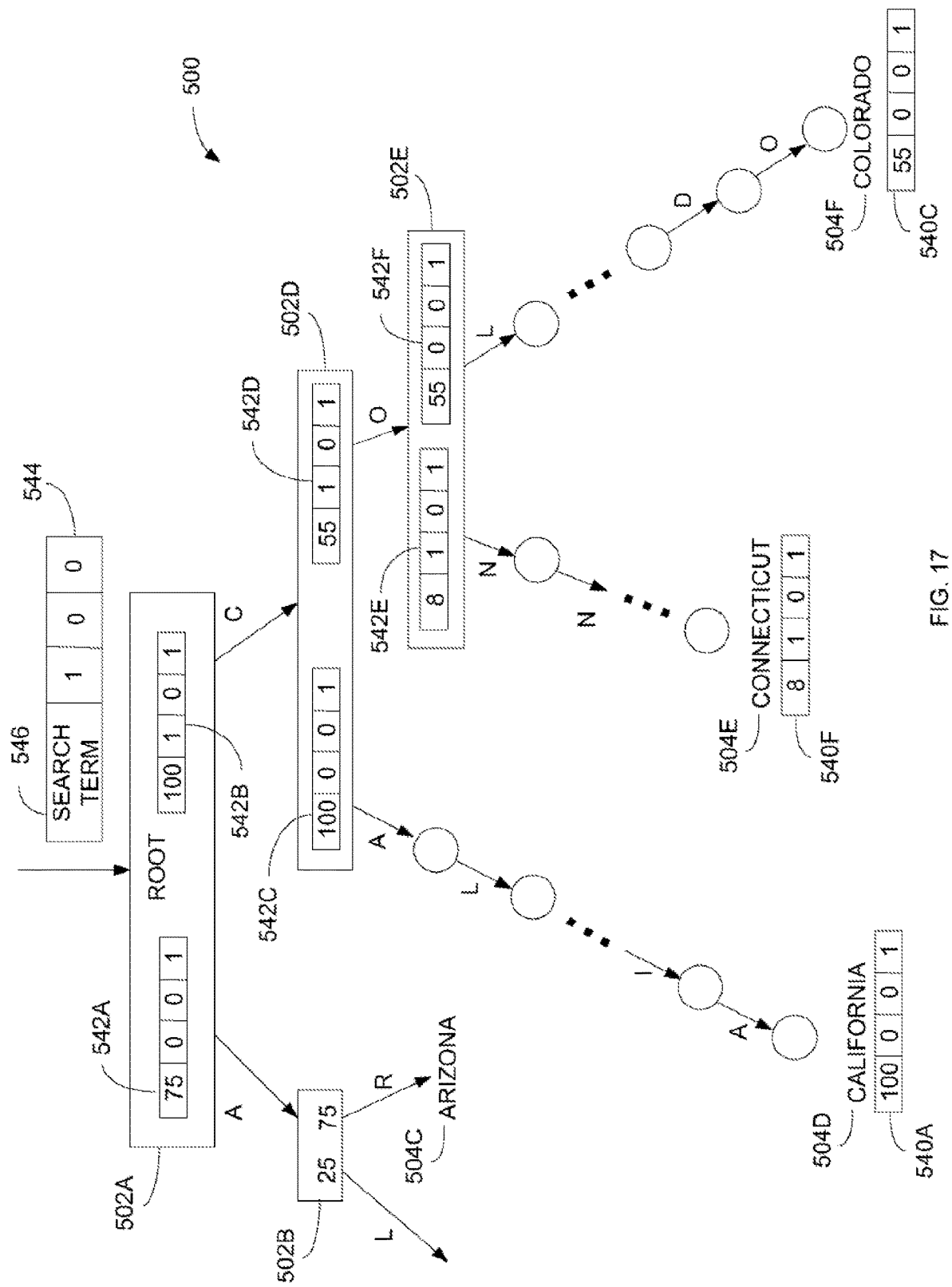
FIG. 17 depicts an example index with security bitmasks.

FIG. 17 shows how the security bitmaps may determine which tokens are displayed to users. Branch security bitmaps 542 may be generated based on token security bits maps 540. For example, the left branch of state 502E and the right branch of index state 502E each comprise one token. Accordingly, left branch security bitmap 542E and token security bitmap 540F are the same, and right branch security bitmap 542F and token security bitmap 540C are the same.

A next higher level branch security bitmap 542D combines lower level branch security bitmaps 542E and 542F. For example, branch security bitmaps 542E and 542F are logically OR'd together to derive the upper level branch security bitmap 542D. Similarly, root level branch security bitmap 542B combines branch security bitmaps 542C and 542D.

A user may be assigned a user security bitmap 544. For example, the user may enter the information retrieval system using a login identifier and password. The login identifier may be associated with a user profile that associates the user with certain groups and/or geographic regions. In this example, the user may belong to the sales group and the search engine sets the third bit in user security bitmap 544. If authorization were controlled for different geographical regions, the search engine may set bits in user security bitmap 544 associated with the sales regions where the user has sales responsibilities.

The user may enter a search term 546, or enter a character for search term 546, into the user interface. In a first example, the user may enter a character C for search term 546. The search engine parses down the right branch of root state 502A. California token 504E is the highest ranked token in index 500 but can only be viewed by the management group since only the first bit is set in branch security bitmap 542C. Since the user only belongs to the sales group, the search engine does not parse down the left branch of state 502D and does not display California token 504D.

The sales group is allowed to view certain tokens and associated data in the right branch of state 502A. The search engine determines from branch security bitmap 542E that the user is authorized to view the token in the left branch of state 502E. Based on branch security bitmap 542E, the token score for token 504E, and the other weightings and rankings described above, the search engine may display Connecticut token 504E and display the data associated with token 504E, such as sales figures for the state of Connecticut.

The right branch of state 502E can only be viewed by users in the management group. Therefore, the search engine also does not display Colorado token 504F or any data associated with Colorado token 504F even though Colorado token 504F has a higher token score then Connecticut token 504E.

The left branch of root state 502A also can also only be viewed by users in the management group. The user while in root state 502A may enter the character A as search term 546. Based on branch security bitmap 542A, the search engine does not display any tokens that reside in the left branch of root state 502A.

In another example, user security bit map 544 may have the first management bit set and have another geographic bit set associated with the state of Colorado. Colorado token 504F may have an associated geographic bit set in token security bitmap 540C. The search engine may have entered root state 502A in response to the user entering REVENUE as search term 546. Since the user is specifically authorized to view data associated with Colorado token 504F, the search engine may automatically display revenue figures for Colorado in response to the user simply entering the search term REVENUE. In other words, the matching geographic regions in the security bitmaps may produce a highest token ranking for Colorado token 504F.

In yet another example, user security bitmap 544 may include bits associated with different revenue levels. For example, a bit in user security bitmap 544 may enable the user to view financial transactions over $1 million. However, the user may not have authorization to view transactions over $1 million and therefore the search engine does not set the $1 million revenue level bit in user security bitmap 544.

The user again may enter REVENUE as search term 546. The search engine may not access or display column rows with revenue values greater than $1 million. The search engine also may not access or display names, tokens, attributes, measures, values, etc. associated with any of the rows with values greater $1 million. For example, the user may enter the search term REVENUE NAME=. The search engine may only display tokens with associated columns rows having values less than $1 million.

Figure 18:
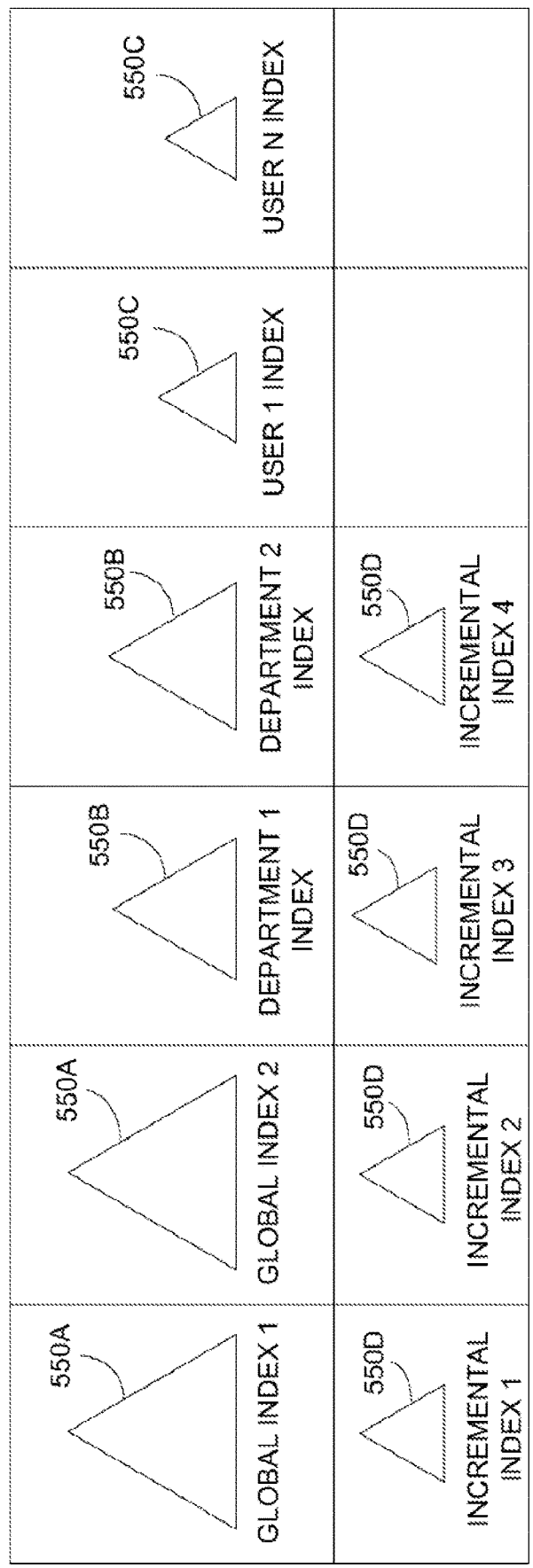
FIG. 18 depicts an example index structure used by the information retrieval system.

Referring to FIG. 18, the following three search queries may be received by the search engine.
- Query 1, user 1, department 1, search term=revenue by state.
- Query 2, user 2, department 1, search term=growth of tax by order date.
- Query 3, user 3, department 2, search term=ship priority delay by state.

The information retrieval system may take into account all three queries when building global indexes 550A. For example, token scores in global indexes 550A may be adjusted based on the tokens identified in query 1, query 2, and query 3.

The information retrieval system may add a revenue token and a state token to a first user index 550C associated with user 1 in response to receiving query 1. If the revenue and/or state tokens already exist in the first user index 550C, the associated token scores may be increased.

The search engine may adjust a second user index 550C associated with user 2 in response to query 2, and adjust a third user index 550C associated with user 3 in response to query 3. For example, the information retrieval system may add a TAX token to the second user index.

The information retrieval system may adjust a first department index 550B associated with a first department of an enterprise in response to queries 1 and 2. For example, user 1 and user 2 may both be associated with the marketing department of the enterprise. The information retrieval system may add tokens or adjust token scores in department index 550B based on the tokens in query 1 and query 2. The search engine may adjust a second department index 550B associated with a second department of the enterprise in response to query 3.

A substantial amount of processing bandwidth may be needed for building and maintaining large indexes 550. For example, indexes 550 may need to be updated whenever new data is added to database system 106 in FIG. 1. The information retrieval system may build incremental indexes 550D to avoid continuously rebuilding large indexes, such as global indexes 550A and/or department indexes 550B.

For example, on a particular day 1000 rows may be added to a customer column that includes names for 100 new customers. The information retrieval system may need to add 100 new tokens to global index 550A for the new customer data. Instead of rebuilding global index 550A, the information retrieval system may add the 100 new tokens to an incremental index 550D associated with the global index 550A.

Subsequently a user may perform a search for some of the new customer data. The search engine uses both global index 550A and incremental index 550D to identify the customer tokens.

Figure 19:
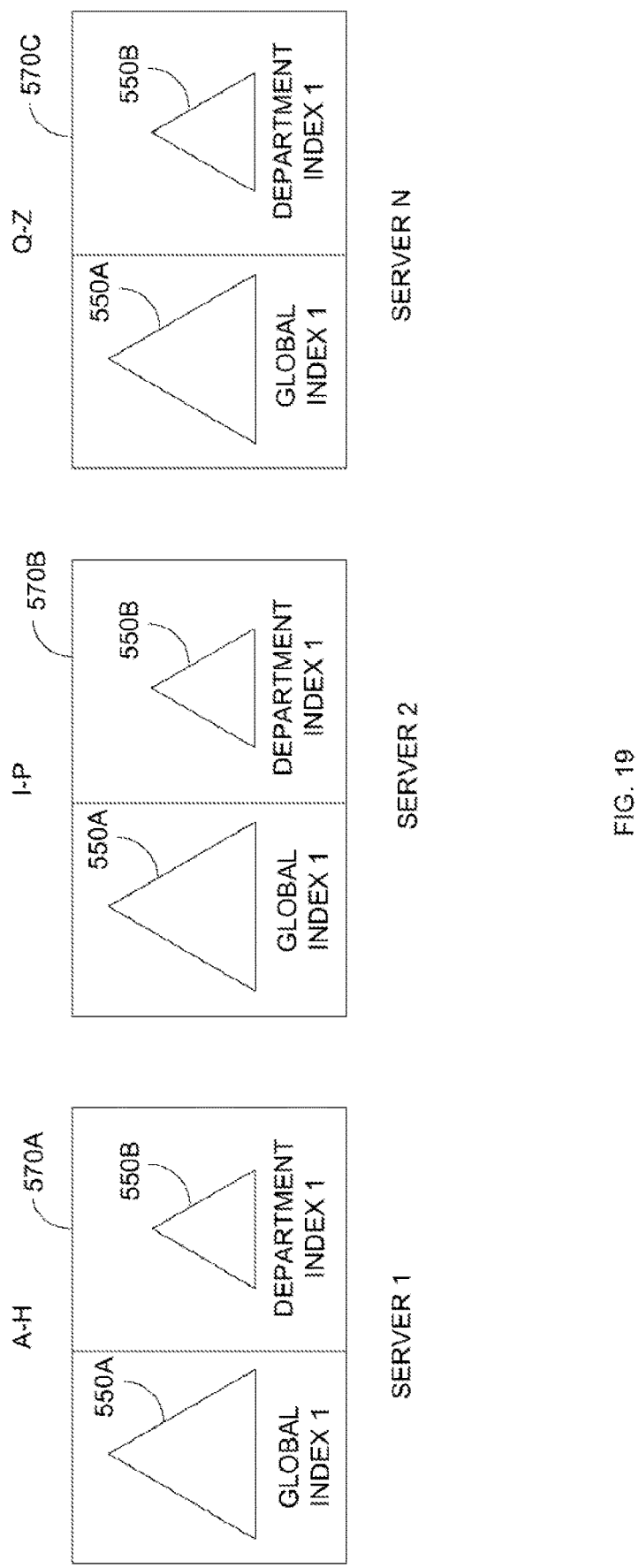
FIG. 19 depicts an example distributed index structure.

FIG. 19 depicts an example of how indexes may be divided over different servers. A subset of each global index 550A and/or department index 550B may be distributed over different servers 570A, 570B, and 570C. For example, server 570A may include a subset of indexes 550 containing tokens starting with letters A-H, server 570B may include a subset of indexes 550 containing tokens starting with letters I-P, and server 570C may include a subset of indexes 550 containing tokens starting with letters Q-Z.

A user may enter the search term CALIFORNIA. The search engine may send the search term to server 570A. Search terms with no particular token characters may be sent in parallel to all three servers 570A, 570B, and 570C. For example, the search engine may send the search term REVENUE to all three servers 570A, 570B, and 570C. The highest ranking tokens from among all of indexes 550A and 510B are displayed in the user interface.

Some indexes may include token prefixes and/or suffixes that detect incorrectly spelled search terms or sub-portions of search terms. For example, server 570A may contain a primary index with the correct token spellings and servers 570B and 570C may contain the prefix and suffix indexes with the partial or incorrect token spellings. In order to detect different prefixes and/or suffixes for a token, the search engine may have to send the search term to the different indexes 550 on different severs 570A, 570B, and/or 570C.

To save processing bandwidth, the search engine may first send the search term to server 570A containing the primary index with the correct token spelling. The search engine may limit the number of displayed tokens. For example, the search engine may only display ten tokens. If the primary index with the correct token spellings on server 570A identifies ten tokens, the search engine might not search the other prefix and suffix indexes on servers 570B and 570C. If the primary index does not produce ten results, the search engine may send the search term to the other prefix and suffix indexes located on servers 570B and 570C.

The search engine may terminate the search on servers 570B and 570C when no substring match is identified after some predetermined time period, such as 10 milliseconds. However, the search engine may need to identify some number of tokens from the primary index on server 570A regardless of the required amount of time.

In another example, instead of typing in REVENUE, the user may incorrectly type in the search term ROVENUE. The search engine may try dropping each one of the letters, such as rvenue, ovenue, roenue, rovnue, etc. The search engine then may try replacing each letter with other letters, such as aovenue, bovenue . . . ravenue, rbvenue. etc. The search engine then may insert characters between each existing character, such as arovenue, brovenue, . . . raovenue, rbovenue, etc.

These search term variations may produce hundreds of candidate search terms. The search engine may apply the modified search terms into a bloom filter that determines if any of the candidate search terms exist in indexes 550. The bloom filter may reduce the number of candidate search terms, such as down to ten candidate search terms. The ten candidate terms then may be submitted to the primary index. If four matching tokens are identified in the primary index, the search engine may use state machine rankings and other rankings described above to determine which matching tokens are displayed to the user.

Selectable Join Paths

Figure 20:
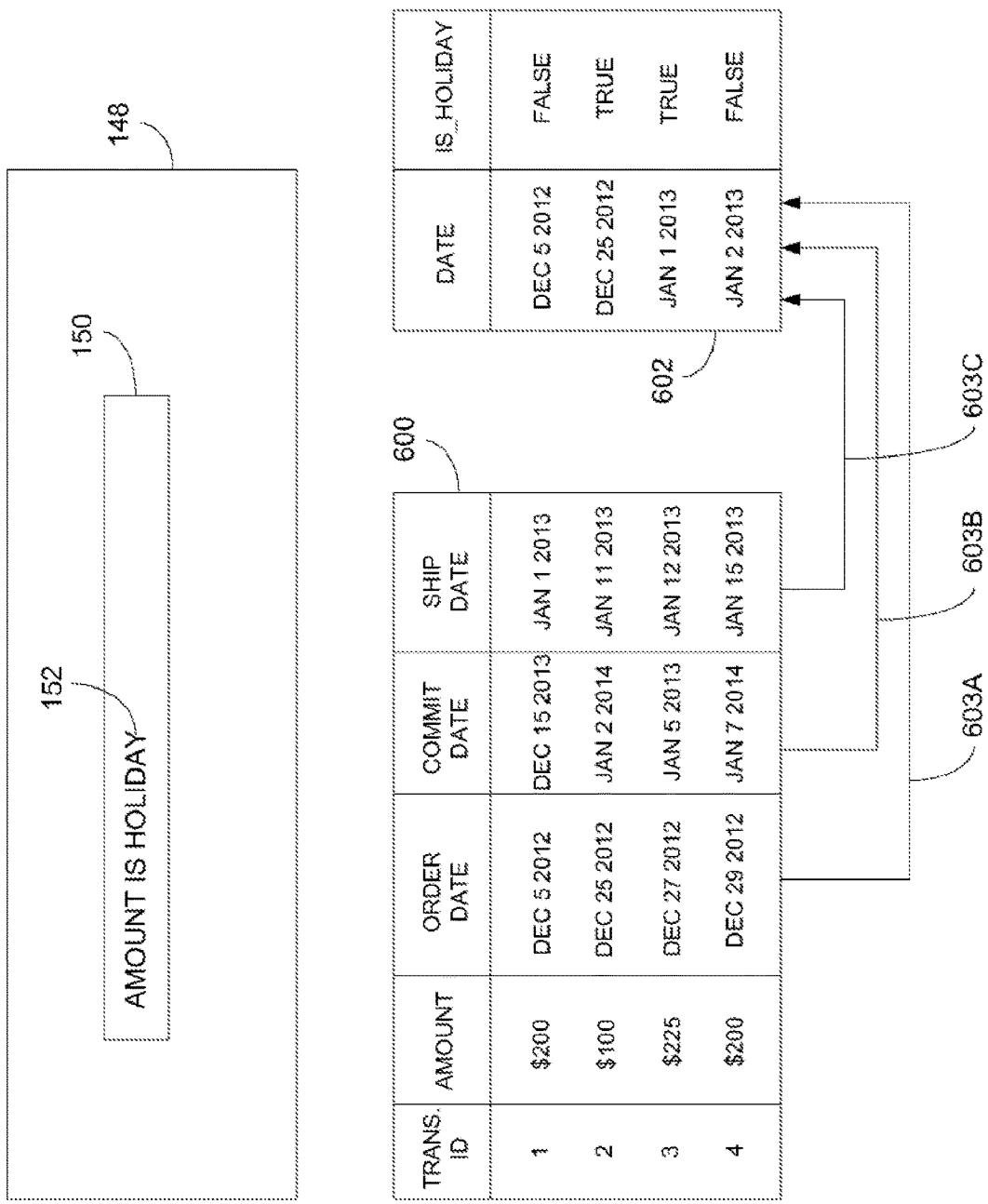
FIG. 20 depicts an example table mapping in the information retrieval system.

FIG. 20 depicts one example of how the search engine may provide selectable join paths. A table 600 in the database system identifies amounts for different transactions. The transactions may have different dates, such as an order date, a commit date, and a ship date. A second table 602 may identify dates associated with different holidays. For example, December 25 and January 1st are identified as holidays and December 5 and January 2 are identified as non-holidays. A system administrator may have created links 603A, 603B, and 603C between the order, commit, and ship date columns, respectively, and table 603.

A user may enter the search term AMOUNT IS HOLIDAY into search field 150. Search term 152 may be considered ambiguous since three different values may exist in table 600. For example, the amount is holiday is zero based on the commit date. However, the amount is holiday would be $100 based on the order date and the amount would be $200 based on the ship date.

Figure 21:
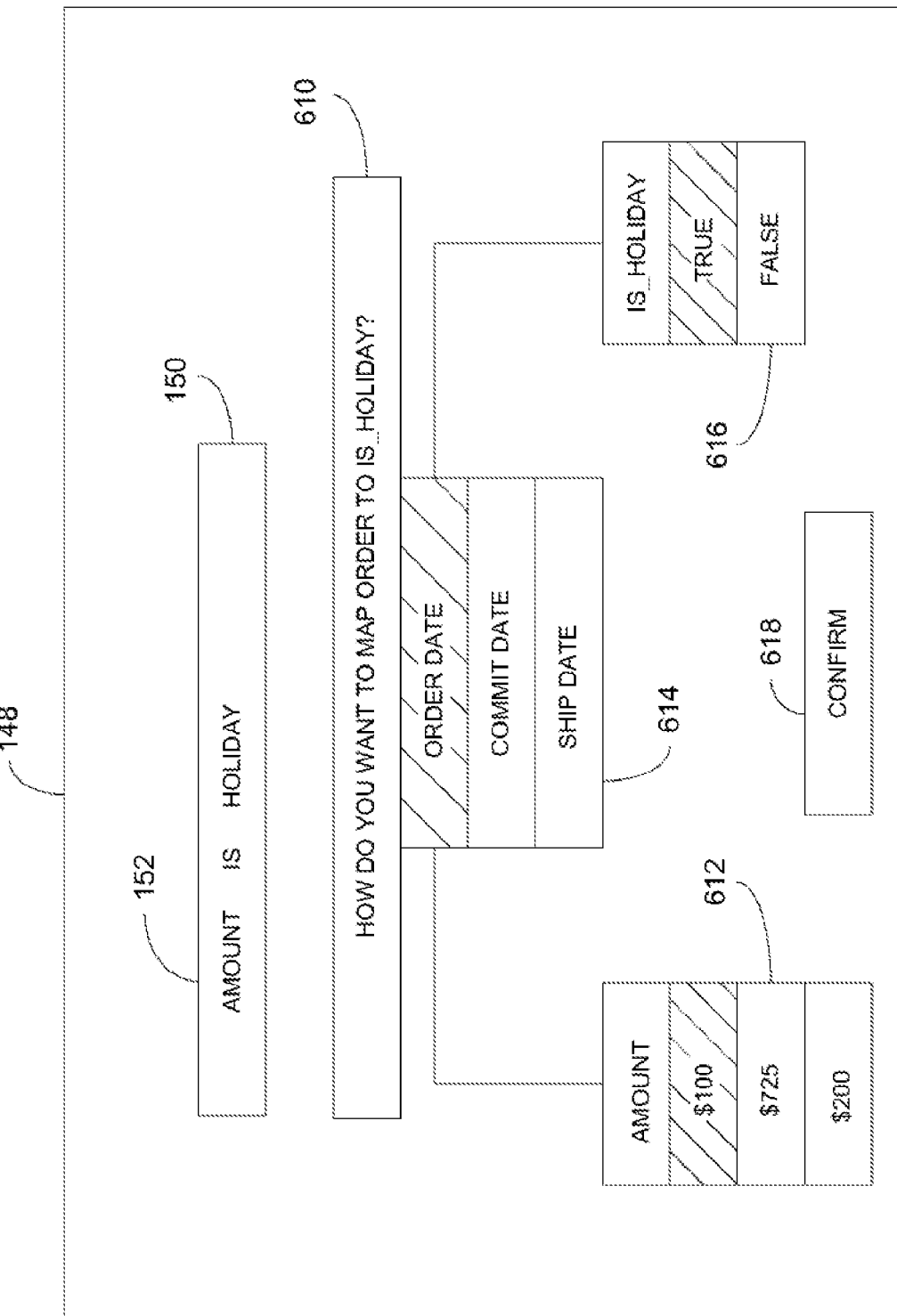
FIG. 21 depicts an example user selectable table mapping.

Referring to FIG. 21, the search engine determines that search query 152 is ambiguous and displays a message 610 asking how to map the order table 600 to holiday table 602. The search engine may display the different date columns of table 600 in menu 614, display some of the different associated amounts in menu 612, and display some of the associated values from holiday table 602 in menu 616. The search engine may select a default date column and highlight the associated column name and associated values in menus 612, 614, and 616. For example, the search engine highlights the amount $100 in menu 612, the order date column name in menu 614, and the true holiday value in menu 616.

The search engine may display other amounts or other column names in response to other selections in menus 612, 614, and/or 616. For example, the search engine may show the amount for the commit date column as $725 and show the holiday value as false in menu 616. If the ship date column name in menu 614 is selected, the search engine may highlight the amount of $200 in menu 612 and highlight the true value in menu 616. The user may select a confirm icon 618 to confirm the selection of different items in menus 612, 614, and 616.

The search engine may not query the user and/or display menus 612, 614, and 616 when search term 152 is unambiguous. For example, the user may enter the search term AMOUNT BY COMMIT DATE. The search term may generate one definite answer from table 600. Therefore, no other selectable join paths need to be displayed in menus 612, 614, and/or 616.

Figure 22:
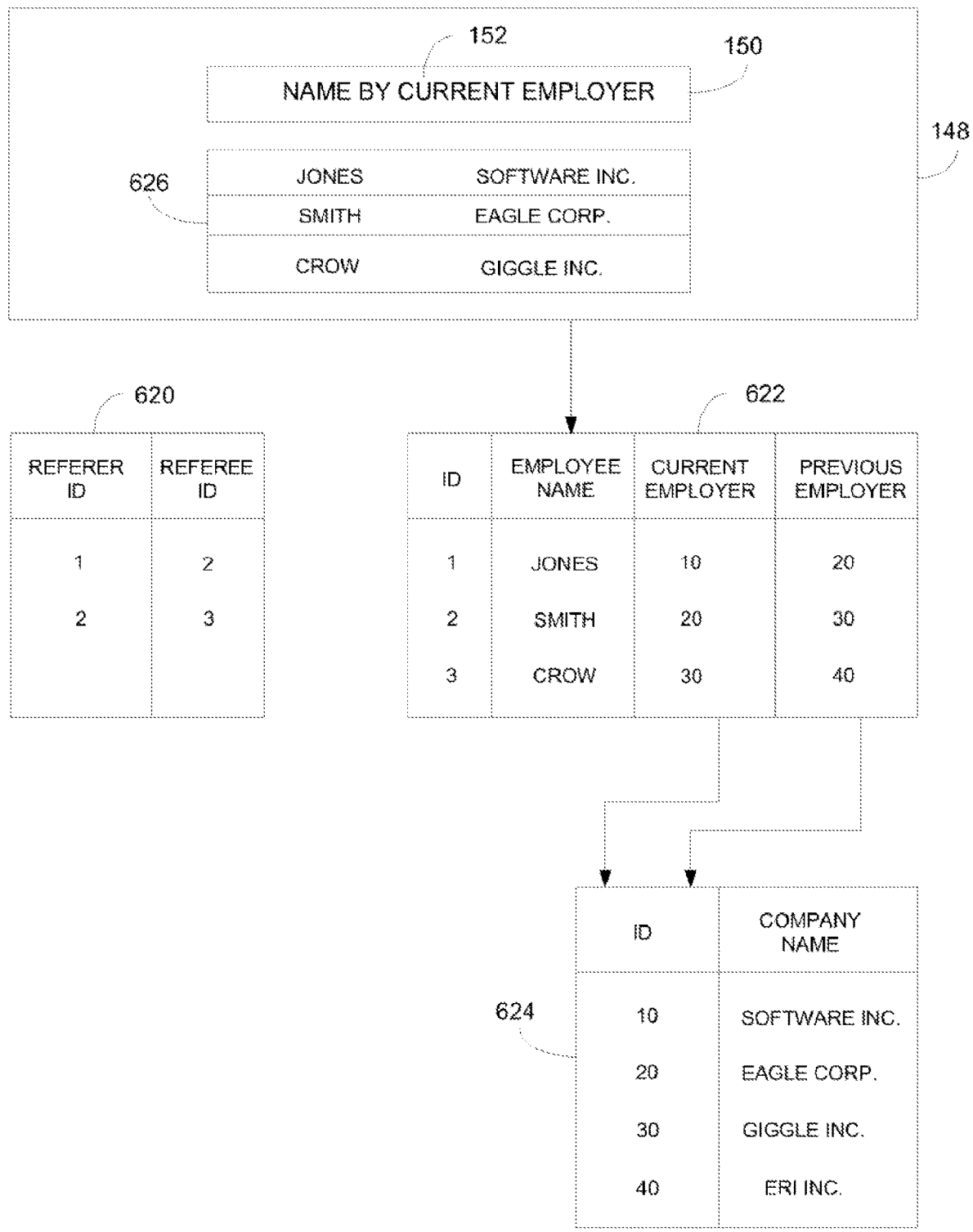
FIG. 22 depicts a user selectable table mapping for a first search term.

FIG. 22 shows another example of how the search engine provides user selectable join paths. A table 620 in the database system may identify persons who referred someone for an employment position (referrers) and persons who were referred by the referrers (referees). A table 622 may contain the names of the referrers and referees and include identifiers for a current employer and a previous employer of the referrers and referees. Table 624 contains the names of the current and previous employers. For example, tables 620 and 622 indicate that Jones referred Smith. Tables 622 and 624 identify the current employer of Jones as Software, Inc. and the previous employer of Jones as Eagle, Corp.

A user may enter the search term NAME BY CURRENT EMPLOYER into search field 150. The search engine determines search term 152 is not ambiguous since one list can be provided from tables 622 and 624. Accordingly, search engine displays a list 626 of employee names from table 622 and associated current employers from table 624.

Figure 23:
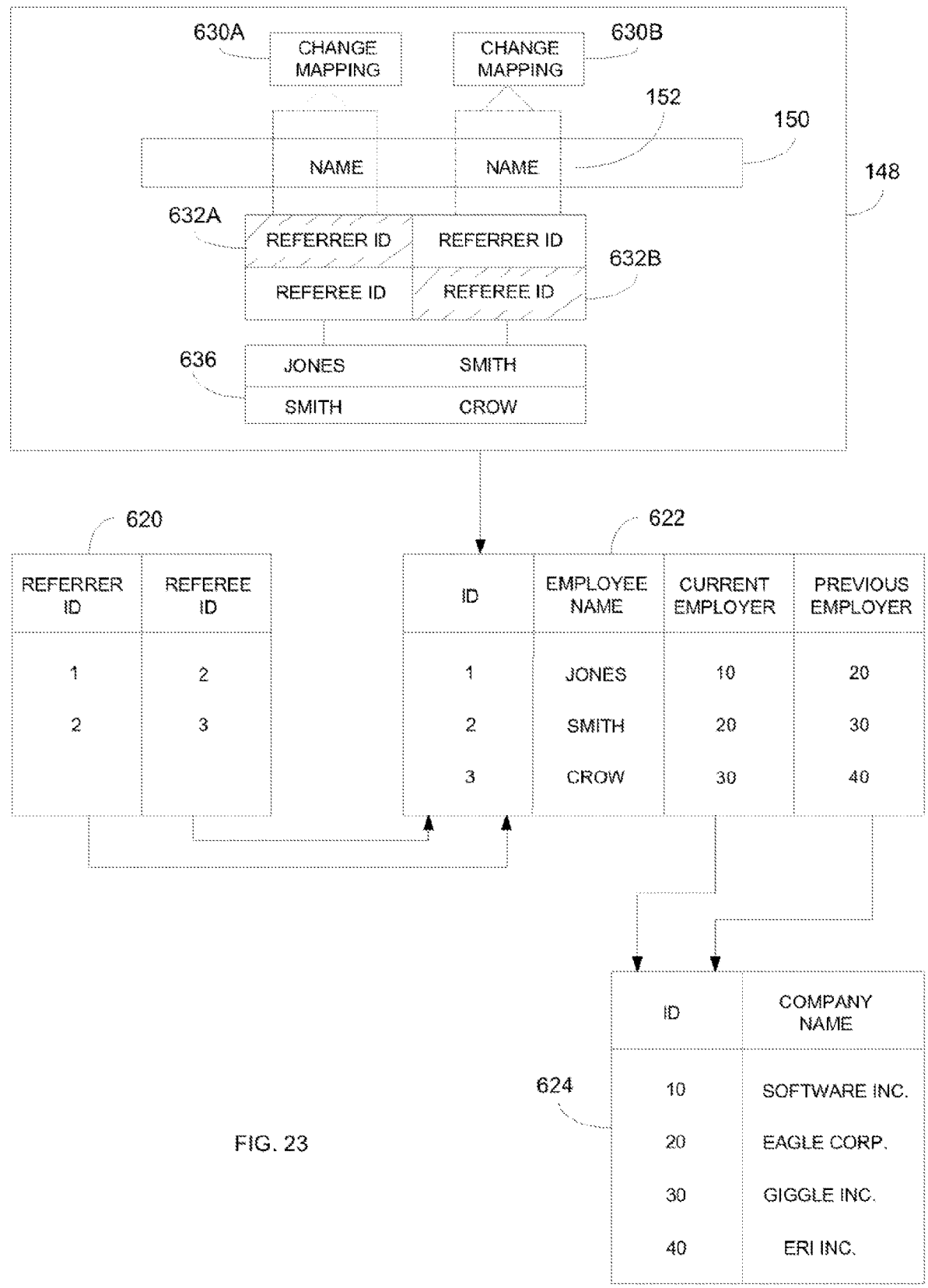
FIG. 23 depicts an alternative user selectable table mapping for a second search term.

Referring to FIG. 23, the user may enter an ambiguous search term 152 into search field 150, such as NAME NAME. The two search terms NAME and NAME may refer to the name of the referrer or the name of the referee. The search engine could display all names in table 622 for the first search term name and all names in table 622 for the second search term name. However, these search results may not provide useful information.

The search engine may display windows 630A and 630B in response to the user clicking the first or second search term NAME, respectively. Windows 630 may ask the user if they would like to change a current table mapping. The search engine may identify other related column names in response to selection of window 630A or window 630B.

For example, the referrer and referee columns of table 620 may be linked to the employee identifiers in table 622. The search engine may identify the names of the referrer and referee columns of table 620 in menus 632A and 632B. Selecting the referrer name in menu 632A may cause the search engine to map the first NAME in search term 152 with the referrer column in table 620. Selecting the referee name in menu 632B may cause the search engine to map the second NAME in search term 152 with the referee column in table 620. Accordingly, the search engine displays a list 636 of referrer names and associated referee names. Thus, the search engine allows the user to selectively map search terms to columns in different tables.

Figure 24:
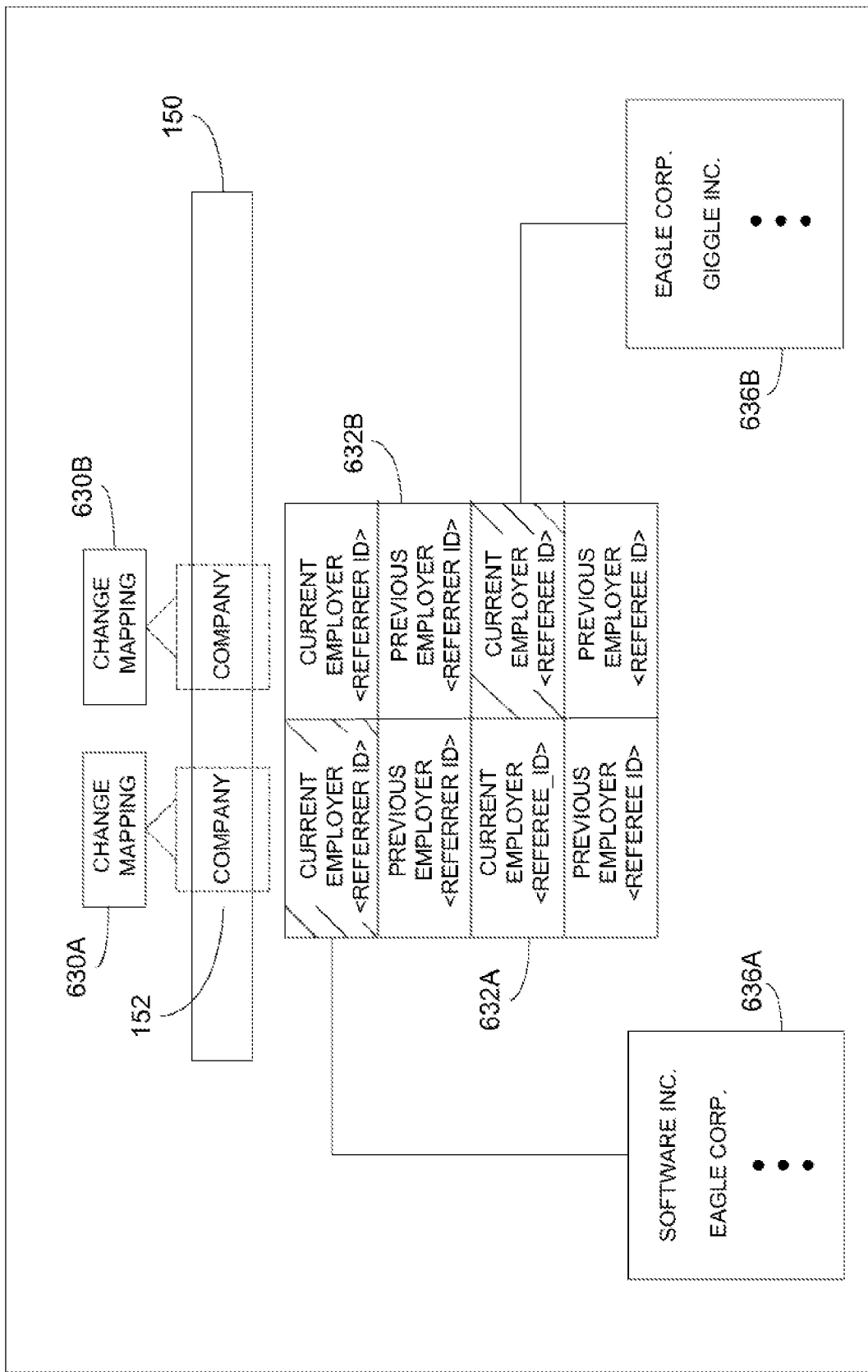
FIG. 24 depicts another alternative user selectable table mapping for a third search term.

FIG. 24 depicts another example where the user enters the search term COMPANY COMPANY. Referring to FIGS. 23 and 24, simply displaying a list of all company names in table 624 for both the first search term COMPANY and the second search term COMPANY may not provide useful information. The search engine may display change mapping windows 630A and 630B in response to the user selecting the first or second COMPANY search term, respectively.

In response to selection of windows 630, the search engine may display different columns that are directly or indirectly linked with company name table 624 in FIG. 23. For example, the current employer and previously employer columns in table 622 may be directly linked to the company identifier column in company table 624. The referrer and referee columns in table 620 are indirectly linked to company table 624 through employee table 622.

The search engine may identify the different columns in tables 620, 622, and 624 that can be joined with the two COMPANY tokens in search term 152. In this example, sixteen different combinations may exist between referrer, referee, current employer, and previous employer. For example, the first item in menu 632A may identify the join path between the referrer column in table 620 and the current employer column in table 622. The second item in menu 632A may identify the join path between the referrer column in table 620 and the previous employer column in table 622.

When the top entry in menu 632A is selected, the search engine maps the first COMPANY token in search term 152 with the referrer column in table 620, the associated entries in the current employer column of table 622, and the associated company names in table 624. When the third entry in menu 632B is selected, the search engine maps the second COMPANY token in search term 152 with the referee column in table 620, the associated entries in the current employer column of table 622, and the associated company names in table 624.

Accordingly, the search engine displays a list 636A of current employers for employees that are identified as referrers in table 620. The search engine also displays an associated list 636B of current employers for the associated referees identified in table 620.

Thus, the search engine allows users to dynamically assign join paths to search terms/tokens 152. The join paths may identify a root table and other selected paths/links from the root table to other tables. The possible join paths are displayed in a drop down menu in response to the user selecting search terms/tokens 152 in search field 150. The user may dynamically change current join paths by selecting different columns names displayed in the drop down menus.

The search engine may identify new join paths as additional tokens are added to search term 152. For example, the user may add the token AMOUNT to search term 152. Another table may be linked to the employee identifiers in table 622 that contains an amount column. The search engine may display additional join paths between the amount column in the new table and the columns in tables 620, 622, and 624.

Figure 25:
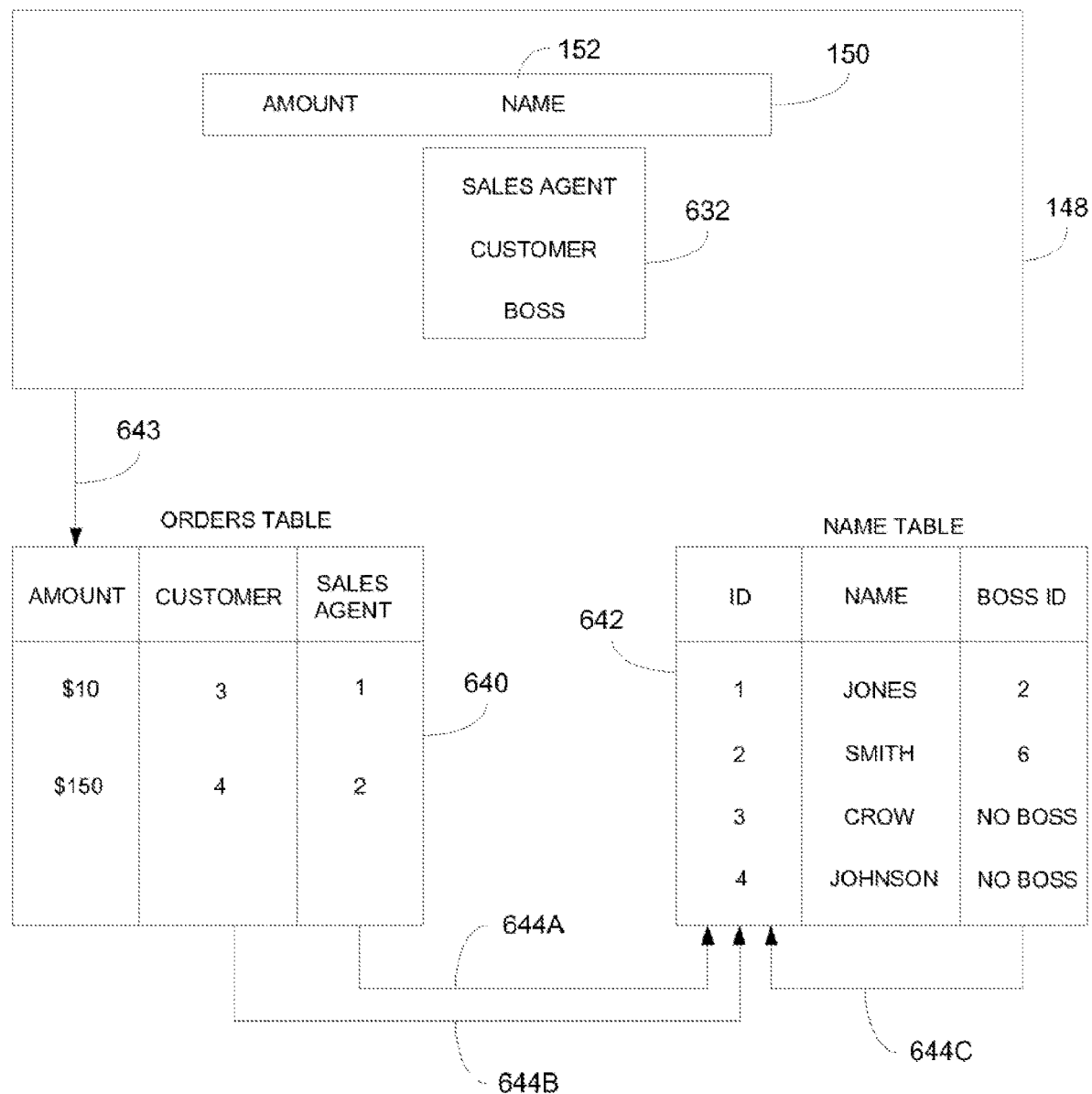
FIG. 25 depicts an example ranking scheme for a user selectable table mapping.

FIG. 25 depicts an example of how the search engine may rank join paths. The join paths may be ranked based on usage or cardinality similar to the ways described above for tokens. For example, the user may enter the search term AMOUNT NAME. Users may have selected the sales agent column in table 640 more than the customer column in table 640. Based on usage, the search engine may rank the sales agent column higher than the customer column. Accordingly, the search engine may display the sales agent column name above the customer column name in menu 632.

The search engine also may rank join paths based on the number and level of join paths between a root table and other tables. For example, the search engine may have selected orders table 640 as a root table for search term 152. A direct join path/link 643 links the tokens in search term 152 with the customer and sales agent columns in table 640. Secondary join path/links 644A-C link the NAME token in search term 152 to a boss identifier column in table 642.

With all other ranking and weighting considerations being equal, the search engine may rank the customer and sales agent columns associated with search term 152 through direct link 643 higher than the boss column in table 642 associated with search term 152 through secondary links 644A-C. The search engine accordingly displays the sales agent column and customer column names above the boss column name in menu 632.

Figure 26:
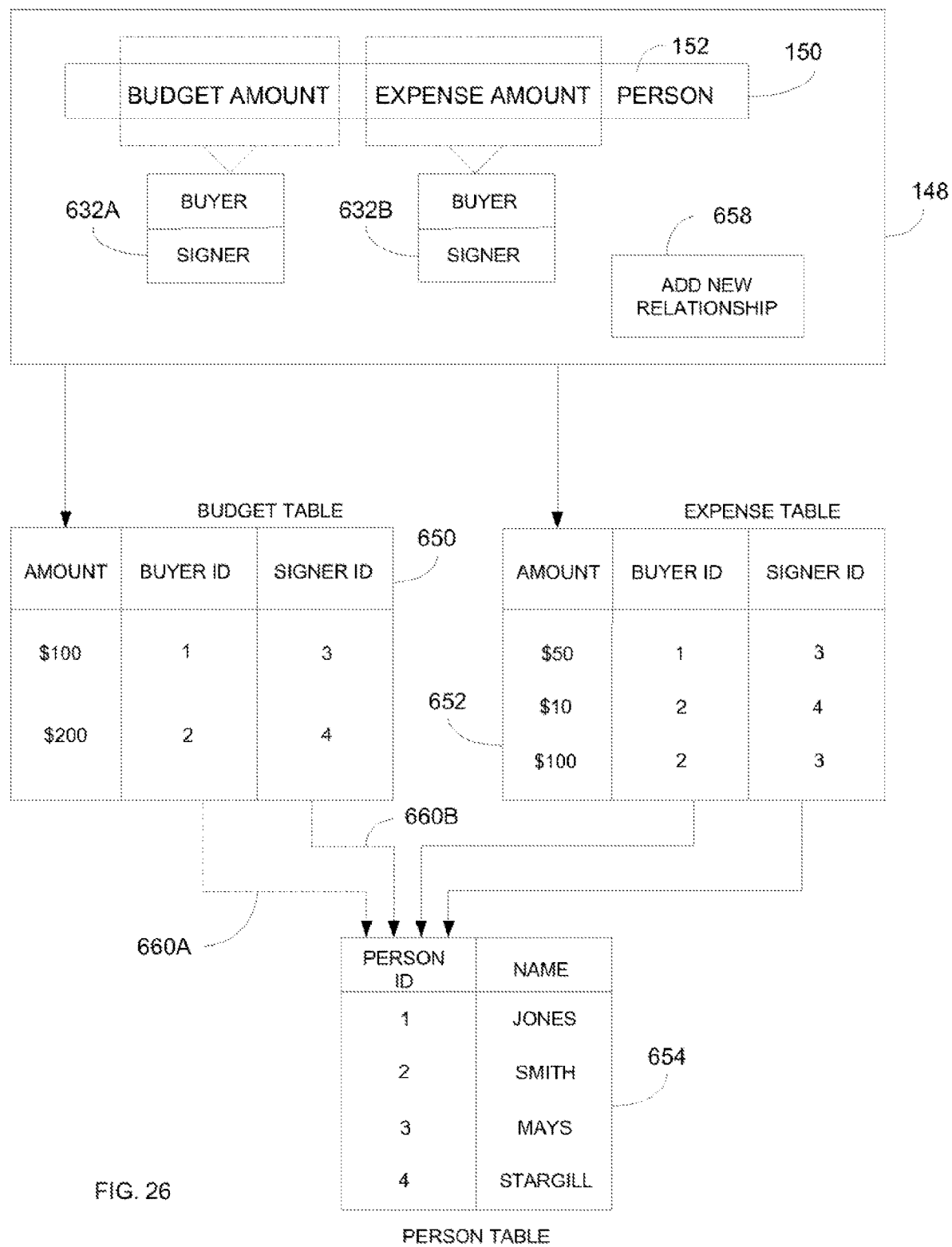
FIG. 26 depicts a scheme for dynamically linking together different tables.

FIG. 26 shows an example of how the search engine may handle multiple root tables. A user may enter the search term BUDGET AMOUNT EXPENSE AMOUNT. The search engine may identify a budget table 650 as the root table for the BUDGET AMOUNT portion of search term 152 and may identify an expense table 652 as the root table for the EXPENSE AMOUNT portion of search term 152. The search engine may derive the total budget amount from root table 650 as $300 and derive the total expense amount from root table 652 as $270.

The user may add the token PERSON so search term 152 now comprises BUDGET AMOUNT EXPENSE AMOUNT PERSON. Each table 650 and 652 may have multiple columns associated with the PERSON search term. For example, BUDGET AMOUNT may be associated with a buyer column or a signer column in table 650. The EXPENSE AMOUNT search term may be associated with a buyer column and a signer column in table 652.

The search engine may display menu 632A querying the user to select either the buyer or signer column in table 650 for mapping to the BUDGET AMOUNT in search term 152 and display menu 632B querying the user to select either the buyer or sign column in table 652 for mapping to the EXPENSE AMOUNT in search term 152. Prior to displaying menus 632, the search engine may select one join path between table 650 and table 654 as a default and one join path between table 652 and table 654 as a default.

A system administrator may create links that link columns in different tables together. The user then selects between the different links to create the different join paths between the search terms and the table columns. However, links may not exist between certain tables. The search engine may identify currently unlinked tables that may have related columns and enable the user to then create links and associated join paths between the related columns.

For example, no link may currently exist between budget table 650 and name table 654. The search engine may determine that the buyer and signer identifiers in table 650 have similarities with the person identifiers in table 654. For example, the values in tables 650 and 654 have use similar numbers or string values. The search engine may display an icon 658 that allows the user to create new links between tables 650 and 654.

In response to selecting icon 658, the search engine may display a message asking the user if they would like to link budget table 650 to person table 654. In response to an additional user input, the search engine creates links 660A and 660B mapping the buyer and signer columns in table 650 with the person identifier column in table 654. After linking tables 650 and 654 together, the search engine may display the names in table 654 associated with the buyer and signer columns of table 650.

The search engine also may give the user the option to select link names. For example, the user may assign the name AUTHORIZED SIGNER to link 660B. The name AUTHORIZED SIGNER would then appear in menu 632A.

Worksheets

Figure 27:
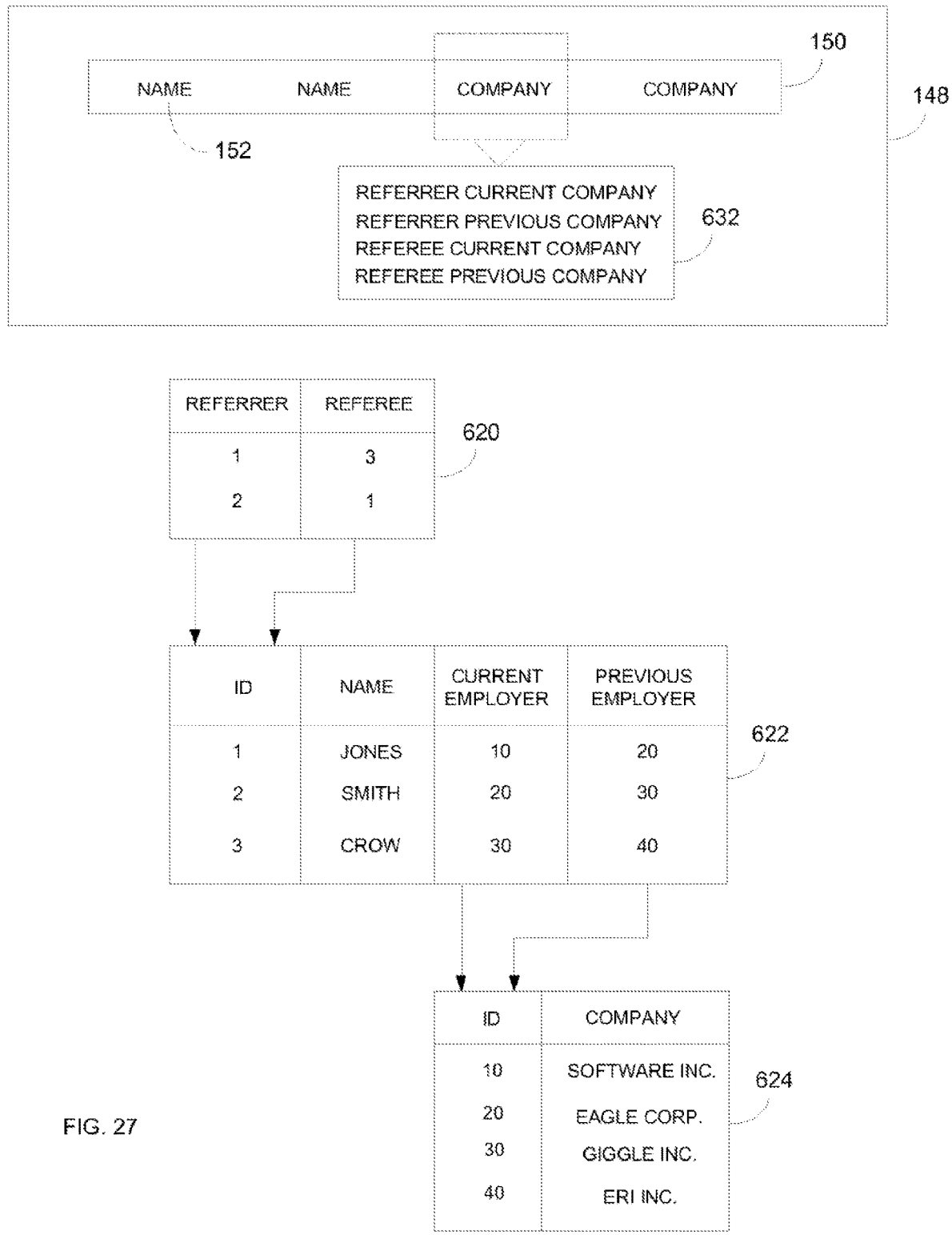
FIGS. 27 and 28 depict a scheme for generating a worksheet table.

FIG. 27 depicts an example of how the search engine may create a worksheet. As previously shown, table 620 contains referrer and referee identifier columns and table 622 contains the names associated with the referrer and referee identifiers in table 620 and also contains current and previous employer identifiers. Table 624 contains the names associated with the current and previous employer identifiers in table 622.

As explained above, the tables may have been previously linked together and search engine may display different menus showing selectable join paths between the search terms and the different columns in tables 620, 622, and 624. For example, the search engine may display menu 632 showing different join paths for associating with the first COMPANY in search term 152.

Figure 28:
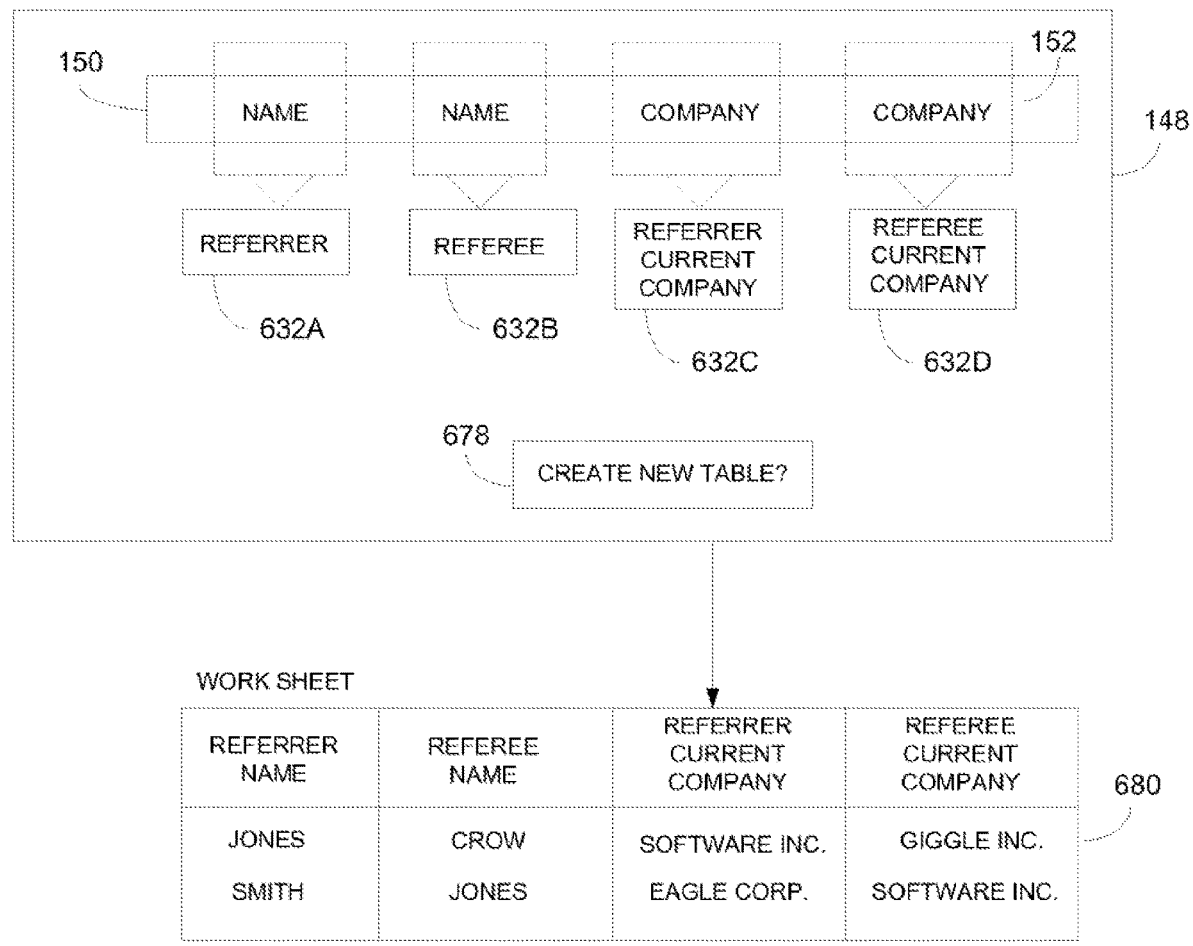

FIG. 28 shows how the search engine dynamically creates a worksheet based on the user selected join paths. Referring to FIGS. 27 and 28, the user, or a group of users, may not want to continuously map search terms with different join paths. The search engine allows the user to create a worksheet table 680 that contains the selected table entries for the selected join paths. For example, the user may select the referrer column name in menu 632A, the referee column name in menu 632B, the referrer current company name in menu 632C, and the referee current company name in menu 632D.

These user selections cause the search engine to map the first NAME in search term 152 to the referrer column in table 620, map the second NAME in search term 152 to the referee entries in table 620, map the first COMPANY in search term 152 to the referrer current company entries in table 622, and map the second COMPANY entry in search term 152 to the referee current company entries in table 622.

In response to selecting icon 678, the search engine generates a worksheet table 680 that contains the user selected table mappings. For example, the search engine adds the all referrer names identified in table 620 to a first column of worksheet 680 and adds the referee names associated with the referrer names identified in table 620 to a second column of worksheet 680. The search engine creates a third column in worksheet table 680 containing the current company names associated with the referrer names and adds a fourth column containing the current company names associated with the referee names.

The search engine may link any subsequent searches using all or part of search term 152 to worksheet table 680. Worksheet 680 may be published to any defined group of users and may be assigned any selectable name. Any new data added to any of tables 620, 622, or 624 in FIG. 27 is automatically added to worksheet 680. For example, any new referrer names added to table 620 and 622 are automatically added to worksheet 680 as well as any associated referee names, current company names, or previous company names.

Worksheet table 680 may be assigned the same row level and object level security as other tables as described above. For example, a system administrator may restrict users to only viewing certain rows of worksheet 680 where the user is either the referrer or referee. In another example, the worksheet 680 may include a column of social security numbers associated with the referrers (not shown). The system administrator may assign a security bitmap to worksheet 680 that prevents certain groups of users from viewing the data in the social security column.

The links joining columns from different tables together also may have associated security levels. For example, the search engine may assign a security bitmap to the links between table 622 and table 624 that prevents certain users from seeing the current company names and previous company names contained in table 624 or contained in worksheet 680.

The search engine may generate indexes for the entries in worksheet 680. To reduce the processing required to maintain additional indexes, links may be created between worksheet 680 and tables 620, 622, and 624 in FIG. 27. For example, the same names may exist in the first column of worksheet 680 and the name column of table 622. The first column of worksheet 680 may be linked to the indexes previously created for the name column of table 622.

Worksheet 680 may only contain a subset of entries from tables 620, 622, or 624. For example, only a subset of names from table 622 may be identified in worksheet 680. The indexes for tables 620, 622, or 624 may include bitmaps that identify the subset of entries associated with worksheet 680. These bitmaps may be similar to the priority bitmaps described above.

For example, the search engine may receive a search term. The search engine may map the search term to worksheet 680. The worksheet may be linked to the indexes for table 622. The indexes for table 622 may include a worksheet bitmap that identifies the different branches/tokens of the indexes associated with worksheet 680. The search engine only parses down the branches of the indexes with bitmap values associated with entries in worksheet 680.

A large number of worksheets may create an unwieldy number of associated worksheet bitmaps. Each worksheet may be assigned a different bit in the worksheet bitmap. In one example, the search engine may limit the number of worksheets to restrict the amount of additional processing and data needed for handling the worksheet bitmaps.

FIG. 29 shows an example formulaic search query. The search engine allows the user to specify arithmetic operations between different table columns. For example, the user may enter the search term ORDER AMOUNT—CUSTOMER SUPPORT COST. The search engine may identify the order amounts in table 690 and the customer costs in table 692. The search engine calculates the differences between the transaction amounts in table 690 and the costs in table 694 and displays the results 694 in electronic page 148.

The search engine may reduce tables 690 and 692 into a customer profitability table that has the granularity for the smallest identified column. For example, order table 690 may contain thousands of entries but customer support table 692 may only contain a few dozen entries. The new table only may include the transactions in table 690 that also include associated cost amounts in table 692. The search engine then calculates the profitability form the values in the new table. The search engine also may allow the user to select a name for the new table, such as customer profitability.

In another example, the user may enter the search term COUNT FLIGHTS (FOR ARRIVAL TIME-DEPARTURE TIME <3 HOURS). The search engine may use a different language for parsing the search terms with the parenthesis. For example, the search engine may subtract the departure time from the arrival time for every row in the flights table. The search engine then may compare the subtracted values to a fixed quantity of 3 hours and count the number of flights with a total flight time of less than 3 hours.

The search engine also may perform arithmetic operations for user defined join paths. For example, the search engine allows the user to select columns in different tables to map together as described above. The search engine then performs the above described arithmetic operations between the user selected table columns.

System

Figure 30:
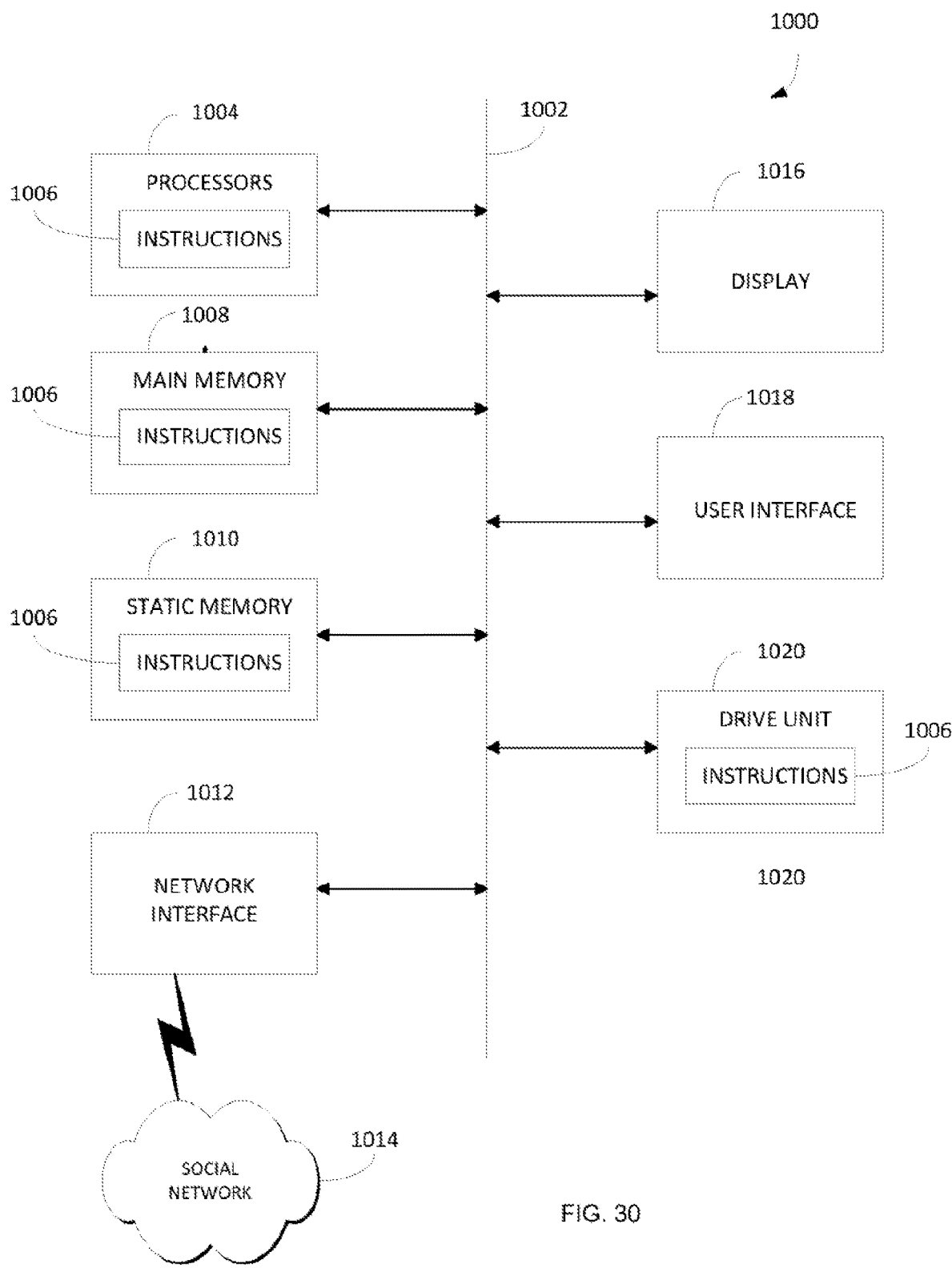
FIG. 30 depicts an example computing device for implementing the information retrieval system.

FIG. 30 shows a computing device 1000 that may be used for operating the information retrieval system and performing any combination of the information retrieval processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A method of semantic analysis to resolve ambiguous user input data with respect to a request for data, the method comprising:
   obtaining first user input data indicating a request for data and including a text string;
   automatically identifying a first token based on a first portion of the text string using a finite state machine and a token index, wherein the token index indexes tokens, including the first token and a second token, such that tokens are computer accessible;
   automatically identifying a first table in a database, wherein the first token indicates a first column from the first table, and wherein the first table includes a second column;
   automatically identifying the second token based on a second portion of the text string using the finite state machine and the token index;
   automatically identifying a second table in the database, wherein the second token indicates a third column from the second table, and wherein the second table includes a fourth column;
   automatically identifying a plurality of candidate join paths for joining data from the first table with data from the second table;
   automatically identifying the request for data as ambiguous in response to automatically identifying the plurality of candidate join paths, and in the absence of data identifying a candidate join path from the plurality of candidate join paths as a resolved join path;
   automatically obtaining first candidate results responsive to the input data, wherein automatically obtaining the first candidate results includes using a first candidate join path from the plurality of candidate join paths and omits otherwise using the plurality of candidate join paths;
   automatically obtaining second candidate results responsive to the input data, wherein automatically obtaining the second candidate results includes using a second candidate join path from the plurality of candidate join paths and omits otherwise using the plurality of candidate join paths;
   automatically outputting, for presentation to a user, combined candidate results presentation data including at least a portion of the first candidate results and at least a portion of the second candidate results;
   obtaining second user input data indicating a resolved selection of a first value from the portion of the first candidate results or a second value from the portion of the second candidate results;
   in response to obtaining the second user input data, automatically identifying the request for data as unambiguous and automatically identifying the resolved join path, wherein automatically identifying the resolved join path includes:
   identifying the first candidate join path as the resolved join path in response to automatically determining that the second user input data indicates the resolved selection of the first value from the portion of the first candidate results; and
   identifying the second candidate join path as the resolved join path in response to automatically determining that the second user input data indicates the resolved selection of the second value from the portion of the second candidate results; and
   in response to automatically identifying the request for data as unambiguous, automatically outputting, for presentation to the user, data responsive to the request for data using the resolved join path.

2. The method of claim 1, wherein automatically outputting the combined candidate results presentation data includes:
   including, in the combined candidate results presentation data, ambiguity data for presenting information indicating that the request for data is ambiguous, wherein the ambiguity data indicates the second portion of the text string.

3. The method of claim 1, wherein:
   the first table includes a fifth column;
   automatically identifying the plurality of candidate join paths includes:
      automatically identifying the first candidate join path for joining data from the first column from the first table with data from the third column from the second table based on an association in the database between the second column from the first table and the fourth column from the second table; and
      automatically identifying the second candidate join path for joining data from the first column from the first table with data from the third column from the second table based on an association in the database between the fifth column from the first table and the fourth column from the second table;
   automatically obtaining the first candidate results includes automatically obtaining the first candidate results such that the first candidate results include a first set of candidate values based on the first column from the first table and a second set of candidate values based on the third column from the second table, wherein the first set of candidate values or the second set of candidate values includes the first value from the portion of the first candidate results;

automatically obtaining the second candidate results includes automatically obtaining the second candidate results such that the second candidate results include a third set of candidate values based on the first column from the first table and a fourth set of candidate values based on the third column from the second table, wherein the third set of candidate values or the fourth set of candidate values includes the second value from the portion of the second candidate results; and automatically outputting the combined candidate results presentation data includes outputting:
a first tabular dataset including:
a first column name for the second column from the first table from the first candidate results; and
a second column name for the fifth column from the first table from the second candidate results;
a second tabular dataset including:
a value from the first set of candidate values; and
a value from the third set of candidate values; and
a third tabular dataset including:
a value from the second set of candidate values; and
a value from the fourth set of candidate values.

4. The method of claim 1, wherein automatically outputting the combined candidate results presentation data includes: outputting the first tabular dataset such that the first column name is shown as selected and the second column name is shown as unselected; outputting the second tabular dataset such that the value from the first set of candidate values is shown as selected and the value from the third set of candidate values is shown as unselected; and outputting the third tabular dataset such that the value from the second set of candidate values is shown as selected and the value from the fourth set of candidate values is shown as unselected.

5. The method of claim 4, wherein obtaining the second user input data includes:
in response to a determination that the second user input data includes selection data indicating a selection of one of the second column name, the value from the third set of candidate values, or the value from the fourth set of candidate values, automatically outputting modified combined candidate results presentation data, wherein automatically outputting the modified combined candidate results presentation data includes:
outputting the first tabular dataset such that the first column name is shown as unselected and the second column name is shown as selected;
outputting the second tabular dataset such that the value from the first set of candidate values is shown as unselected and the value from the third set of candidate values is shown as selected; and
outputting the third tabular dataset such that the value from the second set of candidate values is shown as unselected and the value from the fourth set of candidate values is shown as selected.

6. The method of claim 1, wherein: the first portion of the text string has a first string value and the second portion of the text string has a second string value equivalent to the first string value; the second table is the first table, wherein the first column from the first table is the third column from the second table and the second column from the first table is the fourth column from the second table; and automatically identifying the plurality of candidate join paths includes: automatically identifying a third table, wherein the third table includes a fifth column and a sixth column, and wherein the database includes: an association between the fifth column from the third table and the second column from the first table, wherein the association between the fifth column from the third table and the second column from the first table is an association between the fifth column from the third table and the fourth column from the second table; and an association between the sixth column from the third table and the fourth column from the second table, wherein the association between the sixth column from the third table and the second column from the first table is an association between the sixth column from the third table and the fourth column from the second table; automatically identifying the first candidate join path for joining: data from the first table joined with data from the third table via the association between the fifth column from the third table and the second column from the first table; and data from the second table joined with data from the third table via the association between the sixth column from the third table and the fourth column from the second table; automatically identifying the second candidate join path for joining: data from the first table joined with data from the third table via the association between the sixth column from the third table and the second column from the first table; and data from the second table joined with data from the third table via the association between the fifth column from the third table and the fourth column from the second table.

7. The method of claim 6, wherein automatically outputting the combined candidate results presentation data includes outputting:
a first tabular dataset including:
a first column name for the fifth column from the third table in a first row of the first tabular dataset such that the first row of the first tabular dataset is shown as selected; and
a second column name for the sixth column from the third table in a second row of the first tabular dataset subsequent to the first row of the first tabular dataset such that the second row of the first tabular dataset is shown as unselected;
a second tabular dataset including:
the second column name for the fifth column from the third table in a first row of the second tabular dataset such that the first row of the second tabular dataset is shown as unselected; and
the first column name for the sixth column from the third table in a second row of the second tabular dataset subsequent to the first row of the second tabular dataset such that second row of the second tabular dataset is shown as selected; and
a third tabular dataset including:
a first value of the first column from the first table as a value of a first column and a first row of the third tabular dataset, wherein the first value of the first column from the first table is in a row of the first table that includes a first value of the second column from the first table that matches a first value from the fifth column of the third table; and
a first value of the third column from the second table as a value of a second column and the first row of the third tabular dataset, wherein the first value of the third column from the second table is in a row of the second table that includes a first value of the fourth column from the second table that matches a first value from the sixth column of the third table.
8. The method of claim 7, wherein obtaining the second user input data includes:
in response to a determination that the second user input data includes selection data indicating a selection of the second column name from the first tabular dataset or the first column name from the second tabular dataset, automatically outputting modified combined candidate results presentation data, wherein automatically outputting the modified combined candidate results presentation data includes:
outputting the first tabular dataset such that the first column name is shown as unselected and the second column name is shown as selected;
outputting the second tabular dataset such that the first column name is shown as selected and the second column name is shown as unselected; and
outputting the third tabular dataset such that the third tabular dataset includes:
a second value of the first column from the first table as the value of the first column and the first row of the third tabular dataset, wherein the second value of the first column from the first table is in a row of the first table that includes a second value of the second column from the first table that matches a second value from the sixth column of the third table; and
a second value of the third column from the second table as the value of the second column and the first row of the third tabular dataset, wherein the second value of the third column from the second table is in a row of the second table that includes a second value of the fourth column from the second table that matches a second value from the fifth column of the third table.
9. The method of claim 6, wherein:
the first table includes a seventh column and an eighth column;
the second table includes a ninth column and a tenth column, wherein the seventh column from the first table is the ninth column from the second table and the eighth column from the first table is the tenth column from the second table;
automatically identifying the plurality of candidate join paths includes:
automatically identifying a fourth table stored in the database, wherein the fourth table includes an eleventh column and a twelfth column, and wherein the database includes:
an association between the seventh column from the first table and the eleventh column from the fourth table, wherein the association between the seventh column from the first table and the eleventh column from the fourth table is an association between the ninth column from the third table and the eleventh column from the fourth table; and
an association between the eighth column from the first table and the eleventh column from the fourth table, wherein the association between the eighth column from the first table and the eleventh column from the fourth table is an association between the tenth column from the third table and the eleventh column from the fourth table;
automatically identifying the first candidate join path for joining:
data from the first table joined with:
data from the third table via the association between the fifth column from the third table and the second column from the first table; and
data from the fourth table via the association between the seventh column from the first table and the eleventh column from the fourth table; and
data from the second table joined with:
data from the third table via the association between the sixth column from the third table and the fourth column from the second table; and
data from the fourth table via the association between the seventh column from the first table and the eleventh column from the fourth table;
automatically identifying the second candidate join path for joining:
data from the first table joined with:
data from the third table via the association between the fifth column from the third table and the second column from the first table; and
data from the fourth table via the association between the eighth column from the first table and the eleventh column from the fourth table; and
data from the second table joined with:
data from the third table via the association between the sixth column from the third table and the fourth column from the second table; and
data from the fourth table via the association between the eighth column from the first table and the eleventh column from the fourth table;
automatically identifying a third candidate join path for joining:
data from the first table joined with:
data from the third table via the association between the sixth column from the third table and the second column from the first table; and
data from the fourth table via the association between the seventh column from the first table and the eleventh column from the fourth table; and
data from the second table joined with:
data from the third table via the association between the fifth column from the third table and the fourth column from the second table; and
data from the fourth table via the association between the seventh column from the first table and the eleventh column from the fourth table;
automatically identifying a fourth candidate join path for joining:
data from the first table joined with:
data from the third table via the association between the sixth column from the third table and the second column from the first table; and
data from the fourth table via the association between the eighth column from the first table and the eleventh column from the fourth table; and
data from the second table joined with:
data from the third table via the association between the fifth column from the third table and the fourth column from the second table; and data from the fourth table via the association between the eighth column from the first table and the eleventh column from the fourth table; and automatically outputting the combined candidate results presentation data includes outputting:
a first tabular dataset including:
a combination of a first column name for the seventh column of the first table and the first column name for the fifth column from the third table as a value in a first column and a first row of the first tabular dataset, such that the first row of the first tabular dataset is shown as selected;
a combination of a second column name for the eighth column of the first table and the first column name for the fifth column from the third table as a value in the first column and a second row of the first tabular dataset, such that the second row of the first tabular dataset is shown as unselected;
a combination of the first column name for the seventh column of the first table and the second column name for the sixth column from the third table as a value in the first column and a third row of the first tabular dataset, such that the third row of the first tabular dataset is shown as unselected; and
a combination of the second column name for the eighth column of the first table and the second column name for the sixth column from the third table as a value in the first column and a fourth row of the first tabular dataset, such that the fourth row of the first tabular dataset is shown as unselected;
a second tabular dataset including:
a combination of the first column name for the seventh column of the first table and the first column name for the fifth column from the third table as a value in a first column and a first row of the second tabular dataset, such that the first row of the second tabular dataset is shown as unselected;
a combination of the second column name for the eighth column of the first table and the first column name for the fifth column from the third table as a value in the first column and a second row of the second tabular dataset, such that the second row of the second tabular dataset is shown as unselected;
a combination of the first column name for the seventh column of the first table and the second column name for the sixth column from the third table as a value in the first column and a third row of the second tabular dataset, such that the third row of the second tabular dataset is shown as selected; and
a combination of the second column name for the eighth column of the first table and the second column name for the sixth column from the third table as a value in the first column and a fourth row of the second tabular dataset, such that the fourth row of the second tabular dataset is shown as unselected;
a third tabular dataset including:
a first value of the twelfth column from the fourth table as a value of a first column and a first row of the third tabular dataset, wherein the third tabular dataset is shown as associated with the first row of the first tabular dataset, wherein the first value of the twelfth column from the fourth table is in a row of the fourth table that includes a first value of the eleventh column from the fourth table that matches a first value from the seventh column of the first table that is in a row of the first table that includes a first value of the second column from the first table that matches a first value from the fifth column of the third table; and
a fourth tabular dataset including:
a second value of the twelfth column from the fourth table as a value of a first column and a first row of the fourth tabular dataset, wherein the fourth tabular dataset is shown as associated with the third row of the second tabular dataset, wherein the second value of the twelfth column from the fourth table is in a row of the fourth table that includes a second value of the eleventh column from the fourth table that matches a second value from the seventh column of the first table that is in a row of the first table that includes a second value of the second column from the first table that matches a second value from the fifth column of the third table.

10. The method of claim 1, wherein automatically outputting the combined candidate results presentation data includes: automatically identifying a candidate join path from the plurality of candidate join paths as an automatically identified candidate join path; in response to a determination that the first candidate join path is the automatically identified candidate join path, outputting the combined candidate results such that data from the portion of the first candidate results is shown as selected and data from the portion of the second candidate results is shown as unselected; and in response to a determination that the second candidate join path is the automatically identified candidate join path, outputting the combined candidate results such that data from the portion of the second candidate results is shown as selected and data from the portion of the first candidate results is shown as unselected.

11. The method of claim 10, wherein:
automatically identifying the automatically identified candidate join path includes:
determining usage data for the plurality of candidate join paths on a per-candidate join path basis; and
automatically identifying the candidate join path from the plurality of candidate join paths having a maximal value of the usage data as the automatically identified candidate join path.

12. The method of claim 10, wherein:
automatically identifying the automatically identified candidate join path includes:
determining cardinality data for the plurality of candidate join paths on a per-candidate join path basis; and
automatically identifying the candidate join path from the plurality of candidate join paths having a maximal value of the cardinality data as the automatically identified candidate join path.

13. The method of claim 1, wherein: automatically obtaining the first candidate results using the first candidate join path includes automatically generating a first query in accordance with the first candidate join path and receiving the first candidate results from the database in response to execution of the first query by the database; automatically obtaining the second candidate results using the second candidate join path includes automatically generating a second query in accordance with the second candidate join path and receiving the second candidate results from the database in response to execution of the second query by the database; and automatically outputting the data responsive to the request for data using the resolved join path includes automatically generating a third query in accordance with the resolved join path and receiving the data responsive to the request for data from the database in response to execution of the third query by the database.

14. An apparatus comprising:
a memory; and
a processor configured to execute instructions stored in the memory to:
   obtain first user input data indicating a request for data and including a text string;
   identify a first token based on a first portion of the text string using a finite state machine and a token index, wherein the token index indexes tokens, including the first token and a second token, such that tokens are computer accessible;
   identify a first table in a database, wherein the first token indicates a first column from the first table, and wherein the first table includes a second column;
   identify the second token based on a second portion of the text string using the finite state machine and the token index;
   identify a second table in the database, wherein the second token indicates a third column from the second table, and wherein the second table includes a fourth column;
   identify a plurality of candidate join paths for joining data from the first table with data from the second table;
   identify the request for data as ambiguous in response to identifying the plurality of candidate join paths, and in the absence of data identifying a candidate join path from the plurality of candidate join paths as a resolved join path;
   obtain first candidate results responsive to the input data, wherein to obtain the first candidate results the processor is configured to execute instructions stored in the memory to use a first candidate join path from the plurality of candidate join paths and omit otherwise using the plurality of candidate join paths;
   obtain second candidate results responsive to the input data, wherein to obtain the second candidate results the processor is configured to execute instructions stored in the memory to use a second candidate join path from the plurality of candidate join paths and omit otherwise using the plurality of candidate join paths;
   output, for presentation to a user, combined candidate results presentation data including at least a portion of the first candidate results and at least a portion of the second candidate results;
   obtain second user input data indicating a resolved selection of a first value from the portion of the first candidate results or a second value from the portion of the second candidate results;
   in response to obtaining the second user input data, automatically identify the request for data as unambiguous and identify the resolved join path, wherein to identify the resolved join path the processor is configured to execute instructions stored in the memory to:
      identify the first candidate join path as the resolved join path in response to automatically determining that the second user input data indicates the resolved selection of the first value from the portion of the first candidate results; and
      identify the second candidate join path as the resolved join path in response to automatically determining that the second user input data indicates the resolved selection of the second value from the portion of the second candidate results; and
   in response to automatically identifying the request for data as unambiguous, output, for presentation to the user, data responsive to the request for data using the resolved join path.

15. The apparatus of claim 14, wherein to output the combined candidate results presentation data the processor is configured to execute instructions stored in the memory to:
   include, in the combined candidate results presentation data, ambiguity data for presenting information indicating that the request for data is ambiguous, wherein the ambiguity data indicates the second portion of the text string.

16. The apparatus of claim 14, wherein:
the first table includes a fifth column;
to identify the plurality of candidate join paths the processor is configured to execute instructions stored in the memory to:
   identify the first candidate join path for joining data from the first column from the first table with data from the fourth column from the second table based on an association in the database between the second column from the first table and the third column from the second table; and
   identify the second candidate join path for joining data from the first column from the first table with data from the fourth column from the second table based on an association in the database between the fifth column from the first table and the third column from the second table;
to obtain the first candidate results the processor is configured to execute instructions stored in the memory to obtain the first candidate results such that the first candidate results include a first set of candidate values based on the first column from the first table and a second set of candidate values based on the fourth column from the second table, wherein the first set of candidate values or the second set of candidate values includes the first value from the portion of the first candidate results;
to obtain the second candidate results the processor is configured to execute instructions stored in the memory to obtain the second candidate results such that the second candidate results include a third set of candidate values based on the first column from the first table and a fourth set of candidate values based on the fourth column from the second table, wherein the third set of candidate values or the fourth set of candidate values includes the second value from the portion of the second candidate results; and
to output the combined candidate results presentation data the processor is configured to execute instructions stored in the memory to output:
   a first tabular dataset including:
      a first column name for the second column from the first table from the first candidate results; and
      a second column name for the fifth column from the first table from the second candidate results;
   a second tabular dataset including:

a value from the first set of candidate values; and
a value from the third set of candidate values; and
a third tabular dataset including:
a value from the second set of candidate values; and
a value from the fourth set of candidate values.

17. The apparatus of claim 14, wherein to output the combined candidate results presentation data the processor is configured to execute instructions stored in the memory to:
identify a candidate join path from the plurality of candidate join paths as an automatically identified candidate join path;
in response to a determination that the first candidate join path is the automatically identified candidate join path, output the combined candidate results such that data from the portion of the first candidate results is shown as selected and data from the portion of the second candidate results is shown as unselected; and
in response to a determination that the second candidate join path is the automatically identified candidate join path, output the combined candidate results such that data from the portion of the second candidate results is shown as selected and data from the portion of the first candidate results is shown as unselected.

18. A non-transitory computer-readable storage medium comprising executable instructions that are executed by a processor to:
obtain first user input data indicating a request for data and including a text string;
identify a first token based on a first portion of the text string using a finite state machine and a token index, wherein the token index indexes tokens, including the first token and a second token, such that tokens are computer accessible;
identify a first table in a database, wherein the first token indicates a first column from the first table, and wherein the first table includes a second column;
identify the second token based on a second portion of the text string using the finite state machine and the token index;
identify a second table in the database, wherein the second token indicates a third column from the second table, and wherein the second table includes a fourth column;
identify a plurality of candidate join paths for joining data from the first table with data from the second table;
identify the request for data as ambiguous in response to identifying the plurality of candidate join paths, and in the absence of data identifying a candidate join path from the plurality of candidate join paths as a resolved join path;
obtain first candidate results responsive to the input data, wherein to obtain the first candidate results the processor is configured to execute instructions stored in the memory to use a first candidate join path from the plurality of candidate join paths and omit otherwise using the plurality of candidate join paths;
obtain second candidate results responsive to the input data, wherein to obtain the second candidate results the processor is configured to execute instructions stored in the memory to use a second candidate join path from the plurality of candidate join paths and omit otherwise using the plurality of candidate join paths;
output, for presentation to a user, combined candidate results presentation data including at least a portion of the first candidate results and at least a portion of the second candidate results;
obtain second user input data indicating a resolved selection of a first value from the portion of the first candidate results or a second value from the portion of the second candidate results;
in response to obtaining the second user input data, automatically identify the request for data as unambiguous and identify the resolved join path, wherein to identify the resolved join path the processor is configured to execute instructions stored in the memory to:
identify the first candidate join path as the resolved join path in response to automatically determining that the second user input data indicates the resolved selection of the first value from the portion of the first candidate results; and
identify the second candidate join path as the resolved join path in response to automatically determining that the second user input data indicates the resolved selection of the second value from the portion of the second candidate results; and
in response to automatically identifying the request for data as unambiguous, output, for presentation to the user, data responsive to the request for data using the resolved join path.

19. The non-transitory computer-readable storage medium of claim 18, wherein to output the combined candidate results presentation data the executable instructions are executed by a processor to:
include, in the combined candidate results presentation data, ambiguity data for presenting information indicating that the request for data is ambiguous, wherein the ambiguity data indicates the second portion of the text string.

20. The non-transitory computer-readable storage medium of claim 18, wherein to output the combined candidate results presentation data the executable instructions are executed by a processor to:
identify a candidate join path from the plurality of candidate join paths as an automatically identified candidate join path;
in response to a determination that the first candidate join path is the automatically identified candidate join path, output the combined candidate results such that data from the portion of the first candidate results is shown as selected and data from the portion of the second candidate results is shown as unselected; and
in response to a determination that the second candidate join path is the automatically identified candidate join path, output the combined candidate results such that data from the portion of the second candidate results is shown as selected and data from the portion of the first candidate results is shown as unselected.

\* \* \* \* \*